(12) United States Patent
Xu et al.

(10) Patent No.: US 12,487,643 B2
(45) Date of Patent: Dec. 2, 2025

(54) FOLDING APPARATUS AND ELECTRONIC DEVICE

(71) Applicant: Huawei Technologies Co., Ltd., Shenzhen (CN)

(72) Inventors: Zhengyi Xu, Shanghai (CN); Chunjun Ma, Shanghai (CN); Linhui Niu, Shanghai (CN); Ting Liu, Shanghai (CN); Yunyong Li, Shanghai (CN); Gangchao Wang, Shanghai (CN); Chenghao Guan, Shanghai (CN)

(73) Assignees: HUAWEI TECHNOLOGIES CO., LTD., Shenzhen (CN); SHANGHAI HUAWEI TECHNOLOGIES CO., LTD., Shanghai (CN)

( * ) Notice: Subject to any disclaimer, the term of this patent is extended or adjusted under 35 U.S.C. 154(b) by 238 days.

(21) Appl. No.: 18/044,392

(22) PCT Filed: Aug. 10, 2021

(86) PCT No.: PCT/CN2021/111914
§ 371 (c)(1),
(2) Date: Mar. 8, 2023

(87) PCT Pub. No.: WO2022/052721
PCT Pub. Date: Mar. 17, 2022

(65) Prior Publication Data
US 2024/0069604 A1    Feb. 29, 2024

(30) Foreign Application Priority Data

Sep. 14, 2020  (CN) .......................... 202010959362.9
Dec. 17, 2020  (CN) .......................... 202011495418.6

(51) Int. Cl.
G06F 1/16         (2006.01)

(52) U.S. Cl.
CPC .......... G06F 1/1681 (2013.01); G06F 1/1652 (2013.01)

(58) Field of Classification Search
CPC .... G06F 1/1616; G06F 1/1652; G06F 1/1681; H04M 1/0216; H04M 1/022; H04M 1/0268
See application file for complete search history.

(56) References Cited

U.S. PATENT DOCUMENTS

2020/0081499 A1* 3/2020 Harmon ................ E05F 1/1253
2020/0103935 A1   4/2020 Hsu
(Continued)

FOREIGN PATENT DOCUMENTS

CN    106790829 A    5/2017
CN    206575463 U    10/2017
(Continued)

Primary Examiner — Allen L Parker
Assistant Examiner — Peter Krim
(74) Attorney, Agent, or Firm — Slater Matsil, LLP

(57) ABSTRACT

The electronic device includes a folding apparatus and a flexible display. The folding apparatus is configured to bear the flexible display. An elastic component of the folding apparatus may transfer an elastic force to the flexible display by using a housing of the folding apparatus. A force that is away from a main shaft and that is applied to the flexible display when the electronic device is in a flattened state is greater than a force that is away from the main shaft and that is applied to the flexible display when the electronic device is in a closed state.

15 Claims, 39 Drawing Sheets

(56) References Cited

U.S. PATENT DOCUMENTS

| | | | |
|---|---|---|---|
| 2020/0166974 A1 | 5/2020 | Ai et al. | |
| 2021/0365078 A1* | 11/2021 | Chen | E05D 3/18 |
| 2022/0068165 A1* | 3/2022 | Park | G06F 1/1616 |
| 2022/0311843 A1* | 9/2022 | Kim | F16C 11/04 |
| 2023/0007797 A1* | 1/2023 | Jiang | G06F 1/1681 |

FOREIGN PATENT DOCUMENTS

| | | |
|---|---|---|
| CN | 110005694 A | 7/2019 |
| CN | 110442196 A | 11/2019 |
| CN | 110515426 A | 11/2019 |
| CN | 110958338 A | 4/2020 |
| CN | 111277690 A | 6/2020 |
| CN | 111322307 A | 6/2020 |
| CN | 210867803 U | 6/2020 |
| CN | 111399589 A | 7/2020 |
| CN | 111577750 A | 8/2020 |
| CN | 111614806 A | 9/2020 |
| CN | 112901643 A | 6/2021 |
| CN | 113949753 A | 1/2022 |
| WO | 2019127420 A1 | 7/2019 |

\* cited by examiner

FOLDING APPARATUS AND ELECTRONIC DEVICE

CROSS-REFERENCE TO RELATED APPLICATIONS

This application is a national stage of International Application No. PCT/CN2021/111914, filed on Aug. 10, 2021, which claims priority to Chinese Patent Application No. 202011495418.6, filed on Dec. 17, 2020, and Chinese Patent Application No. 202010959362.9, filed on Sep. 14, 2020. All the aforementioned applications are hereby incorporated by reference in their entireties.

TECHNICAL FIELD

This application relates to the field of foldable electronic product technologies, and in particular, to a folding apparatus and an electronic device.

BACKGROUND

A flexible display is widely applied to various foldable electronic devices because of features such as lightness, thinness, and non-fragileness. When the flexible display is in an unfolded state, a relatively large display area can be obtained, thereby improving a visual effect. When the flexible display is in a folded state, the electronic device has a smaller volume, and is easy to carry by the user. The foldable electronic device further includes a folding apparatus configured to bear the flexible display. The folding apparatus usually includes two housings and a rotating mechanism connected between the two housings. The two housings are folded or unfolded relative to each other through deformation of the rotating mechanism, and drive the flexible display to fold or unfold. However, because tension is generated in a bending region of the flexible display in a bending process, a crease appears in a middle part of the flexible display in an unfolded state. Consequently, flatness of the flexible display is reduced, and user experience is affected.

SUMMARY

An objective of this application is to provide a folding apparatus and an electronic device. The folding apparatus is configured to bear a flexible display. When the electronic device is unfolded from a folded state to a flattened state, a force in a direction away from a main shaft on the flexible display is greater than a force in a direction away from the main shaft on the flexible display in a closed state. Therefore, a layered misalignment phenomenon of the flexible display when the electronic device is unfolded from the folded state to the flattened state can be reduced, crease recovery of the flexible display can be accelerated, and a flattening effect of the flexible display can be improved.

According to a first aspect, this application provides a folding apparatus. The folding apparatus may be applied to an electronic device, and the folding apparatus is configured to bear a flexible display of the electronic device. The flexible display includes a first non-bending part, a bending part, and a second non-bending part that are sequentially arranged. The folding apparatus includes a first housing, a second housing, a first elastic component, and a shaft. The first housing and the second housing are respectively located on two sides of the shaft. The first housing is fixedly connected to the first non-bending part, and the second housing is fixedly connected to the second non-bending part. The first elastic component is located between the shaft and the first housing, the first elastic component is rotatably connected to the shaft, and the first elastic component is fixedly connected to the first housing. A first mechanical part abuts against a second mechanical part, where the first mechanical part is a part of the first elastic component, and the second mechanical part is a part of the shaft. A compression amount of the first elastic component in a first direction generates an elastic force, and at least a part of the elastic force is transferred to the bending part through the first housing and the first non-bending part, where the first direction is perpendicular to a length extension direction of the shaft, and the first direction is parallel to the first housing. When the electronic device is in a flattened state, a first portion of the first mechanical part abuts against a first portion of the second mechanical part, and a compression amount of the first elastic component in the first direction is a first compression amount. The first housing and the first elastic component rotate relative to the shaft, the second housing rotates relative to the shaft, and the electronic device changes from the flattened state to a folded state. When the electronic device is in the folded state, a second portion of the first mechanical part abuts against a second portion of the second mechanical part, and a compression amount of the first elastic component in the first direction is a second compression amount, where the second compression amount is less than the first compression amount. The first portion of the first mechanical part is different from the second portion of the first mechanical part, and/or the first portion of the second mechanical part is different from the second portion of the second mechanical part.

In this application, because the first housing is fixedly connected to the first non-bending part of the flexible display, when the electronic device is in the flattened state, an elastic force generated by the first elastic component may be transferred to the first non-bending part of the flexible display through the first housing, thereby accelerating crease recovery of the flexible display, and improving a flattening effect of the screen.

In a possible implementation, when the electronic device is in a flattened state, a force transferred to the bending part by using the first housing and the first non-bending part is a first force. When the electronic device is in the folded state, a force transferred to the bending part by using the first housing and the first non-bending part is a second force, and the second force is less than the first force. Therefore, when the electronic device is unfolded from the folded state to the flattened state, a force transferred to the first non-bending part of the flexible display by using the first housing is greater, thereby accelerating crease recovery.

In a possible implementation, the shaft is rotatably connected to the first elastic component by using the first rotating shaft. When the electronic device is in the flattened state, a distance between the axis of the first rotating shaft and the first portion of the shaft is the first distance, and a projection length of the first distance on the first plane is the first projection length. When the electronic device is in the folded state, a distance between the axis of the first rotating shaft and a second portion of the shaft is a second distance, a projection length of the second distance on the first plane is a second projection length, and the second projection length is less than the first projection length. The first plane is a plane on which a surface on which the first housing is fixedly connected to the first non-bending part is located.

In this implementation, when the electronic device is folded into different states, projection lengths of distances from the abutting point to the axis of the first mechanical part and the second mechanical part are different, so that elastic deformation variables of the first elastic component are different, and forces transmitted to the flexible display by using the first housing are different.

In a possible implementation, that the first elastic component is provided with a connection hole, and the shaft is rotatably connected to the first elastic component by using a first rotating shaft specifically includes: the first rotating shaft is disposed through the connection hole.

In a possible implementation, the connection hole includes a first side wall and a second side wall. A distance between the axis of the first rotating shaft and the first side wall is a first distance, a distance between the axis of the first rotating shaft and the second side wall is a second distance, and the first distance is less than the second distance. In response to the third force acting on the first elastic component, the connection hole moves relative to the first rotating shaft, a distance between the axis of the first rotating shaft and the first side wall is a third distance, a distance between the axis of the first rotating shaft and the second side wall is a fourth distance, and the third distance is greater than the fourth distance. The direction of the third force is a direction in which the second side wall faces the first side wall, a distance between the first side wall and the first housing is a fifth distance, a distance between the second side wall and the first housing is a sixth distance, and the fifth distance is less than the sixth distance.

In this implementation, according to a shape design of the connection hole, the folding apparatus may slightly become longer as the flexible display ages, so that the flexible display is more closely attached to the folding apparatus, and a crease of the flexible display is weakened when the flexible display ages.

In a possible implementation, the shaft is provided with a connection hole, and the shaft is rotatably connected to the first elastic component by using a first rotating shaft. Specifically, the first rotating shaft is disposed through the connection hole.

In a possible implementation, the connection hole includes a first side wall and a second side wall. A distance between the axis of the first rotating shaft and the first side wall is a first distance, a distance between the axis of the first rotating shaft and the second side wall is a second distance, and the first distance is greater than the second distance. In response to the third force acting on the first elastic component, the first rotating shaft moves relative to the connection hole, the distance between the axis of the first rotating shaft and the first side wall is a third distance, the distance between the axis of the first rotating shaft and the second side wall is a fourth distance, and the third distance is less than the fourth distance. The direction of the third force is a direction in which the second side wall faces the first side wall, a distance between the first side wall and the first housing is a fifth distance, a distance between the second side wall and the first housing is a sixth distance, and the fifth distance is less than the sixth distance.

In a possible implementation, the first cross section of the connection hole includes at least one or more of a waist-round shape, an ellipse, a circle, or a rectangle, and the first cross section is perpendicular to a length extension direction of the first rotating shaft.

In a possible implementation, the first elastic component includes a first fixed bracket, and at least a part of the first fixed bracket is fixedly connected to the first housing.

In a possible implementation, the first elastic component further includes a first elastic part and a first bracket. The first elastic part and the first support are arranged on the first fixed bracket. At least a part of the first elastic part is disposed between the first bracket and the first fixed bracket. The first bracket abuts against the second mechanical part, and the first elastic part abuts against the first housing by using the first fixed bracket.

In a possible implementation, a first mounting groove is disposed on the first fixed bracket, and a flange is disposed on the first bracket. The first bracket is slidably connected to the first mounting groove through the flange.

In a possible implementation, the folding apparatus further includes a second elastic component. The shaft includes a first rotating part and a second rotating part. The first elastic component includes a first fixed bracket, and the second elastic component includes a second fixed bracket. The first rotating part includes a first connection component and a first rotating arm. The second rotating part includes a second connection component and a second rotating arm. The first connection component includes a sliding end and a rotating end, the sliding end of the first connection component is slidably connected to the second fixed bracket, and the rotating end of the first connection component is rotatably connected to the first end of the first rotating arm. The second end of the first rotating arm is rotatably connected to the first fixed bracket by using the first rotating shaft. The second connection component includes a sliding end and a rotating end. The sliding end of the second connection component is slidably connected to the first fixed bracket, the rotating end of the second connection component is rotatably connected to the first end of the second rotating arm, and the second end of the second rotating arm is rotatably connected to the second fixed bracket.

In a possible implementation, the first fixed bracket includes a first connecting block. The first connecting block may be in a claw shape, and there is a rotation hole on the first connecting block. The first rotating arm includes a claw-shaped first end, that is, a second mechanical part, and the first end of the first rotating arm has a rotation hole. The first end of the first rotating arm is connected to the first connecting block in a staggered manner, and a rotating shaft passes through the rotation hole of the first connecting block and the rotation hole of the first end of the first rotating arm, so that the first end of the first rotating arm is rotatably connected to the first connecting block. In this way, the first rotating arm is rotatably connected to the first fixed bracket. The first end of the first rotating arm is connected to the first connecting block in the staggered manner, so that mutual limiting of the first end of the first rotating arm and the first connecting block can be implemented in the axial direction of the main shaft, to improve connection reliability of the rotating mechanism.

In a possible implementation, the second elastic component is located between the shaft and the second housing, the second elastic component is rotatably connected to the shaft, and the second elastic component is fixedly connected to the second housing. The third mechanical part abuts against the fourth mechanical part, where the third mechanical part is a part of the second elastic component, and the fourth mechanical part is a part of the shaft. An elastic force is generated by a compression amount of the second elastic component in a second direction, and at least a part of the elastic force is transmitted to the bending part through the second housing and the second non-bending part, where the second direction is perpendicular to the length extension direction of the shaft, and the second direction is parallel to the second housing. The electronic device is in a flattened state, the first portion of the third mechanical part abuts against the first portion of the fourth mechanical part, and the compression amount of the second elastic component in the second direction is the third compression amount. The electronic device is in a folded state, a second portion of the third mechanical part abuts against a second portion of the fourth mechanical part, a compression amount of the second elastic component in the second direction is a fourth compression amount, and the fourth compression amount is less than the third compression amount. The first portion of the third mechanical part is different from the second portion of the third mechanical part, and/or the first portion of the fourth mechanical part is different from the second portion of the fourth mechanical part.

In this implementation, the second elastic component is disposed, so that the second non-bending part of the flexible display is subject to a force in a direction away from the main shaft in a flattened state greater than a force in a direction away from the main shaft in a closed state, thereby accelerating recovery of a crease of the flexible display when the electronic device is folded to unfold. Improve the flatness of the flexible display and improve user experience.

In a possible implementation, the shaft further includes a main shaft. The first connection component includes a first transmission arm and a first connecting piece. The second connection component includes a second transmission arm and a second connecting piece. The first connection component includes a sliding end and a rotating end, the sliding end of the first connection component is slidably connected to the second fixed bracket, and the rotating end of the first connection component is rotatably connected to the first end of the first rotating arm. Specifically, the first transmission arm includes a sliding end and a rotating end. The sliding end of the first transmission arm is slidably connected to the second fixed bracket, the rotating end of the first transmission arm is rotatably connected to the main shaft, the rotating end of the first transmission arm is rotatably connected to the first connecting piece, and the first connecting piece is rotatably connected to the first end of the first rotating arm. The second connection component includes a sliding end and a rotating end, the sliding end of the second connection component is slidably connected to the first fixed bracket, and the rotating end of the second connection component is rotatably connected to the first end of the second rotating arm. Specifically, the second transmission arm includes a sliding end and a rotating end. The sliding end of the second transmission arm is slidably connected to the first fixed bracket, the rotating end of the second transmission arm is rotatably connected to the main shaft, the rotating end of the second transmission arm is rotatably connected to the second connecting piece, and the second connecting piece is rotatably connected to the first end of the second rotating arm.

In this implementation, in a process in which the first housing and the second housing are relatively unfolded to a flattened state, the first transmission arm rotates relative to the main shaft, the first rotating arm is linked with the first transmission arm by using the first connecting piece, and the first fixed bracket and the first housing gradually move away from the main shaft. The second transmission arm rotates relative to the main shaft, the second rotating arm is linked with the second transmission arm through the second connecting piece, and the second fixed bracket and the second housing are gradually away from the main shaft. In a process in which the first housing and the second housing are relatively folded to a folded state, the first transmission arm rotates relative to the main shaft, the first rotating arm is linked with the first transmission arm through the first connecting piece, and the first fixed bracket and the first housing gradually approach the main shaft. The second transmission arm rotates relative to the main shaft, the second rotating arm is linked with the second transmission arm through the second connecting piece, and the second fixed bracket and the second housing gradually approach the main shaft. Therefore, in a process in which the first housing and the second housing are relatively unfolded, the first housing moves in a direction away from the main shaft, and the second housing moves in a direction away from the main shaft. In a process in which the first housing and the second housing are relatively folded, the first housing moves in a direction close to the main shaft, and the second housing moves in a direction close to the main shaft. That is, the inward pulling movement of the housing in the process of changing the flattened state to the closed state of the folding apparatus and the outward pushing movement of the housing in the process of changing the closed state of the folding apparatus to the flattened state can be realized, so that the folding apparatus is in the process of unfolding or folding, A deformation movement using the flexible display as a neutral surface can be implemented, thereby reducing a risk of pulling or squeezing the flexible display, so that the flexible display maintains a constant length, so as to protect the flexible display, improve reliability of the flexible display, and make the flexible display and the electronic device have a long service life.

In a possible implementation, the main shaft includes an inner shaft and an outer shaft, and the outer shaft is fixedly connected to the inner shaft. The inner shaft includes a first arc-shaped projection and a second arc-shaped projection, the outer shaft includes a first arc-shaped groove and a second arc-shaped groove, the rotating end of the first transmission arm is arc-shaped and is rotatably connected with the first arc-shaped projection and the first arc-shaped groove, and the rotating end of the second transmission arm is arc-shaped and is rotatably connected to the second arc-shaped projection and the second arc-shaped groove.

In this implementation, the first transmission arm is connected to the main shaft and the second transmission arm is connected to the main shaft by using a virtual shaft. The rotating connection structure is simple, occupies small space, helps reduce a thickness of the rotating mechanism, and makes it easier for the folding apparatus and the electronic device to be lighter and thinner.

In a possible implementation, the main shaft includes an inner shaft and an outer shaft fastened to the inner shaft. When the first housing and the second housing are folded relative to each other to the closed state, the inner shaft is located between the outer shaft, and the first fixed bracket and the second fixed bracket. The first transmission arm rotates around the first rotation center, the first rotation center is close to the inner shaft and away from the outer shaft, and the first rotation center is close to the second fixed bracket and away from the first fixed bracket. The second transmission arm rotates around the second rotation center, the second rotation center is close to the inner shaft and away from the outer shaft, and the second rotation center is close to the first fixed bracket and away from the second fixed bracket.

In this implementation, locations of the first rotation center and the second rotation center are set, so that the rotating mechanism can more easily implement pulling-in of the housing when the folding apparatus is switched from the flattened state to the closed state and pushing-out of the housing when the folding apparatus is switched from the closed state to the flattened state, to implement deformation by using the flexible display as a neutral surface.

In addition, the inner shaft and the outer shaft are both provided with a plurality of three-dimensional space structures, and through the design of these structures, the inner shaft and the outer shaft can form a plurality of movable spaces together after being assembled, and the structural parts of the rotating mechanism are movably installed on the plurality of movable spaces of the main shaft, thereby realizing the connection with the main shaft. The split design of the inner shaft and the outer shaft is beneficial to reducing the manufacturing difficulty of the main shaft and improving the manufacturing precision and product yield of the main shaft.

In a possible implementation, the rotating end of the first transmission arm may further include a limiting protrusion, and the limiting protrusion forms an inner position and/or an outer position of the rotating end. The limiting protrusion is configured to cooperate with the limiting groove of the main shaft, so that the first transmission arm and the main shaft implement mutual limiting in the axial direction of the main shaft, so as to improve reliability of the connection structure.

In a possible implementation, the first rotating arm is connected to the first connecting piece by using a second rotating shaft, the inner shaft and the outer shaft are enclosed to form an arc-shaped groove, and the second rotating shaft and the arc-shaped groove are slidably matched, so as to limit a movement track of the second rotating shaft, so that the first rotating arm can move in the main shaft only by using a predetermined track.

In a possible implementation, the second fixed bracket includes a first sliding groove, and the first fixed bracket includes a second sliding groove. That the sliding end of the first transmission arm is slidably connected to the second fixed bracket specifically includes: the sliding end of the first transmission arm is slidably connected to the first sliding groove, and that the sliding end of the first transmission arm slides relative to the first sliding groove in a process in which the electronic device switches from a flattened state to a folded state. That the sliding end of the second transmission arm is slidably connected to the first fixed bracket specifically includes: the sliding end of the second transmission arm is slidably connected to the second sliding groove, and that the sliding end of the second transmission arm slides relative to the second sliding groove in a process in which the electronic device changes from a flattened state to a folded state.

In a possible implementation, there may be a recessed guide space on a side wall of the first sliding groove. The sliding end of the first transmission arm is mounted in the first sliding groove, so that the sliding end of the first transmission arm is slidably connected to the second fixed bracket. The sliding end of the first transmission arm includes a first flange located on a circumferential side. The first flange is mounted in the guide space of the first sliding groove. In this implementation, the guide space of the first sliding groove cooperates with the first flange of the first transmission arm, so that the sliding end of the first transmission arm can be guided in a sliding direction of the first sliding groove. In this way, a relative sliding action between the first transmission arm and the second fixed bracket is easier to implement and control precision is higher.

In a possible implementation, there may be a recessed guide space on a side wall of the second sliding groove. The sliding end of the second transmission arm is installed on the second sliding groove, so as to slide and connect the first fixed bracket. The sliding end of the second drive arm includes a second flange on the peripheral side. The second flange is installed in the guide space of the second sliding groove. In this implementation, the guide space of the second sliding groove cooperates with the second flange of the second transmission arm, so that the sliding end of the second transmission arm can be guided to the sliding direction of the second sliding groove. The relative sliding action between the second transmission arm and the first fixed bracket is easier to realize and the control precision is higher.

In a possible implementation, the first transmission arm further includes a first limiting component, and the second transmission arm further includes a second limiting component. The first limiting component is disposed at the sliding end of the first transmission arm, and the second limiting component is disposed at the sliding end of the second transmission arm. The side wall of the first sliding groove is provided with a first convex part and a first concave part spaced from each other, and the side wall of the second sliding groove is provided with a second convex part and a second concave part spaced from each other. The first limiting component includes a second elastic part, and the second limiting component includes a third elastic part. The sliding end of the first transmission arm slides relative to the first sliding groove to a first location, the first limiting component cooperates with the first convex part, and the compression amount of the second elastic part is the fifth compression amount. The sliding end of the first transmission arm slides relative to the first sliding groove to a second location, the first limiting component cooperates with the first concave part, and a compression amount of the second elastic part is a sixth compression amount, where the fifth compression amount is greater than the sixth compression amount. The sliding end of the second transmission arm slides relative to the second sliding groove to a third location, the second limiting component cooperates with the second convex part, and a compression amount of the third elastic part is a seventh compression amount. The sliding end of the second transmission arm slides relative to the second sliding groove to a fourth location, the second limiting component cooperates with the second concave part, and a compression amount of the third elastic part is an eighth compression amount, where the seventh compression amount is greater than the eighth compression amount.

In this implementation, through cooperation between the first limiting component and the first convex part and the first concave part of the first sliding groove, and cooperation between the second limiting component and the second convex part and the second concave part of the second sliding groove, torque that hinders relative rotation of the housing may be provided, so as to improve hand feeling for the electronic device in a folding process. In addition, the first limiting component is configured to define a position relationship between the first transmission arm and the second fixed bracket, and the second limiting component is configured to define a position relationship between the second transmission arm and the first fixed bracket, so that the first transmission arm and the second fixed bracket can maintain a preset relative position relationship without a large external force. The second transmission arm and the first fixed bracket can maintain a preset relative position relationship without a large external force, the folding apparatus can stay at a preset angle, and the folding apparatus can maintain a flattened state or a closed state, so as to improve user experience of the folding apparatus and the electronic device.

In a possible implementation, a sliding end of the first transmission arm has a second mounting groove, and the first limiting component is installed in the second mounting groove. The first limiting component includes a second bracket and a second elastic part, the second bracket includes a control component and a holding part, one end of the second elastic part is mounted on the control component of the second bracket, the other end of the second elastic part is abutted against the groove wall of the second mounting groove, and the holding part of the second bracket is clamped to the second fixed bracket. Because the second elastic part of the first limiting component can be deformed under the action of an external force, the first limiting component can smoothly move between the first convex part and the first concave part relative to the second fixed bracket, so as to improve limiting reliability between the first transmission arm and the second fixed bracket.

In some implementations, the first limiting component may further include a first cushion part, and the first cushion part is mounted on the abutting component of the second bracket. The first cushion part may be made of a material (for example, rubber) with small stiffness, so that when being subject to an external force, the first cushion part can absorb an impact force through deformation, thereby implementing cushion. In the first limiting component, the first cushion part is disposed to cushion stress between the abutting component and the second fixed bracket, to improve reliability of a limiting structure.

In a possible implementation, the first transmission arm further includes a first limiting component, and the second transmission arm further includes a second limiting component. The first limiting component is disposed at the sliding end of the first transmission arm, and the second limiting component is disposed at the sliding end of the second transmission arm. The side wall of the first sliding groove is provided with a first convex part and a first concave part spaced from each other, and the side wall of the second sliding groove is provided with a second convex part and a second concave part spaced from each other. The first convex part includes a second elastic part, and the second convex part includes a third elastic part. The sliding end of the first transmission arm slides relative to the first sliding groove to a first location, the first limiting component cooperates with the first convex part, and the compression amount of the second elastic part is the fifth compression amount. The sliding end of the first transmission arm slides relative to the first sliding groove to a second location, the first limiting component cooperates with the first concave part, and a compression amount of the second elastic part is a sixth compression amount, where the fifth compression amount is greater than the sixth compression amount. The sliding end of the second transmission arm slides relative to the second sliding groove to a third location, the second limiting component cooperates with the second convex part, and a compression amount of the third elastic part is a seventh compression amount. The sliding end of the second transmission arm slides relative to the second sliding groove to a fourth location, the second limiting component cooperates with the second concave part, and a compression amount of the third elastic part is an eighth compression amount, where the seventh compression amount is greater than the eighth compression amount.

In this implementation, through cooperation between the first limiting component and the first convex part and the first concave part of the first sliding groove, and cooperation between the second limiting component and the second convex part and the second concave part of the second sliding groove, torque that hinders relative rotation of the housing may be provided, so as to improve hand feeling for the electronic device in a folding process.

In a possible implementation, the folding apparatus further includes a synchronization component. The synchronization component includes a first synchronization swing arm, a second synchronization swing arm, a first gear, and a second gear. The first gear is arranged on the main shaft, and the first gear is rotatably connected to the main shaft. The second gear is arranged on the main shaft, and the second gear is rotatably connected to the main shaft. The first gear meshes with the second gear. The first synchronization swing arm includes a sliding end and a rotating end, the rotating end of the first synchronization swing arm is rotatably connected to the main shaft, the rotating end of the first synchronization swing arm is engaged with the first gear, and the sliding end of the first synchronization swing arm is slidably connected to the first fixed bracket. The second synchronization swing arm includes a sliding end and a rotating end, the rotating end of the second synchronization swing arm is rotatably connected to the main shaft, the rotating end of the second synchronization swing arm is engaged with the second gear, and the sliding end of the second synchronization swing arm is slidably connected to the second fixed bracket.

In this implementation, because the rotating end of the first synchronization swing arm and the rotating end of the second synchronization swing arm are both rotatably connected to the main shaft, the sliding end of the first synchronization swing arm is slidably connected to the first fixed bracket, and the sliding end of the second synchronization swing arm is slidably connected to the second fixed bracket. Therefore, in a process in which the first housing and the second housing are relatively unfolded or folded, the first synchronization swing arm and the second synchronization swing arm can control the rotation angles of the first fixed bracket and the second fixed bracket relative to the main shaft to be consistent, so that the rotation actions of the first housing and the second housing are synchronous and consistent. The folding action and the unfolding action of the folding apparatus have better symmetry, which is beneficial to improving the use experience of the user.

The first synchronization swing arm is rotatably connected to the main shaft and slidably connected to the first fixed bracket, that is, a connecting rod slider structure is formed. The second synchronization swing arm is rotatably connected with the main shaft and slidably connected with the second fixed bracket, that is, the connecting rod slider structure is formed. The two link-slider structures that are engaged with each other can effectively control the rotation actions of the first housing and the second housing to be synchronous and consistent.

In this implementation, because the rotating end of the first synchronization swing arm, the first gear, and the second gear are sequentially meshed with the rotating end of the second synchronization swing arm. Therefore, the synchronous assembly formed by the first synchronization swing arm, the second synchronization swing arm, the first gear, and the second gear has a simple structure, is easy to control in a movement process, and has high accuracy.

In a possible implementation, the folding apparatus further includes a first conjoined cam, a second conjoined cam, a fourth elastic part, a snap ring, a snap spring, and a plurality of connecting shafts. The snap ring, the fourth elastic part, the first conjoined cam, the synchronizing assembly, the second conjoined cam and the snap spring are sequentially sleeved on the plurality of connecting shafts. A first concave surface and a first convex surface are arranged on the first conjoined cam, and a second concave surface and a second convex surface are arranged on a side of the synchronizing component facing the first conjoined cam. A second concave surface and a second convex surface are disposed on a side facing the first conjoined cam of the synchronization component, and at least include: a first synchronization swing arm, or a second synchronization swing arm, or a first gear, or a second concave surface and a second convex surface are disposed on a side facing the first conjoined cam of the second gear.

In a possible implementation, when the first convex surface is matched with the second convex surface, the shape variable of the fourth elastic part is the first shape variable. The first convex surface is matched with the second concave surface, and the shape variable of the fourth elastic part is the second shape variable. The first shape variable is greater than the second shape variable.

In this implementation, a torque that hinders relative rotation of the first housing and the second housing can be provided through cooperation between the several disposed convex surfaces and the concave surfaces, thereby improving hand feeling for the electronic device in a folding process.

In a possible implementation, the folding apparatus further includes a third fixed bracket, a fourth fixed bracket, a third transmission arm, and a fourth transmission arm. The third fixed bracket is fastened to the first housing, and the fourth fixed bracket is fastened to the second housing. The third transmission arm includes a sliding end and a rotating end, the sliding end of the third transmission arm is slidably connected to the third fixed bracket, and the rotating end of the third transmission arm is rotatably connected to the shaft. The fourth transmission arm includes a sliding end and a rotating end, the sliding end of the fourth transmission arm is slidably connected to the fourth fixed bracket, and the rotating end of the fourth transmission arm is rotatably connected to the shaft.

In this implementation, the third fixed bracket, the fourth fixed bracket, the third transmission arm, and the fourth transmission arm are disposed, so that the folding apparatus is easier to fold and expand.

In a possible implementation, the third transmission arm is collinear with a rotation axis of the shaft relative to rotation, and the second transmission arm is collinear with a rotation axis of the shaft relative to rotation. The fourth transmission arm is collinear with the rotation axis of the shaft relative to rotation, and the first transmission arm is collinear with the rotation axis of the shaft relative to rotation.

In this implementation, the rotation axes around which the third transmission arm and the second transmission arm rotate relative to the main shaft are collinear, the third transmission arm is slidably connected to the third fixed bracket, the rotation axes around which the fourth transmission arm and the first transmission arm rotate relative to the main shaft are collinear, and the fourth transmission arm is slidably connected to the fourth fixed bracket. In this way, movement of the third transmission arm can be synchronized with movement of the second transmission arm, and movement of the fourth transmission arm can be synchronized with movement of the first transmission arm, so that a structure design and a connection relationship of the rotating mechanism can be simplified, and reliability of the rotating structure is improved.

In a possible implementation, the rotating mechanism further includes a first supporting plate and a second supporting plate. The first supporting plate is fixedly connected to the sliding end of the second transmission arm, and the second supporting plate is fixedly connected to the sliding end of the first transmission arm. When the first housing and the second housing are unfolded relative to each other to the flattened state, the first supporting plate is flush with the second supporting plate, the first supporting plate is laid between the first fixed bracket and the main shaft, and the second supporting plate is laid between the second fixed bracket and the main shaft. When the first housing and the second housing are folded relative to each other to the closed state, the first supporting plate is stacked on a side that is of the first fixed bracket and that is away from the second fixed bracket, and the second supporting plate is stacked on a side that is of the second fixed bracket and that is away from the first fixed bracket.

In this implementation, when the first housing and the second housing are unfolded relative to each other to the flattened state, the first supporting plate, the main shaft, and the second supporting plate can jointly form a complete planar support for a bending part of the flexible display. When the first housing and second housing are folded relative to each other to the closed state, the first supporting plate and the second supporting plate can slide and be received relative to the first housing and the second housing respectively, so that the main shaft is exposed to form a complete support for the bending part of the flexible display. In other words, when the folding apparatus is in the flattened state or the closed state, the rotating mechanism can fully support the bending part of the flexible display, so that the flexible display is not easily damaged due to an external force touch, thereby helping protect the flexible display and improving user experience.

In a possible implementation, the main shaft has a supporting surface. When the first housing and the second housing are folded relative to each other to the closed state, the supporting surface of the main shaft is exposed relative to the first supporting plate and the second supporting plate. The supporting surface of the main shaft is arc-shaped.

In this implementation, when the first housing and the second housing are folded relative to each other to a closed state, the main shaft can provide a complete-semicircle or nearly-semicircle support effect for the bending part of the flexible display, which is consistent with an ideal closed form of the bending part of the flexible display, so that more optimized support can be provided for the flexible display in the closed form.

In a possible implementation, the rotating mechanism further includes a first shielding plate and a second shielding plate. The first shielding plate is fixedly connected to the sliding end of the first transmission arm, and the second shielding plate is fixedly connected to the sliding end of the second transmission arm. The first shielding plate is located on a side that is of the first transmission arm and that faces away from the first supporting plate, and the second shielding plate is located on a side that is of the second transmission arm and that faces away from the second supporting plate.

When the first housing and the second housing are unfolded relative to each other to the flattened state, the first shielding plate is flush with the second shielding plate, the first shielding plate is laid between the first fixed bracket and the main shaft, and the second shielding plate is laid between the second fixed bracket and the main shaft. When the first housing and the second housing are folded relative to each other to the closed state, the first shielding plate is located between the first fixed bracket and the first housing, and the second shielding plate is located between the second fixed bracket and the second housing.

In this implementation, when the first housing and the second housing are unfolded relative to each other to the flattened state, the first shielding plate is flush with the second shielding plate, the first shielding plate is laid between the first fixed bracket and the main shaft, and can shield a gap between the first fixed bracket and the main shaft, and the second shielding plate is laid between the second fixed bracket and the main shaft, and can shield a gap between the second fixed bracket and the main shaft. Therefore, the folding apparatus can implement self-shielding. In this way, appearance integrity is improved, a risk that dust, sundries, and the like enter the rotating mechanism from outside can also be lowered, to ensure reliability of the folding apparatus. When the first housing and the second housing are folded relative to each other to the closed state, the first shielding plate can be received between the first fixed bracket and the first housing, and the second shielding plate can be received between the second fixed bracket and the second housing, so that avoidance is achieved. In this way, the folding apparatus can be smoothly folded to the closed form, and mechanism reliability is high.

In addition, the first supporting plate and the first shielding plate are fastened to the sliding end of the first transmission arm, and the first supporting plate and the first shielding plate move with the sliding end of the first transmission arm, and the second supporting plate and the second shielding plate are fastened to the sliding end of the second transmission arm, and the second supporting plate and the second shielding plate move with the sliding end of the second transmission arm. Therefore, when the folding apparatus is switched from the closed state to the flattened state or when the folding apparatus is switched from the flattened state to the closed state, the first supporting plate and the second supporting plate gradually approach the main shaft or move away from the main shaft, so that the folding apparatus can completely support the flexible display in various forms. In this way, reliability of the flexible display and the electronic device is improved and service lives of the flexible display and the electronic device are increased. When the folding apparatus is switched from the closed state to the flattened state or when the folding apparatus is switched from the flattened state to the closed state, the first shielding plate and the second shielding plate gradually approach the main shaft or move away from the main shaft, so that the folding apparatus in the various forms can adapt to forms of the rotating mechanism, to implement self-shielding. In this way, mechanism reliability is high.

The first supporting plate, the first shielding plate, and the second transmission arm are assembled into one component, and the second supporting plate, the second shielding plate, and the first transmission arm are assembled into one component. Therefore, the second transmission arm can directly control motion tracks of the first supporting plate and the first shielding plate, and the first transmission arm can directly control motion tracks of the second supporting plate and the second shielding plate. In this way, precision is high in controlling movement processes of the first supporting plate, the second supporting plate, the first shielding plate, and the second shielding plate, and hysteresis is small, to implement accurately extending or retracting when the folding apparatus is rotated, so as to meet a requirement of supporting the flexible display and a self-shielding requirement of the rotating mechanism.

In a possible implementation, the main shaft has a shielding surface. When the first housing and the second housing are unfolded relative to each other to the flattened state, the shielding surface of the main shaft is exposed relative to the first shielding plate and the second shielding plate. Therefore, the first shielding plate, the main shaft, and the second shielding plate can jointly shield a gap between the first housing and the second housing, so that the rotating mechanism can implement self-shielding in the flattened state.

In a possible implementation, the main shaft further includes a shielding plate, and the shielding plate is fastened to a side that is of the main inner shaft and that is away from the main outer shaft. The shielding surface of the main shaft is formed on the shielding plate, and is disposed away from the main outer shaft. In some implementations, the shielding plate may be mutually fastened to the main inner shaft in an assembly manner. In some other implementations, the shielding plate and the main inner shaft may alternatively be an integrally formed mechanical part.

According to a second aspect, this application provides an electronic device, including a flexible display and the folding apparatus according to any one of the foregoing implementations. The flexible display includes a first non-bending part, a bending part, and a second non-bending part that are sequentially arranged, the first non-bending part is fastened to a first housing, and the second non-bending part is fastened to the second housing. In a process of folding or unfolding the first housing relative to the second housing, the bending part is deformed.

According to a third aspect, this application provides an electronic device, including a flexible display, a first housing, a second housing, a first elastic component, and a shaft. The flexible display includes a first non-bending part, a bending part, and a second non-bending part that are sequentially arranged. The first housing and the second housing are respectively located on two sides of the shaft. The first housing is fixedly connected to the first non-bending part of the flexible display, and the second housing is fixedly connected to the second non-bending part of the flexible display. The first elastic component is located between the shaft and the first housing, the first elastic component is rotatably connected to the shaft by using the first rotating shaft, the first elastic component abuts against the first mechanical part of the shaft, and the first elastic component is fixedly connected to the first housing. When the electronic device is in a flattened state, a first elastic component abuts against a first portion of the first mechanical part, a distance between an axis of the first rotating shaft and the first portion is a first distance, and a projection length of the first distance on a first plane is a first projection length, where the first plane is a plane on which the first housing is fixedly connected to the first non-bending part. The first housing rotates relative to the shaft, the second housing rotates relative to the shaft, and the electronic device changes from the flattened state to the folded state. When the electronic device is in a folded state, the first elastic component abuts against a second portion of the first mechanical part, a distance between an axis of the first rotating shaft and the second portion is a second distance, a projection length of the second distance on the first plane is a second projection length, and the second projection length is less than the first projection length. The first portion is different from the second portion.

In a possible implementation, when the electronic device is in a flattened state, a compression amount of the first elastic component in a first direction is a first compression amount, where the first direction is perpendicular to a length extension direction of the shaft, and the first direction is parallel to the first housing. When the electronic device is in the folded state, a compression amount of the first elastic component in the first direction is a second compression amount, and the second compression amount is less than the first compression amount.

Based on a same invention concept, for a problem-resolving principle and beneficial effects of another part structure of the electronic device, for example, a rotating structure for implementing rotation, a main shaft structure, and a limiter, refer to the first aspect, the possible implementations of the first aspect, and the beneficial effects brought by the first aspect. Therefore, for possible implementations of the electronic device, refer to the first aspect and the possible implementations of the first aspect. Repeated parts are not described again.

According to a fourth aspect, this application provides a folding apparatus. The folding apparatus may be applied to an electronic device, and the folding apparatus is configured to bear a flexible display of the electronic device. The flexible display includes a first non-bending part, a bending part, and a second non-bending part that are sequentially arranged. The folding apparatus includes a first housing, a second housing, a first elastic component, and a shaft. The first housing and the second housing are respectively located on two sides of the shaft. The first housing is fixedly connected to the first non-bending part of the flexible display, and the second housing is fixedly connected to the second non-bending part of the flexible display. The first elastic component is located between the shaft and the first housing, the first elastic component is rotatably connected to the shaft by using the first rotating shaft, the first elastic component abuts against the first mechanical part of the shaft, and the first elastic component is fixedly connected to the first housing. When the electronic device is in a flattened state, a first elastic component abuts against a first portion of the first mechanical part, a distance between an axis of the first rotating shaft and the first portion is a first distance, and a projection length of the first distance on a first plane is a first projection length, where the first plane is a plane on which a surface on which the first housing is fixedly connected to the first non-bending part is located. The first housing rotates relative to the shaft, the second housing rotates relative to the shaft, and the electronic device changes from a flattened state to a folded state. When the electronic device is in the folded state, the first elastic component abuts against a second portion of the first mechanical part, a distance between the axis of the first rotating shaft and the second portion is a second distance, and a projection length of the second distance on the first plane is a second projection length, where the second projection length is less than the first projection length. The first portion is different from the second portion.

In a possible implementation, when the electronic device is in a flattened state, a compression amount of the first elastic component in a first direction is a first compression amount, where the first direction is perpendicular to a length extension direction of the shaft, and the first direction is parallel to the first housing. When the electronic device is in the folded state, a compression amount of the first elastic component in the first direction is a second compression amount, and the second compression amount is less than the first compression amount.

Based on a same invention concept, for a problem-resolving principle and beneficial effects of another part structure of the folding apparatus, for example, a rotating structure for implementing rotation, a main shaft structure, and a stopper, refer to the first aspect, the possible implementations of the first aspect, and the beneficial effects brought by the first aspect. Therefore, for possible implementations of the electronic device, refer to the first aspect and the possible implementations of the first aspect. Repeated parts are not described again.

In this application, the flexible display can be unfolded or folded with the folding apparatus. When the electronic device is in a flattened state, the flexible display is in a flattened form, and can perform full-screen display, so that the electronic device has a large display area, to improve viewing experience of a user. When the electronic device is in a closed state, a planar size of the electronic device is small, so that it is convenient for a user to carry and place the electronic device.

The electronic device uses a structural design of the first elastic component and the second elastic component, so that when the electronic device is unfolded from a folded state to a flattened state, the flexible display is subject to a force away from a main shaft direction, thereby accelerating crease recovery of the flexible display, improving flatness of the flexible display, and further improving user experience.

DETAILED DESCRIPTION OF ILLUSTRATIVE EMBODIMENTS

Figure 1:
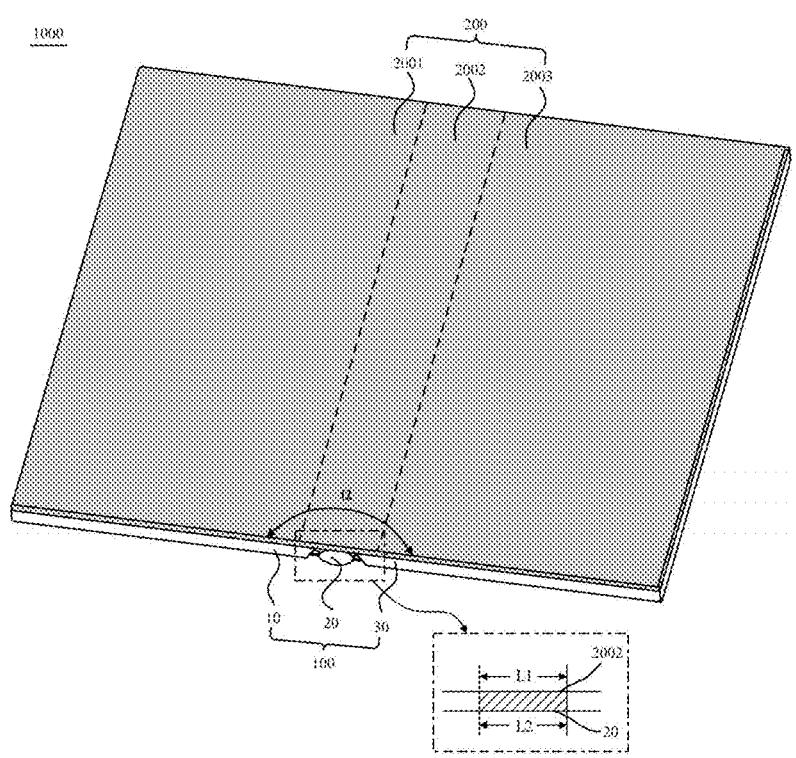
FIG. 1 is a schematic diagram of a structure of an electronic device in a flattened state according to an embodiment of this application.

The following describes technical solutions of this application with reference to the accompanying drawings. It is clear that the described embodiments are merely some but not all of embodiments of this application.

In the descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

Terms such as "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features.

In addition, in this application, directional terms such as "center", "front", "back", "inside", and "outside" are defined relative to directions or positions of components schematically placed in the accompanying drawings. It should be understood that these directional terms are relative concepts and are used for relative description and clarification, and are not used to indicate or imply that an indicated apparatus or component needs to have a specified direction or be constructed and operated in a specified direction. The terms may change accordingly with directions in which components in the accompanying drawings are placed, and therefore cannot be construed as a limitation of this application.

It should be further noted that in the embodiments of this application, a same reference numeral indicates a same component or a same part. For same parts in the embodiments of this application, only one part or component marked with a reference numeral may be used as an example in the figure. It should be understood that the reference numeral is also applicable to another same part or component.

Embodiments of this application provide a folding apparatus and an electronic device. The electronic device includes a folding apparatus and a flexible display fastened to the folding apparatus. The folding apparatus may be unfolded to a flattened state (also referred to as an unfolded state), or may be folded to a closed state (also referred to as a folded state), or may be in an intermediate state between a flattened state and a closed state. The flexible display is unfolded and folded with the folding apparatus. The flexible display is a multi-layer structure, and each layer generates deformation of different degrees when bending. When the electronic device is unfolded from a closed state to a flattened state, the deformation generated by the flexible display needs recovery time, thereby causing creases in the middle of the flexible display. Therefore, flatness of the flexible display is reduced, and user experience is affected. According to the folding apparatus and the electronic device provided in the embodiments of this application, a crease of the flexible display can be alleviated, flatness of the flexible display can be improved, and user experience can be improved.

Figure 2:
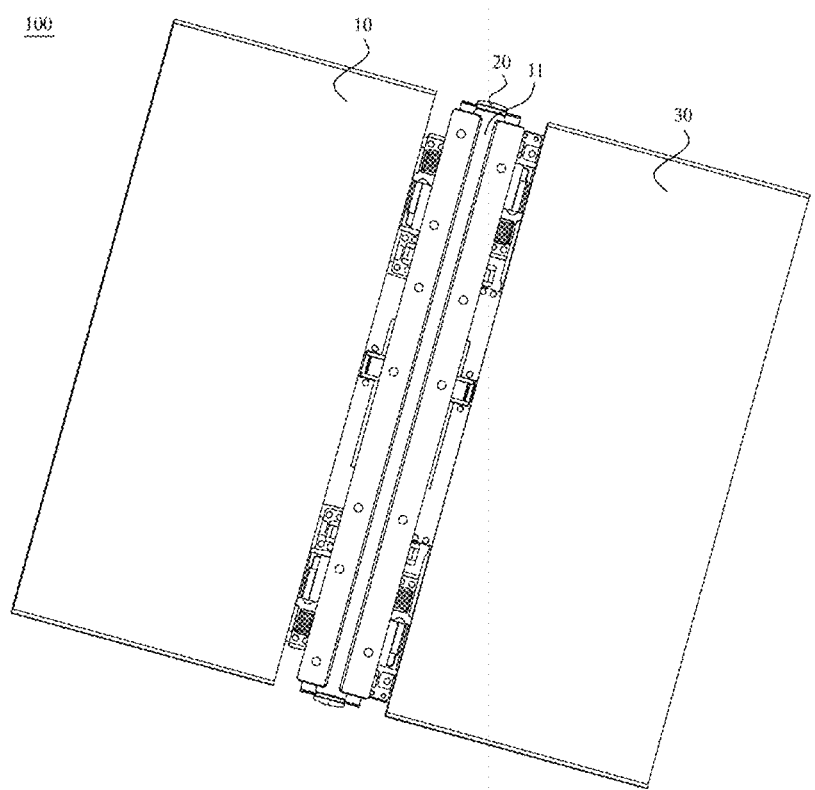
FIG. 2 is a schematic diagram of a structure of a folding apparatus of the electronic device shown in FIG. 1.
Figure 3:
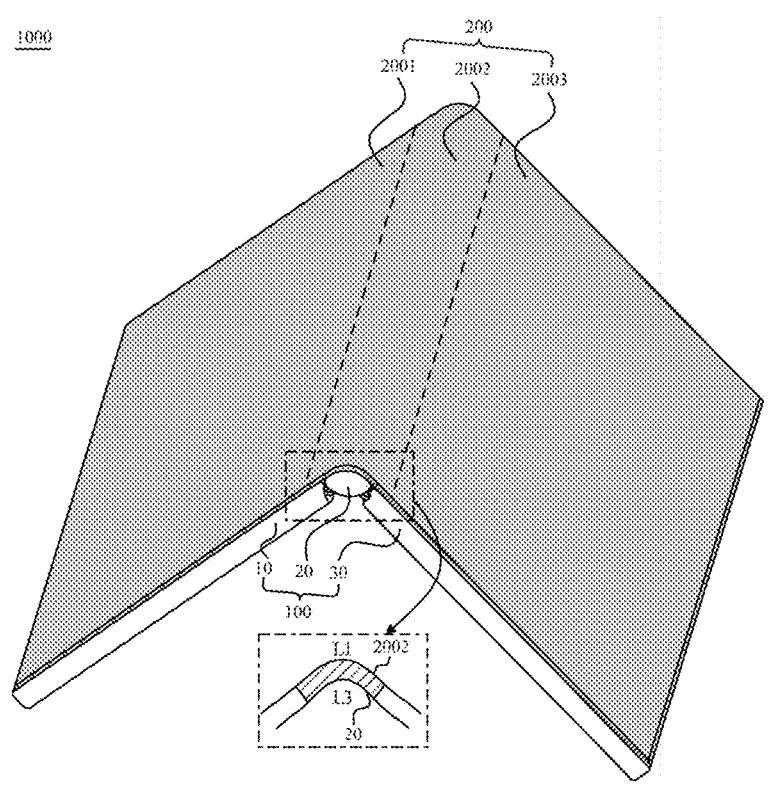
FIG. 3 is a schematic diagram of a structure of the electronic device shown in FIG. 1 in an intermediate state.
Figure 4:
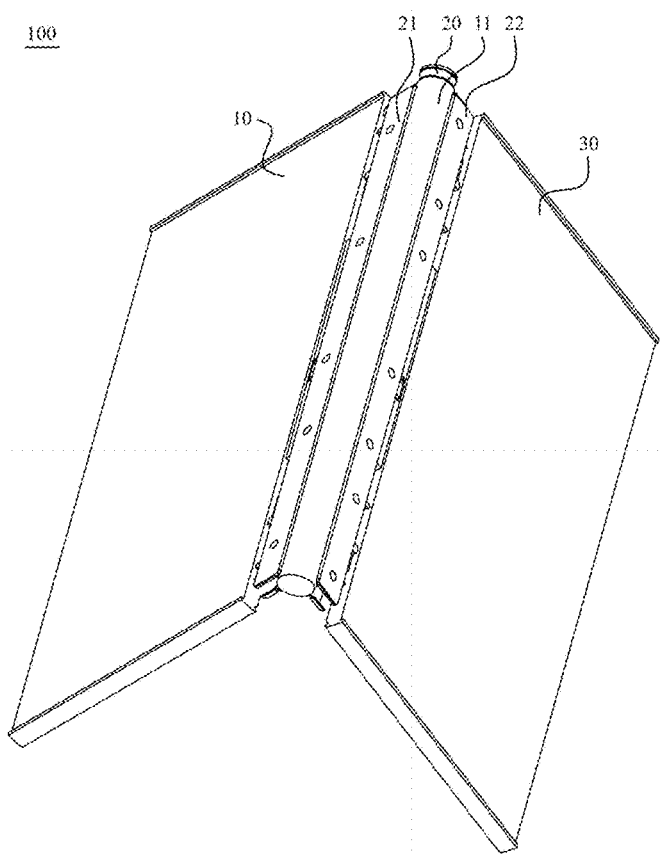
FIG. 4 is a schematic diagram of a structure of a folding apparatus of the electronic device shown in FIG. 3.
Figure 5:
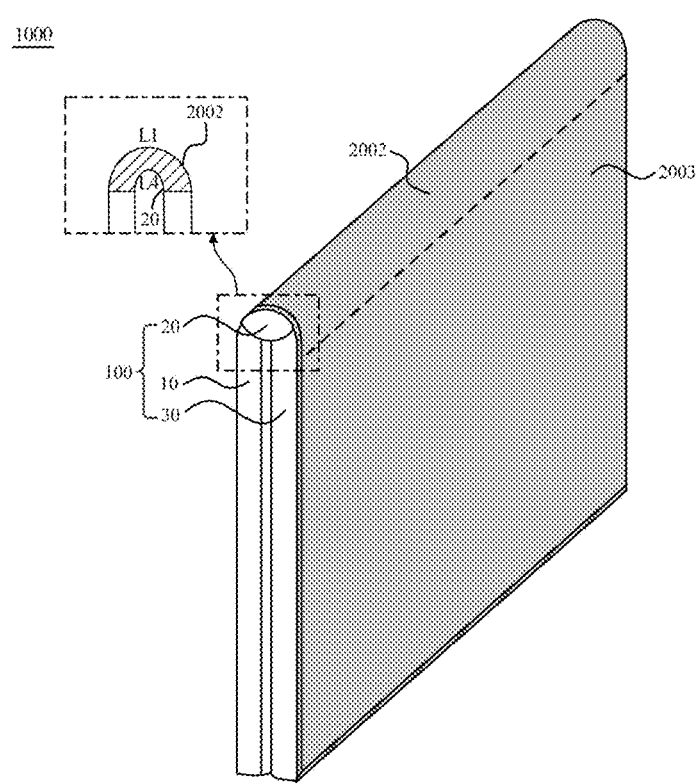
FIG. 5 is a schematic diagram of a structure of the electronic device shown in FIG. 1 in a closed state.
Figure 6:
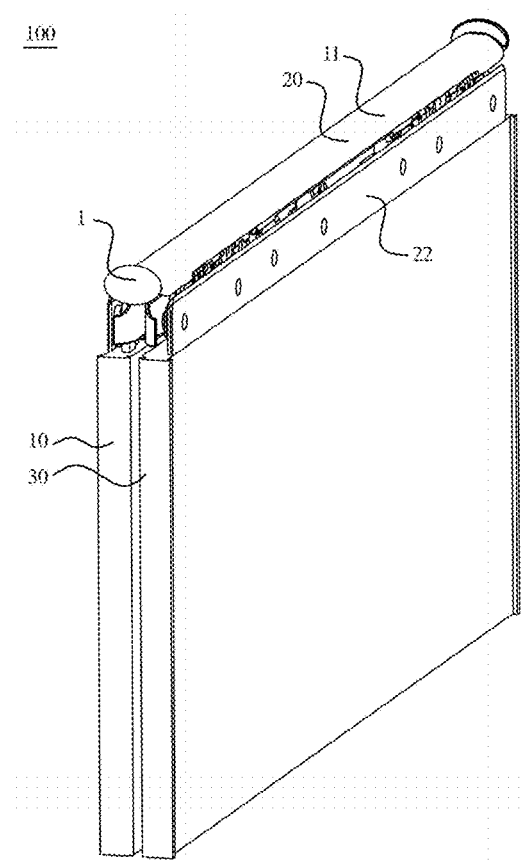
FIG. 6 is a schematic diagram of a structure of a folding apparatus of the electronic device shown in FIG. 5.

Refer to FIG. 1 to FIG. 6. FIG. 1 is a schematic diagram of a structure of an electronic device 1000 in a flattened state according to an embodiment of this application. FIG. 2 is a schematic diagram of a structure of a folding apparatus 100 of the electronic device 1000 shown in FIG. 1 in a flattened state. FIG. 3 is a schematic diagram of a structure of the electronic device 1000 shown in FIG. 1 in an intermediate state. FIG. 4 is a schematic diagram of a structure of the folding apparatus 100 of the electronic device 1000 shown in FIG. 3 in an intermediate state. FIG. 5 is a schematic diagram of a structure of the electronic device 1000 shown in FIG. 1 in a closed state. FIG. 6 is a schematic diagram of a structure of a folding apparatus 100 of the electronic device 1000 shown in FIG. 5 in a closed state. The electronic device 1000 may be a product such as a mobile phone, a tablet computer, or a notebook computer. This embodiment is described by using an example in which the electronic device 1000 is a mobile phone.

The electronic device 1000 includes a folding apparatus 100 and a flexible display 200. The folding apparatus 100 includes a first housing 10, a rotating mechanism 20, and a second housing 30 that are sequentially connected. The first housing 10 may include a middle frame and a rear cover, and the second housing 30 may include a middle frame and a rear cover. The rotating mechanism 20 can be deformed, so that the first housing 10 and the second housing 30 rotate around the rotating mechanism 20, and the electronic device 1000 is in a flattened state, an intermediate state, or a closed state. As shown in FIG. 1 and FIG. 2, the first housing 10 and the second housing 30 can be unfolded relative to each other to a flattened state, so that the electronic device 1000 is in a flattened state. For example, when the first housing 10 and the second housing 30 are in the flattened state, the included angle α may be approximately 180 degrees (a slight deviation, such as 165°, 177°, or 185°, is allowed). As shown in FIG. 3 and FIG. 4, the first housing 10 and the second housing 30 can be rotated (unfolded or folded) relative to each other to an intermediate state, so that the electronic device 1000 is in an intermediate state. As shown in FIG. 5 and FIG. 6, the first housing 10 and the second housing 30 can be folded relative to each other to a closed state, so that the electronic device 1000 is in a closed state. For example, when the first housing 10 and the second housing 30 are in a closed state, they can be substantially fully closed to be parallel to each other (with a slight deviation allowed). The intermediate state shown in FIG. 3 and FIG. 4 may be any state between the flattened state and the closed state. Therefore, the electronic device 1000 may be switched between the flattened state and the closed state through deformation of the rotating mechanism 20.

The flexible display 200 is fastened to the folding apparatus 100, so that the flexible display 200 can be unfolded or folded with the folding apparatus 100. For example, the flexible display 200 may be bonded to the folding apparatus 100 by using an adhesive layer. The flexible display 200 includes a first non-bending part 2001, a bending part 2002, and a second non-bending part 2003 that are sequentially arranged. The first non-bending part 2001 of the flexible display 200 is fastened to the first housing 10, and the second non-bending part 2003 is fastened to the second housing 30. When the first housing 10 and the second housing 30 are folded or unfolded relative to each other, the bending part 2002 deforms. As shown in FIG. 1, when the first housing 10 and the second housing 30 are in a flattened state, the flexible display 200 is in a flattened state, and can perform full-screen display, so that the electronic device 1000 has a relatively large display area, so as to improve viewing experience of the user. As shown in FIG. 3, when the first housing 10 and the second housing 30 are in an intermediate state, the flexible display 200 is in an intermediate state between a flattened form and a closed form. As shown in FIG. 5, when the first housing 10 and the second housing 30 are in a closed state, the flexible display 200 is in a closed state. When the electronic device 1000 is in the closed state, the flexible display 200 is located on an outer side of the folding apparatus 100, and the flexible display 200 may be roughly in a U shape. When the electronic device 1000 is in a closed state, a plane size of the electronic device 1000 is relatively small, which is convenient for a user to carry and store.

FIG. 1, FIG. 3, and FIG. 5 are schematic diagrams of deformation of the rotating mechanism 20 in a process in which the electronic device 100 is relatively folded from a flattened state to a closed state. As shown in FIG. 1, when the electronic device 1000 is in a flattened state, a length of the bending part 2002 of the flexible display 200 is a first length L1, a length of the rotating mechanism 20 is a second length L2, and the first length L1 is equal to the second length L2. As shown in FIG. 3, when the electronic device 1000 is in an intermediate state, the length of the bending part 2002 of the flexible display 200 is still the first length L1, and the rotating mechanism 20 is deformed, and the length changes to the third length L3, where the third length L3 is less than the second length L2. As shown in FIG. 5, when the electronic device 1000 is in the closed state, the length of the bending part 2002 of the flexible display 200 is still the first length L1, and the rotating mechanism 20 is deformed, and the length changes to the fourth length L4, where the fourth length L4 is less than the third length L3. Therefore, in a process of unfolding or folding the electronic device 1000, the flexible display 200 can maintain a constant length through deformation of the rotating mechanism 20, thereby reducing a risk of pulling or squeezing the flexible display, improving reliability of the flexible display, and enabling the flexible display and the electronic device to have a long service life.

In some embodiments, the flexible display 200 is configured to display an image. For example, the flexible display 200 may be an organic light emitting diode (Organic Light-Emitting Diode, OLED) display, an active matrix organic light emitting diode (Active-Matrix Organic Light-Emitting Diode, AMOLED) display, a mini light emitting diode (Mini Organic Light-Emitting Diode) display, a micro light emitting diode (Micro Organic Light-Emitting Diode) display, a micro organic light emitting diode (Micro Organic Light-Emitting Diode) display, and a quantum dot light emitting diode (Quantum Dot Light Emitting Diodes, QLED) display.

The flexible display 200 has a multi-layer structure, for example, including a first electrode layer, a thin dielectric layer, and a second electrode layer. The layers are bonded, for example, by using optical clear adhesive (Optically Clear Adhesive, OCA), where the OCA optical adhesive has elasticity. When the flexible display 200 is folded, because material tension of each layer is accumulated, a great tension opposite to a bending direction of the flexible display is generated, and different layers of the flexible display 200 are deformed to different degrees. When the flexible display 200 is unfolded from the closed state to the flattened state, because the deformation generated by the screen requires a recovery time, a crease appears at the position of the bending part 2002. Therefore, flatness of the flexible display is reduced, and user experience is affected. When the flexible display 200 is repeatedly folded, deformation generated on the screen is difficult to recover, and a screen crease problem becomes more serious.

It should be understood that, the crease in this embodiment of this application is a trace that remains on the flexible display after the flexible display is bent and unfolded, and the bending trace does not disappear. An area in which the crease is located is a bending area of the flexible display.

In some embodiments, the electronic device 1000 may further include a plurality of modules (not shown in the figure), and the plurality of modules may be accommodated inside the folding apparatus 100. The plurality of modules of the electronic device 1000 may include but are not limited to a mainboard, a processor, a memory, a battery, a camera module, an earpiece module, a speaker module, a microphone module, an antenna module, a sensor module, and the like. A quantity, a type, a location, and the like of the modules of the electronic device 1000 are not specifically limited in this embodiment of this application.

It may be understood that when the user holds the electronic device 1000, a location of the earpiece module of the electronic device 1000 may be defined as an upper edge of the electronic device 1000, and a location of the microphone module of the electronic device 1000 may be defined as a lower edge of the electronic device 1000. Two sides of the electronic device 1000 that are held by the left and right hands of the user may be defined as left and right sides of the electronic device 1000. In some embodiments, the electronic device 1000 can implement left-right folding. In some other embodiments, the electronic device 1000 can be folded up and down in half.

Figure 7:
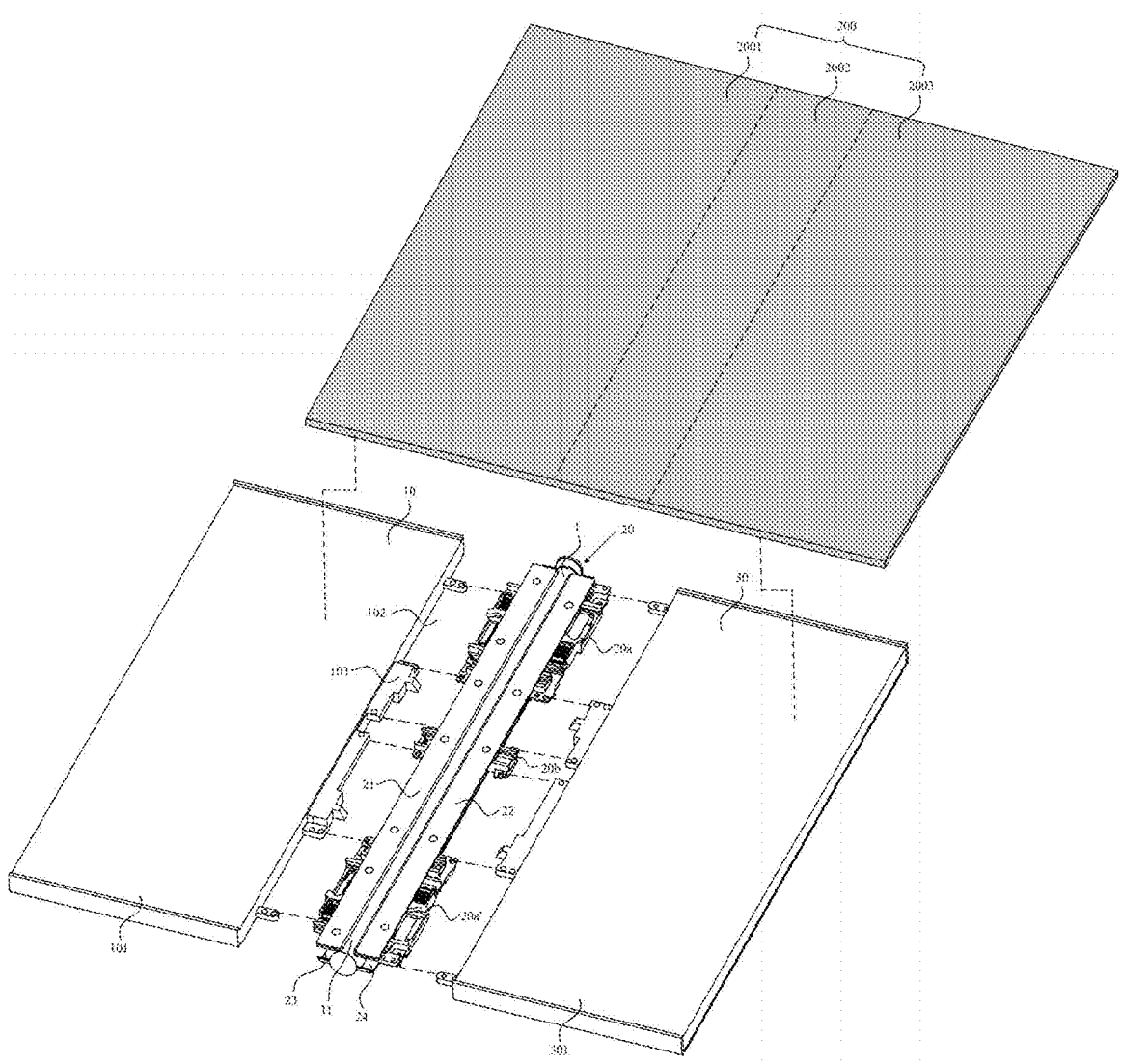
FIG. 7 is a schematic exploded view of a partial structure of the folding apparatus shown in FIG. 2.
Figure 8:
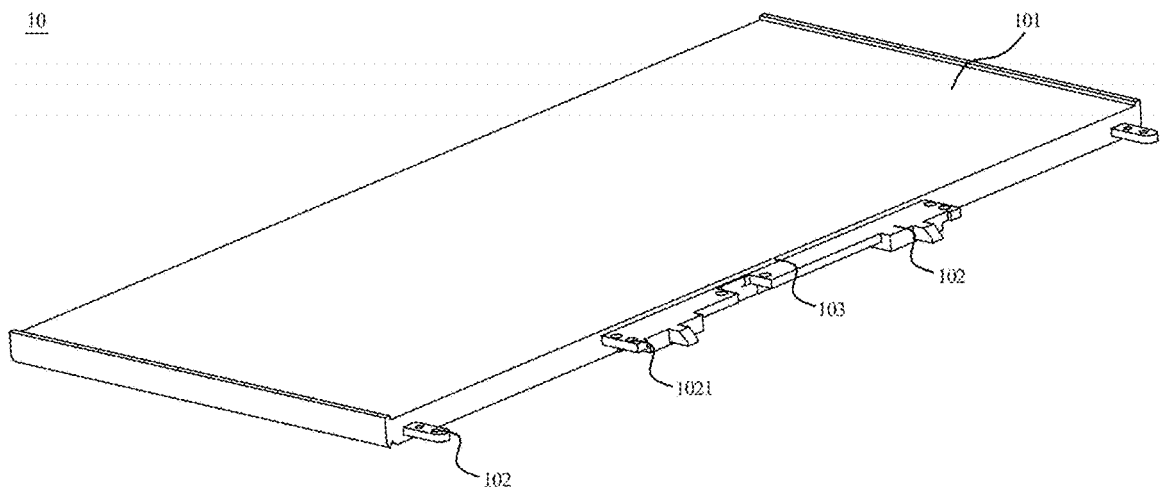
FIG. 8 is a schematic diagram of a structure of a first housing shown in FIG. 7.
Figure 9:
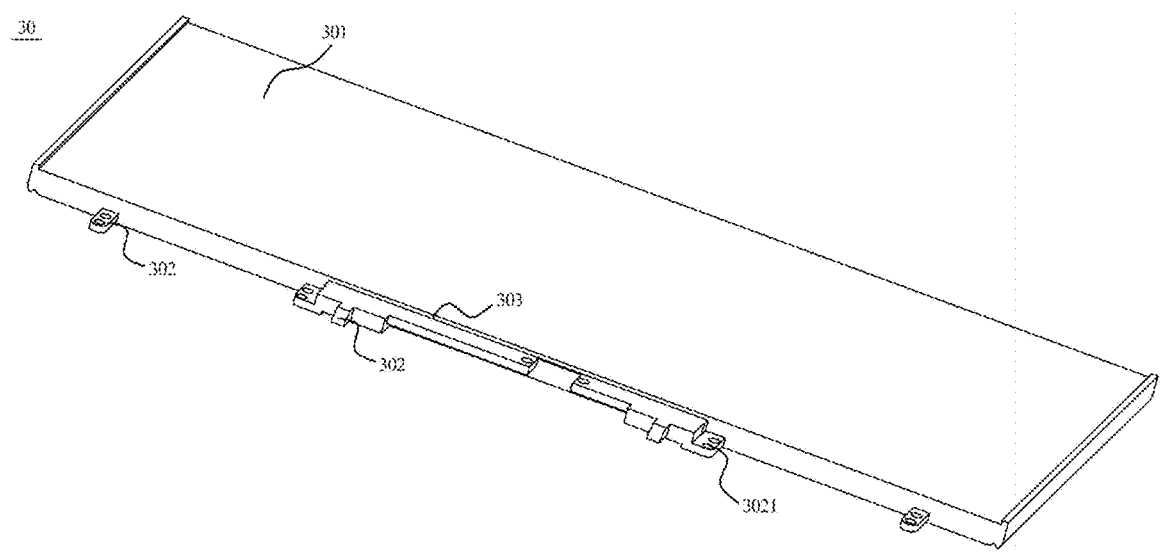
FIG. 9 is a schematic diagram of a structure of a second housing shown in FIG. 7.
Figure 10:
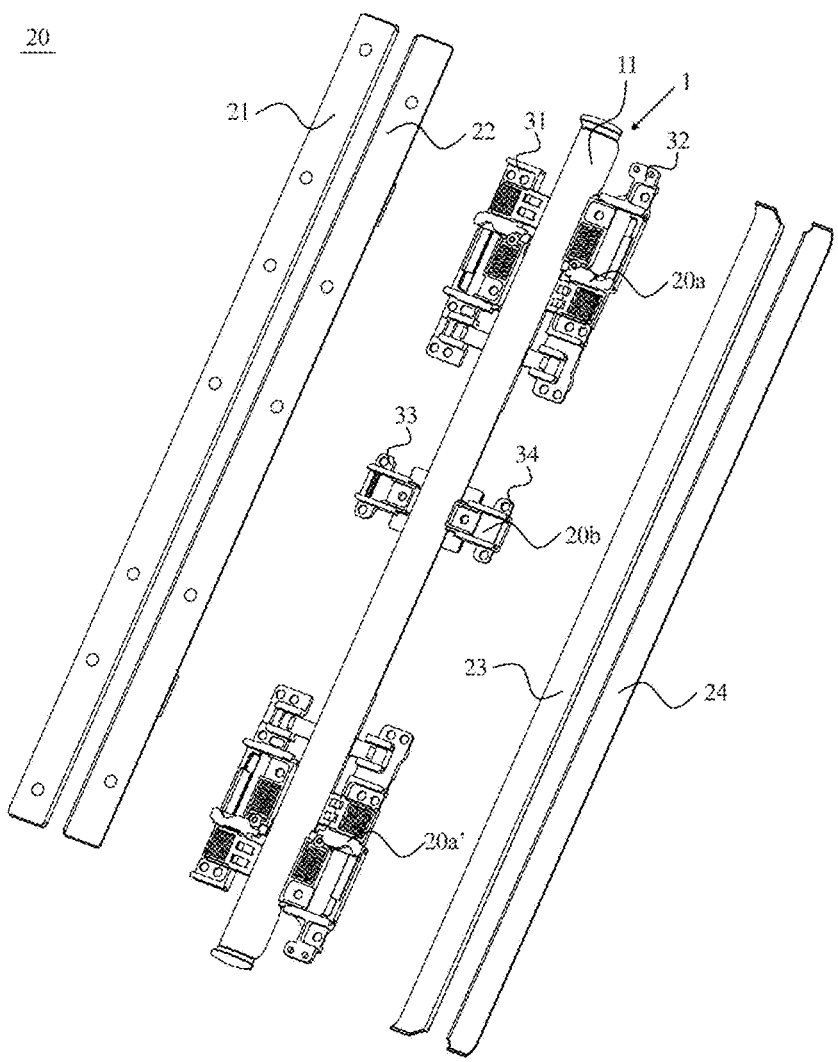
FIG. 10 is a schematic exploded view of a partial structure of a rotating mechanism shown in FIG. 7.

Refer to FIG. 7 to FIG. 10 together. FIG. 7 is a schematic exploded view of a partial structure of the folding apparatus 100 shown in FIG. 2, FIG. 8 is a schematic diagram of a structure of the first housing 10 shown in FIG. 7, FIG. 9 is a schematic diagram of a structure of the second housing 30 shown in FIG. 7, and FIG. 10 is a schematic exploded view of a partial structure of the rotating mechanism 20 shown in FIG. 7.

In some embodiments, as shown in FIG. 7, the rotating mechanism 20 of the folding apparatus 100 includes a main shaft 1, a first end connection component 20a, a second end connection component 20a', a middle connection component 20b, a first supporting plate 21, a second supporting plate 22, a first shielding plate 23, and a seconding shielding plate 24.

As shown in FIG. 7, the main shaft 1 is located between the first housing 10 and the second housing 30. The first end connection component 20a and the second end connection component 20a' are connected to the first housing 10, the main shaft 1, and the second housing 30. The first end connection component 20a and the second end connection component 20a' are arranged and spaced from each other in the axial direction of the main shaft 1, and the first end connection component 20a and the second end connection component 20a' may be respectively arranged at ends of the main shaft 1, for example, may be respectively connected to the top and the bottom of the main shaft 1, or the upper end and the lower end of the main shaft 1. The middle connection component 20b is connected to the first housing 10, the main shaft 1, and the second housing 30. The middle connection component 20b may be located between the first end connection component 20a and the second end connection component 20a'. Refer to FIG. 10. The first supporting plate 21 and the second supporting plate 22 are located on one side of a plurality of connection components (that is, the first end connection component 20a, the second end connection component 20a', and the middle connection component 20b), and the first shielding plate 23 and the second shielding plate 24 are located on the other side of the plurality of connection components (20a, 20a', 20b).

As shown in FIG. 7 and FIG. 10, in some embodiments, the first supporting plate 21 is located on a side of the main shaft 1 close to the first housing 10, and the first supporting plate 21 is connected to the first end connection component 20a and the second end connection component 20a'. In some embodiments, the first supporting plate 21 may alternatively be connected to the middle connection component 20b. The second supporting plate 22 is located on the side of the main shaft 1 near the second housing 30, and the second supporting plate 22 is connected to the first end connection component 20a and the second end connection component 20a'. In some embodiments, the second supporting plate 22 may alternatively be connected to the middle connection component 20b.

As shown in FIG. 7 and FIG. 10, in some embodiments, the first shielding plate 23 is located on a side of the main shaft 1 close to the first housing 10, and the first shielding plate 23 is connected to the first end connection component 20a and the second end connection component 20a'. In some embodiments, the first shielding plate 23 may alternatively be connected to the middle connection component 20b. The second shielding plate 24 is located on the side of the main shaft 1 near the second housing 30, and the second shielding plate 24 is connected to the first end connection component 20a and the second end connection component 20a' In some embodiments, the second shielding plate 24 may alternatively be connected to the middle connection component 20b.

As shown in FIG. 7, the first housing 10 has a first supporting surface 101, and the first supporting surface 101 is configured to support the first non-bending part 2001 of the flexible display 200. The second housing 30 has a second supporting surface 301, and the second supporting surface 301 is configured to support the second non-bending part 2003 of the flexible display 200. When the first housing 10 and the second housing 30 are unfolded relative to each other to the flattened state, the first supporting surface 101 is flush with the second supporting surface 301, to better support the flexible display 200, so that the flexible display 200 is flatter, improving user experience.

In some embodiments, as shown in FIG. 8, a first positioning plate 102 is provided on a side that is of the first housing 10 of the folding apparatus 100 and that is close to the rotating mechanism 20. The first positioning plate 102 has a plurality of fastening holes 1021, and the first housing 10 and the rotating mechanism 20 are fastened by using fasteners. A fastener in the folding apparatus 100 is not shown in the accompanying drawings of this application, so as to simplify the drawings and show a main structure of the folding apparatus 100 more clearly. The first housing 10 has a first supporting surface 101, and the first positioning plate 102 is lowered relative to the first supporting surface 101 to form a first accommodation groove 103. The first accommodation groove 103 can provide accommodation and movable space for the first supporting plate 21. The position of the first accommodation groove 103 can enable the supporting surface of the first supporting plate 21 installed in the first accommodation groove 103 to be flush with the first supporting surface 101 of the first housing 10, so that the first supporting plate 21 can better support the flexible display 200. The depth of the first accommodation groove 103 is very shallow, and a supporting plate with relatively high hardness is disposed on the non-display side of the flexible display 200. Therefore, when the first supporting plate 21 partially extends out of the first accommodation groove 103, the part that is of the flexible display 200 and that faces the first accommodation groove 103 does not obviously deform under the pressing of the user, which also helps ensure reliability of the flexible display 200.

For example, the first positioning plate 102 may include a plurality of structures spaced with each other, or may be a continuous structure. This is not strictly limited in this application.

In some embodiments, as shown in FIG. 9, a second positioning plate 302 is provided on a side that is of the second housing 30 and that is close to the rotating mechanism 20, and a plurality of fastening holes 3021 are provided on the second positioning plate 302. The second housing 30 and the rotating mechanism 20 are fastened by using fasteners. The second housing 30 has a second supporting surface 301, and the second positioning plate 302 is lowered relative to the second supporting surface 301 to form a second accommodation groove 303. The second accommodation groove 303 can provide accommodation and movable space for the second supporting plate 22. The position of the second accommodation groove 303 can enable a supporting surface of the second supporting plate 22 installed in the second accommodation groove 303 to be flush with the second supporting surface 301 of the second housing 30, so that the second supporting plate 22 can better support the flexible display 200. The depth of the second accommodation groove 303 is very shallow, and a supporting plate with relatively high hardness is disposed on the non-display side of the flexible display 200. Therefore, when the second supporting plate 22 partially extends out of the second accommodation groove 303, the part that is of the flexible display 200 and that faces the second accommodation groove 303 does not obviously deform under the pressing of the user, which also helps ensure reliability of the flexible display 200.

For example, the second positioning plate 302 may include a plurality of structures spaced with each other, or may be a continuous structure. This is not strictly limited in this application.

As shown in FIG. 7, the main shaft 1 has a supporting surface 11. As shown in FIG. 1 and FIG. 2, when the first housing 10 and the second housing 30 are relatively unfolded to a flattened state, the supporting surface 11 of the main shaft 1 is at least partially exposed relative to the first supporting plate 21 and the second supporting plate 22. The first supporting plate 21, the main shaft 1, and the second supporting plate 22 can jointly support the bending part 2002 of the flexible display 200, so that the flexible display 200 is flatter and is not easily damaged due to an external force touch, improving reliability of the flexible display 200. As shown in FIG. 3 and FIG. 4, when the first housing 10 and the second housing 30 are in the intermediate state, the supporting surface 11 of the main shaft 1 is partially exposed relative to the first supporting plate 21 and the second supporting plate 22, an exposed area of the supporting surface 11 of the main shaft 1 is larger than an exposed area in the flattened state, and the supporting surface 11 of the main shaft 1, the first supporting plate 21, and the second supporting plate 22 jointly support the bending part 2002 of the flexible display 200. As shown in FIG. 5 and FIG. 6, when the first housing 10 and the second housing 30 are folded into a closed state, the supporting surface 11 of the main shaft 1 is basically completely exposed relative to the first supporting plate 21 and the second supporting plate 22, and the supporting surface 11 of the main shaft 1 supports the bending part 2002 of the flexible display 200.

For example, the supporting surface 11 of the main shaft 1 is arc-shaped. In this case, when the first housing 10 and the second housing 30 are relatively folded to a closed state, the supporting surface 11 of the main shaft 1 can provide a complete semicircular or nearly semicircular support effect for the bending part 2002 of the flexible display 200, which is consistent with an ideal closed form of the bending part 2002 of the flexible display 200. Therefore, more optimized support can be provided for the closed-form flexible display 200. It may be understood that, in this embodiment of this application, the supporting surface 11 of the main shaft 1 may be arc-shaped or approximately arc-shaped.

In some embodiments, the supporting surface 11 of the main shaft 1 is in an arc shape, and a central angle of the supporting surface 11 may be within a range of 150° to 180°, to better support the flexible display 200. In some other embodiments, a middle region of the supporting surface 11 of the main shaft 1 is planar, and regions on two sides of the supporting surface 11 are arc-surface shaped. In this case, the supporting surface 11 is approximately arc-shaped as a whole, and can implement semicircular or approximately-semicircular support for the flexible display 200 in the closed state. The middle region of the supporting surface 11 can implement planar support for the flexible display 200 in the flattened state together with the first supporting plate 21 and the second supporting plate 22. In some other embodiments, the supporting surface 11 of the main shaft 1 may alternatively have another shape. For example, the supporting surface 11 of the main shaft 1 is set to a semi-ellipse shape, to reduce a width of the folding apparatus 100 when the folding apparatus 100 is in the closed state, so that it is more convenient to carry and place the folding apparatus 100. A shape of the supporting surface 11 of the main shaft 1 is not strictly limited in this embodiment of this application.

Figure 11:
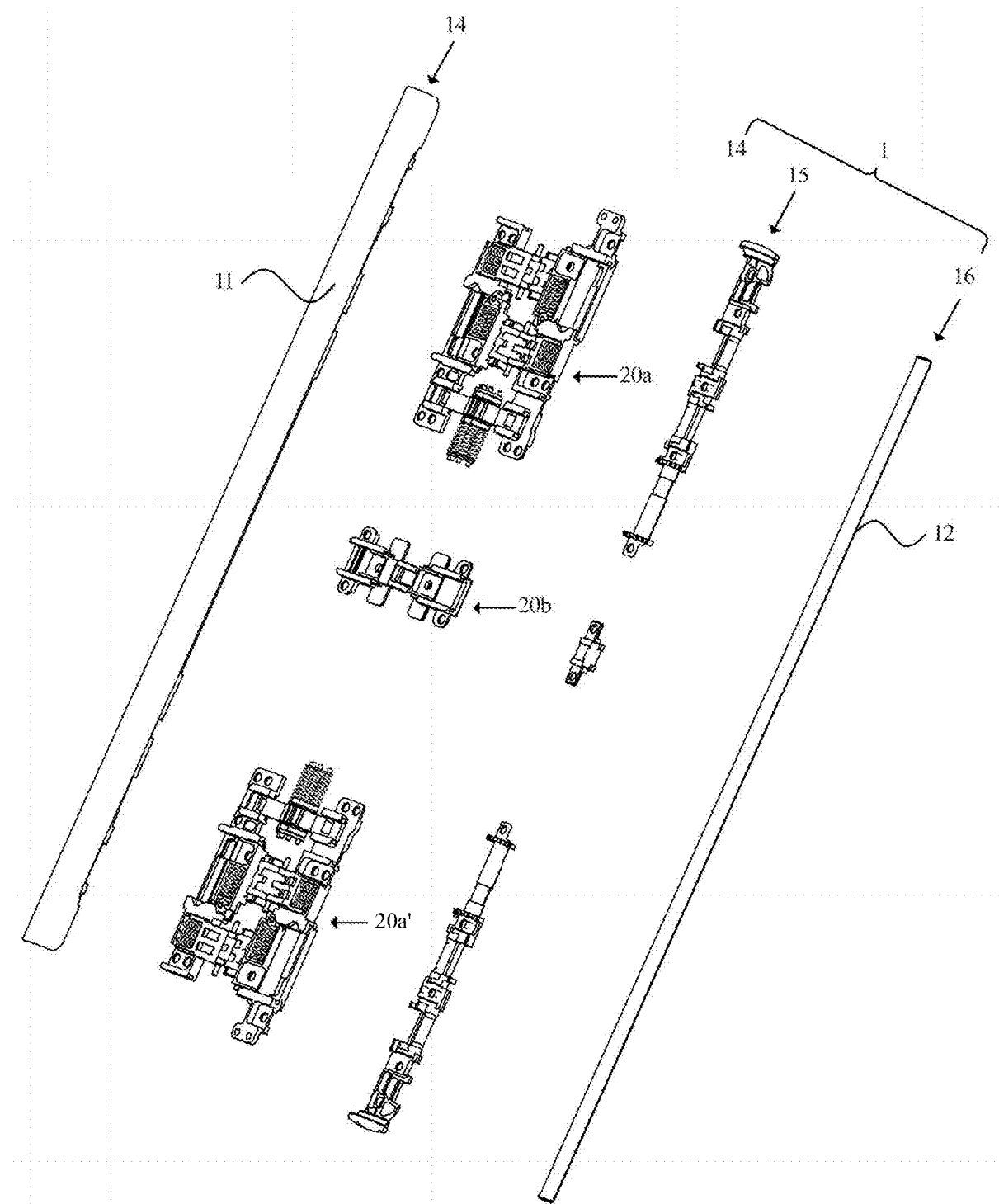
FIG. 11 is a schematic exploded view of a partial structure of the folding apparatus shown in FIG. 2.

FIG. 11 is a schematic exploded view of a partial structure of the folding apparatus 100 shown in FIG. 2.

As shown in FIG. 11, in some embodiments, the main shaft 1 includes a main outer shaft 14, a main inner shaft 15, and a shielding plate 16. The main outer shaft 14 is fastened to one side of the main inner shaft 15, and the shielding plate 16 is fastened to the other side of the main inner shaft 15. The supporting surface 11 of the main shaft 1 is formed on the main outer shaft 14, and is disposed away from the main inner shaft 15. The shielding surface 12 of the main shaft 1 is formed on the shielding plate 16, and is disposed away from the main outer shaft 14. In some embodiments, the shielding plate 16 and the main inner shaft 15 may be fastened to each other in an assembled manner. In some other embodiments, the shielding plate 16 and the main inner shaft 15 may alternatively be integrally formed mechanical parts.

The main outer shaft 14 and the main inner shaft 15 together form a plurality of movable spaces communicating to the outside of the main shaft 1, and a plurality of connection components (20a, 20a', 20b) of the rotating mechanism 20 are movably mounted in these movable spaces to connect the main shaft 1. The rotation axis of the entire rotating mechanism 20 is parallel to the axial direction of the main shaft 1, which extends in the axial direction thereof.

In some embodiments, the first end connection component 20a and the second end connection component 20a' are mirror-symmetric structures. Because the two end connection assemblies 20a and 20a' are arranged in mirror symmetry, stress between the two end connection assemblies 20a and 20a' and the main shaft 1, the first housing 10 and the second housing 30 is relatively uniform during the rotation of the folding apparatus 100. It is beneficial to improve the reliability of the folding apparatus 100. In this case, the structure of the two end connection members 20a and 20a' is symmetrical, so that the overall structure of the rotating mechanism 20 is relatively simple and the manufacturing cost is low. In some other embodiments, the two end connection components 20a, 20a' may also be the same or have a central symmetry structure, and the two end connection components 20a, 20a' may also have different structures.

The structure of the middle connection component 20b is simpler than that of the end connection components 20a and 20a'. In some other embodiments, the rotating mechanism 20 may not be provided with the middle connection component 20b. In some other embodiments, the rotating mechanism 20 may alternatively use the structure of the end connection component 20a/20a' shown in FIG. 11 for the connection component located in the middle, and use the structure of the middle connection component 20b shown in FIG. 11 for the connection component located in the end. In some other embodiments, only one end connection component 20a/20a' may be disposed in this embodiment of this application, and the end connection component 20a/20a' is connected to a middle part of the main shaft 1 and a middle part of the first housing 10 and the second housing 30. It may be understood that the structure of the rotating mechanism 20 may have a plurality of combination and deformation manners. This is not strictly limited in this embodiment of this application.

Figure 12:
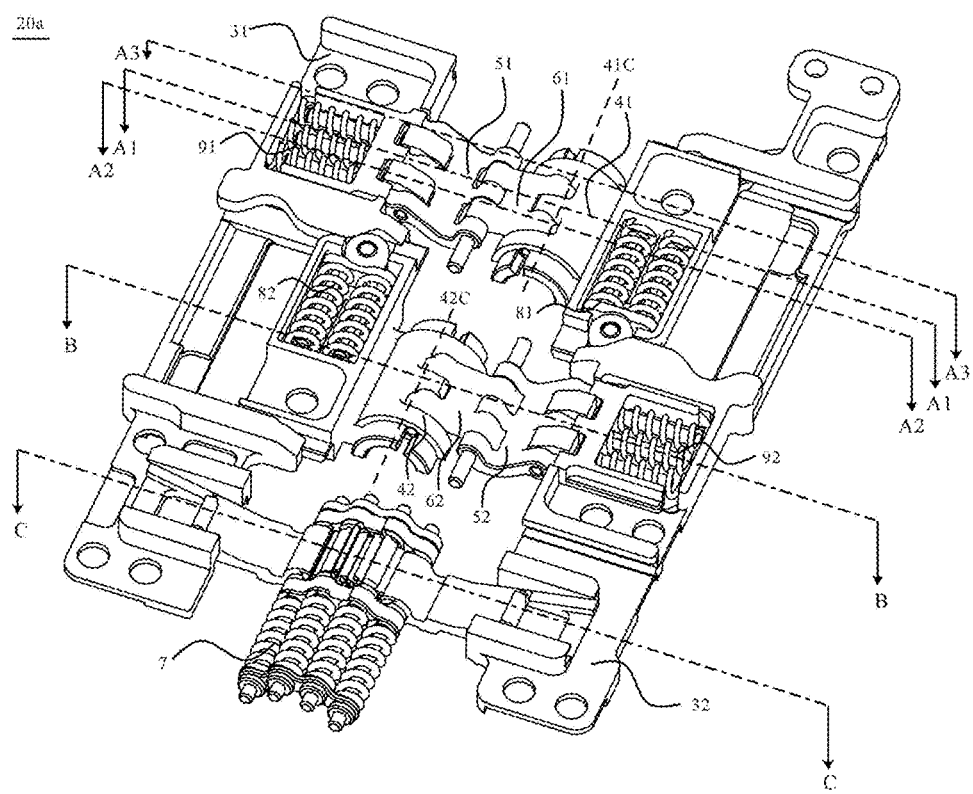
FIG. 12 is a schematic diagram of a structure of a first end connection component shown in FIG. 11.
Figure 13:
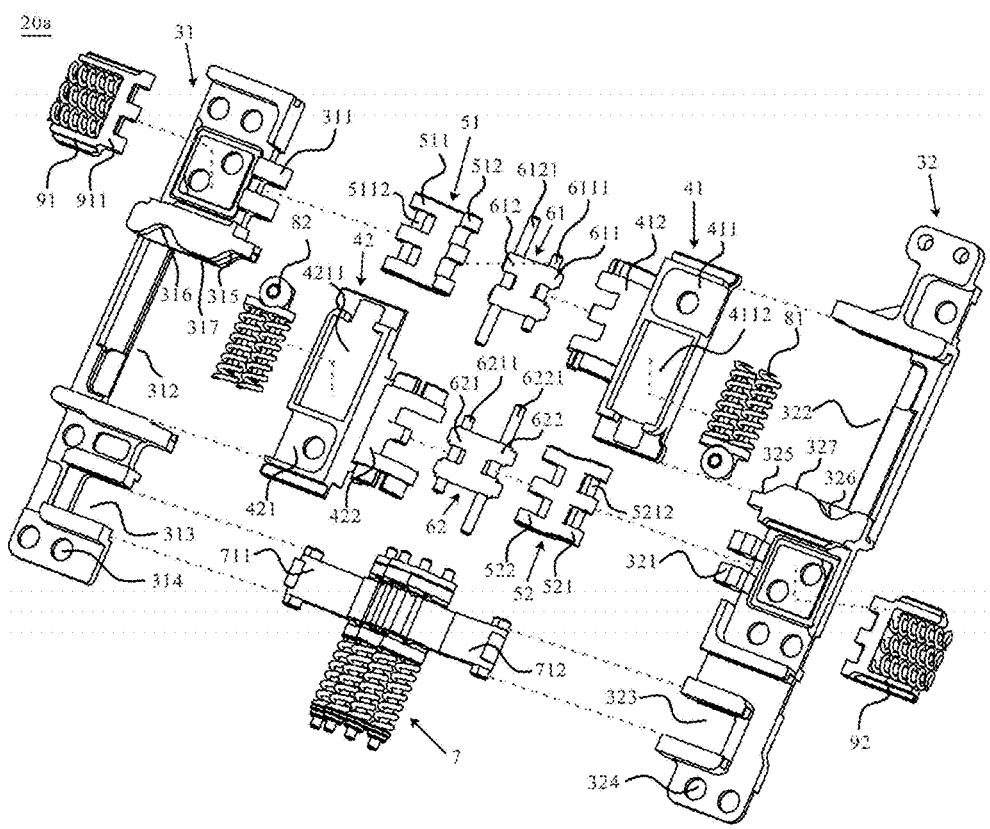
FIG. 13 is a schematic exploded view of a partial structure of a first end connection component shown in FIG. 12.
Figure 14:
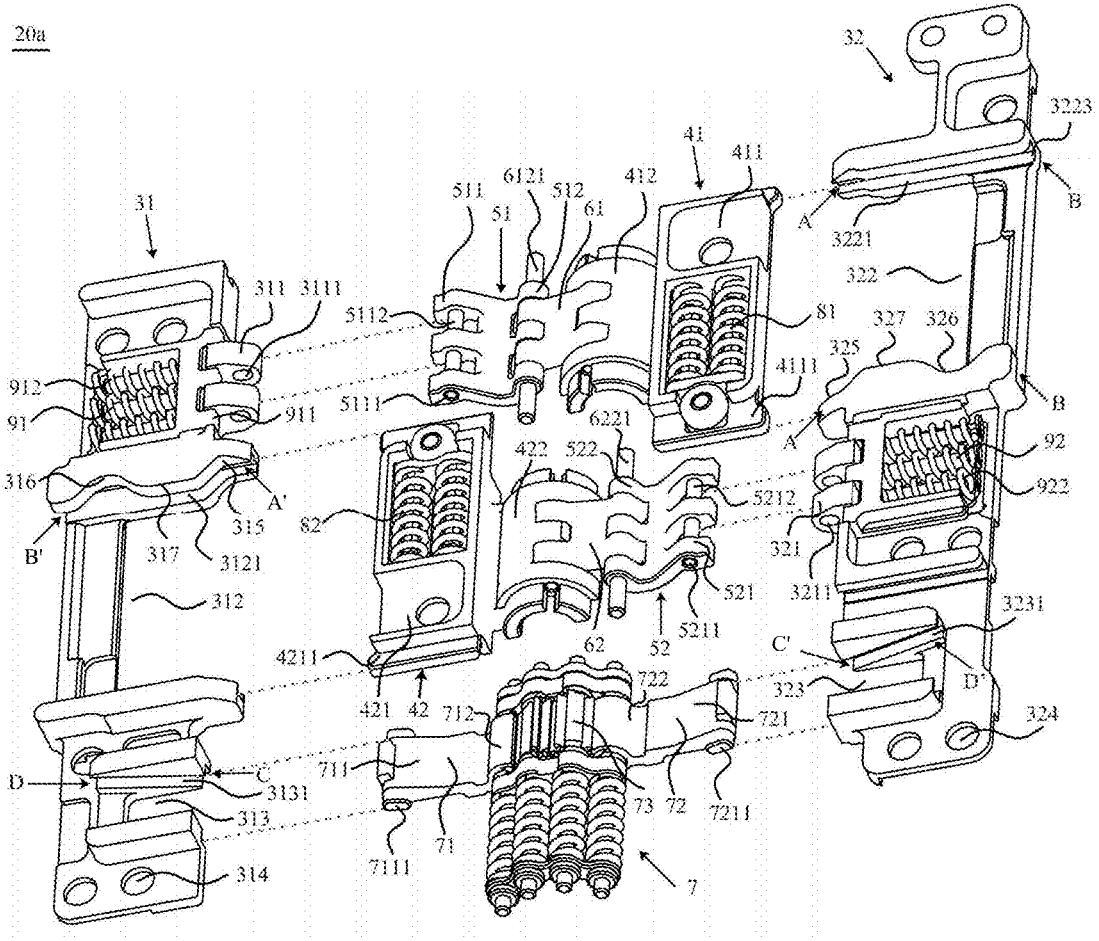
FIG. 14 is a schematic exploded view of a partial structure of the first end connection component shown in FIG. 12 at another angle.

Refer to FIG. 12, FIG. 13, and FIG. 14 together. FIG. 12 is a schematic diagram of a structure of the first end connection component 20a shown in FIG. 11, FIG. 13 is a schematic exploded view of a partial structure of the first end connection component 20a shown in FIG. 12, and FIG. 14 is a schematic exploded view of a partial structure of the first end connection component 20a shown in FIG. 12 from another angle.

In some embodiments, as shown in FIG. 12, the first end connection component 20a of the rotating mechanism 20 may include a first fixed bracket 31, a second fixed bracket 32, a first rotating part, and a second rotating part. The first rotating part may include a first transmission arm 41, a first rotating arm 51, and a first connecting piece 61, and the second rotating part may include a second transmission arm 42, a second rotating arm 52, and a second connecting piece 62. The first fixed bracket 31, the first rotating arm 51, the first connecting piece 61, and the first transmission arm 41 are sequentially connected to the second fixed bracket 32, and the first fixed bracket 31, the second transmission arm 42, the second connecting piece 62, and the second rotating arm 52 are sequentially connected to the second fixed bracket 32. The shaft may include a main shaft 1, a first rotating part and a second rotating part.

For example, as shown in FIG. 13, the first transmission arm 41 includes a sliding end 411 and a rotating end 412. The sliding end 411 of the first transmission arm 41 is slidably connected to the second fixed bracket 32, and the rotating end 412 of the first transmission arm 41 is rotatably connected to the first end 611 of the first connecting piece 61. The first rotating arm 51 includes a claw-shaped first end 511 (a second mechanical part) and a claw-shaped second end 512. The first end 511 of the first rotating arm 51 is rotatably connected to the first fixed bracket 31, and the second end 512 of the first rotating arm 51 is rotatably connected to the second end 612 of the first connecting piece 61. The second transmission arm 42 includes a sliding end 421 and a rotating end 422. The sliding end 421 of the second transmission arm 42 is slidably connected to the first fixed bracket 31, and the rotating end 422 of the second transmission arm 42 is rotatably connected to the first end 621 of the second connecting piece 62. The second rotating arm 52 includes a claw-shaped first end 521 and a claw-shaped second end 522. The first end 521 of the second rotating arm 52 is rotatably connected to the second fixed bracket 32, and the second end 522 of the second rotating arm 52 is rotatably connected to the second end 622 of the second connecting piece 62.

In some embodiments, as shown in FIG. 14, the first fixed bracket 31 includes a first connecting block 311. The first connecting block 311 may be in a claw shape, and there is a rotation hole 3111 on the first connecting block 311. The first end 511 of the first rotating arm 51, that is, the second mechanical part, has a rotation hole 5111. The first end 511 of the first rotating arm 51 is staggeredly connected to the first connecting block 311, and the rotating shaft 5112 connects the first end 511 of the first rotating arm 51 and the first connecting block 311 of the first fixed bracket 31 through the connection hole 5111 of the first rotating arm 51 and the connection hole 3111 of the first connecting block 311 The connection is implemented, so as to realize the rotational connection between the first rotating arm 51 and the first fixed bracket 31. Because the first end 511 of the first rotating arm 51 and the first connecting block 311 are staggeredly connected, mutual limitation in the axial direction of the main shaft 1 may be implemented, and connection reliability of the rotating mechanism 20 is improved. For example, the rotating shaft in this embodiment of this application may be a pin. It may be understood that the first connecting block 311 of the first fixed bracket 31 and the first end 511 of the first rotating arm 51 may alternatively have other structures, provided that a rotatable connection relationship between the first connecting block 311 of the first fixed bracket 31 and the first end 511 of the first rotating arm 51 can be satisfied. This is not strictly limited in this embodiment of this application.

In some embodiments, as shown in FIG. 13 and FIG. 14, the second end 612 of the first connecting piece 61 is in a claw shape, and the second end 512 of the first rotating arm 51 is staggeredly connected to the second end 612 of the first connecting piece 61 by using a rotating shaft 6121. In this way, the first rotating arm 51 and the first connecting piece 61 are rotatably connected. A first end 611 of the first connecting piece 61 is in a claw shape, an end part of the rotating end 412 of the first transmission arm 41 is in a claw shape, and the first end 611 of the first connecting piece 61 is staggeredly connected to an end part of the rotating end 412 of the first transmission arm 41 by using a rotating shaft 6111. In this way, the first connecting piece 61 and the first transmission arm 41 are rotatably connected. The second end 512 of the first rotating arm 51 is staggeredly connected to the second end 612 of the first connecting piece 61, and the first end 611 of the first connecting piece 61 is staggeredly connected to the end of the rotating end 412 of the first transmission arm 41, so that mutual limitation in the axial direction of the main shaft 1 can be implemented, thereby improving connection reliability of the rotating mechanism 20. It may be understood that the second end 512 of the first rotating arm 51 and the second end 612 of the first connecting piece 61, the first end 611 of the first connecting piece 61, and the rotating end 412 of the first transmission arm 41 may also have other structures, provided that a rotational connection relationship between the two can be satisfied. This is not strictly limited in this embodiment of this application.

In some embodiments, as shown in FIG. 14, the second fixed bracket 32 includes a second connecting block 321. The second connecting block 321 may be in a claw shape, and there is a rotation hole 3211 on the second connecting block 321. The first end 521 of the second rotating arm 52 has a rotation hole 5211. The first end 521 of the second rotating arm 52 is staggeredly connected to the second connecting block 321, and the rotating shaft 5212 connects the first end 521 of the second rotating arm 52 and the second connecting block 3211 of the second fixed bracket 32 through the connection hole 5211 of the second rotating arm 52 and the connection hole 3211 of the second connecting block 321, thereby realizing the rotational connection between the second rotating arm 52 and the second fixed bracket 32. Because the first end 521 of the second rotating arm 52 and the second connecting block 321 are staggeredly connected, mutual limitation in the axial direction of the main shaft 1 can be implemented, and connection reliability of the rotating mechanism 20 is improved. For example, the rotating shaft in this embodiment of this application may be a pin. It may be understood that the second connecting block 321 of the second fixed bracket 32 and the first end 521 of the second rotating arm 52 may alternatively have other structures, provided that a rotatable connection relationship between the second connecting block 321 of the second fixed bracket 32 and the first end 521 of the second rotating arm 52 can be satisfied. This is not strictly limited in this embodiment of this application.

In some embodiments, as shown in FIG. 13 and FIG. 14, the second end 622 of the second connecting piece 62 is in a claw shape, and the second end 522 of the second rotating arm 52 is staggeredly connected to the second end 622 of the second connecting piece 62 by using a rotating shaft 6221. In this way, a rotational connection between the second rotating arm 52 and the second connecting piece 62 is implemented. A first end 621 of the second connecting piece 62 is in a claw shape, an end part of the rotating end 422 of the second transmission arm 42 is in a claw shape, and the first end 621 of the second connecting piece 62 is staggeredly connected to the end part of the rotating end 422 of the second transmission arm 42 by using a rotating shaft 6211. In this way, the second connecting piece 62 and the second transmission arm 42 are rotatably connected. The second end 522 of the second rotating arm 52 is staggeredly connected to the second end 622 of the second connecting piece 62, and the first end 621 of the second connecting piece 62 is staggeredly connected to the end of the rotating end 422 of the second transmission arm 42, so that mutual limitation in the axial direction of the main shaft 1 can be implemented, thereby improving connection reliability of the rotating mechanism 20. It may be understood that the second end 522 of the second rotating arm 52 and the second end 622 of the second connecting piece 62, the first end 621 of the second connecting piece 62, and the rotating end 422 of the second transmission arm 42 may also have other structures, provided that a rotational connection relationship between the two can be satisfied. This is not strictly limited in this embodiment of this application.

In some embodiments, as shown in FIG. 14, the second fixed bracket 32 has a first sliding groove 322, and a side wall of the first sliding groove 322 may have a recessed guide space 3221. The sliding end 411 of the first transmission arm 41 includes a first flange 4111 located on a peripheral side, and the first flange 4111 is installed in the guide space 3221 of the first sliding groove 322, so that the sliding end 411 of the first transmission arm 41 is slidably connected to the first sliding groove 322. Therefore, a sliding connection between the first transmission arm 41 and the second fixed bracket 32 is implemented. In this embodiment, the guide space 3221 of the first sliding groove 322 cooperates with the first flange 4111 of the first transmission arm 41, so that the sliding end 411 of the first transmission arm 41 can be guided in the sliding direction of the first sliding groove 322. Therefore, the relative sliding action between the first transmission arm 41 and the second fixed bracket 32 is easier to implement, and the control precision is higher.

In some embodiments, as shown in FIG. 14, the first fixed bracket 31 has a second sliding groove 312, and a side wall of the second sliding groove 312 may have a recessed guide space 3121. The sliding end 421 of the second transmission arm 42 includes a second flange 4211 located on a peripheral side, and the second flange 4211 is installed in the guide space 3121 of the second sliding groove 312, so that the sliding end 421 of the second transmission arm 42 is slidably connected to the second sliding groove 312. Therefore, a sliding connection between the second transmission arm 42 and the first fixed bracket 31 is implemented. In this embodiment, the guide space 3121 of the second sliding groove 312 cooperates with the second flange 4211 of the second transmission arm 42, so that the sliding end 421 of the second transmission arm 42 can be guided in the sliding direction of the second sliding groove 312. Therefore, the relative sliding action between the second transmission arm 42 and the first fixed bracket 31 is easier to implement, and the control precision is higher.

The positions of the plurality of sliding grooves on the first fixed bracket 31 may be different from the positions of the plurality of sliding grooves on the second fixed bracket 32, for example, as shown in FIG. 13, the sliding grooves 312 and the sliding grooves 322 may be arranged in a staggered direction parallel to the axial direction of the main shaft 1, so as to improve space utilization of the rotating mechanism 20.

In some embodiments, as shown in FIG. 12 to FIG. 14, the rotating mechanism 20 may further include a synchronization damping member 7. As shown in FIG. 14, the synchronization damping member 7 includes a first synchronization swing arm 71, a second synchronization swing arm 72, and a gear set 73. The first synchronization swing arm 71 includes a sliding end 711 and a rotating end 712. The rotating end 712 of the first synchronization swing arm 71 is rotatably connected to the main shaft 1, and the sliding end 711 of the first synchronization swing arm 71 is slidably connected to the first fixed bracket 31. In a process in which the first housing 10 and the second housing 30 are relatively folded or unfolded, the sliding end 711 of the first synchronization swing arm 71 slides relative to the first fixed bracket 31. The second synchronization swing arm 72 includes a sliding end 721 and a rotating end 722. The rotating end 722 of the second synchronization swing arm 72 is rotatably connected to the main shaft 1, and the sliding end 721 of the second synchronization swing arm 72 is slidably connected to the second fixed bracket 32. In a process in which the first housing 10 and the second housing 30 are relatively folded or unfolded, the sliding end 721 of the second synchronization swing arm 72 slides with respect to the second fixed bracket 32.

In some embodiments, as shown in FIG. 12 to FIG. 14, the first fixed bracket 31 has a third sliding groove 313, and a side wall of the third sliding groove 313 may have a recessed guide space 3131. A guide direction of the guide space 3131 of the third sliding groove 313 is the same as a guide direction of the guide space 3121 of the second sliding groove 312. The sliding end 711 of the first synchronization swing arm 71 includes a third flange 7111 located on the peripheral side, and the third flange 7111 is installed in the guide space 3131 of the third sliding groove 313, so that the sliding end 711 of the first synchronization swing arm 71 is slidably connected to the third sliding groove 313. Therefore, a sliding connection between the first synchronization swing arm 71 and the first fixed bracket 31 is implemented. In this embodiment, the guide space 3131 of the third sliding groove 313 cooperates with the third flange 7111 of the first synchronization swing arm 71, so that the sliding end 711 of the first synchronization swing arm 71 can be guided in the sliding direction of the third sliding groove 313. Therefore, the relative sliding action between the first synchronization swing arm 71 and the first fixed bracket 31 is easier to implement, and the control precision is higher.

In some embodiments, as shown in FIG. 12 to FIG. 14, the second fixed bracket 32 has a fourth sliding groove 323, and a side wall of the fourth sliding groove 323 may have a recessed guide space 3231. A guide direction of the guide space 3231 of the fourth sliding groove 323 is the same as a guide direction of the guide space 3221 of the first sliding groove 322. The sliding end 721 of the second synchronization swing arm 72 includes a fourth flange 7211 located on a peripheral side, and the fourth flange 7211 is installed in the guide space 3231 of the fourth sliding groove 323, so that the sliding end 721 of the second synchronization swing arm 72 is slidably connected to the fourth sliding groove 323. Therefore, a sliding connection between the second synchronization swing arm 72 and the second fixed bracket 32 is implemented. In this embodiment, the guide space 3231 of the fourth sliding groove 323 cooperates with the fourth flange 7211 of the second synchronization swing arm 72, so that the sliding end 721 of the second synchronization swing arm 72 can be guided in the sliding direction of the fourth sliding groove 323. Therefore, the relative sliding action between the second synchronization swing arm 72 and the second fixed bracket 32 is easier to implement, and the control precision is higher.

In this embodiment, since the rotating end 712 of the first synchronization swing arm 71 and the rotating end 722 of the second synchronization swing arm 72 mesh with each other through the gear set 73. Therefore, the synchronization component 70 formed by the first synchronization swing arm 71, the second synchronization swing arm 72, and the gear set 73 has a simple structure, easy control of a movement process, and high accuracy.

For example, a structure of the second synchronization swing arm 72 may be approximately the same as a structure of the first synchronization swing arm 71, to reduce material types of the rotating mechanism 20, and reduce design difficulty and costs of the rotating mechanism 20.

It may be understood that, as shown in FIG. 12 to FIG. 14, in this embodiment, the first fixed bracket 31 may be an integrally formed mechanical part, including a first connecting block 311, a second sliding groove 312, and a third sliding groove 313. In some other embodiments, the first fixed bracket 31 may include a plurality of mechanical parts, and the first connecting block 311, the second sliding groove 312, and the third sliding groove 313 may be formed on different mechanical parts. This is not strictly limited in this application. As shown in FIG. 12 to FIG. 14, in this embodiment, the second fixed bracket 32 may be an integrally formed mechanical part, including a second connecting block 321, a first sliding groove 322, and a fourth sliding groove 323. In some other embodiments, the second fixed bracket 32 may include a plurality of mechanical parts, and the second connecting block 321, the first sliding groove 322, and the fourth sliding groove 323 may be formed on different mechanical parts. This is not strictly limited in this application.

As shown in FIG. 14, in some embodiments, the first fixed bracket 31 may have a plurality of fastening holes 314. Refer to FIG. 8. The plurality of fastening holes 314 of the first fixed bracket 31 may be aligned with the plurality of fastening holes 1021 of the first positioning plate 102, and the first fixed bracket 31 and the first positioning plate 102 are fastened by using fasteners, thereby fastening the first fixed bracket 31 to the first housing 10. The fastener includes but is not limited to a screw, a bolt, a rivet, a pin, and the like. Because the first fixed bracket 31 and the first housing 10 are fastened to each other, the first housing 10 and the first fixed bracket 31 move synchronously, and the rotating mechanism 20 can control the motion track of the first housing 10 by controlling the motion track of the first fixed bracket 31. In some other embodiments, another connection structure may also be formed between the first fixed bracket 31 and the first housing 10. This is not strictly limited in this application.

As shown in FIG. 14, in some embodiments, the second fixed bracket 32 may have a plurality of fastening holes 324. With reference to FIG. 9, the plurality of fastening holes 324 of the second fixed bracket 32 may be aligned with the plurality of fastening holes 3021 of the second positioning plate 302, and the second fixed bracket 32 and the second positioning plate 302 are fastened by using fasteners, thereby fastening the second fixed bracket 32 to the second housing 30. The fastener includes but is not limited to a screw, a bolt, a rivet, a pin, and the like. Because the second fixed bracket 32 and the second housing 30 are fastened to each other, the second housing 30 and the second fixed bracket 32 move synchronously, and the rotating mechanism 20 can control the motion track of the second housing 30 by controlling the motion track of the second fixed bracket 32. In some other embodiments, another connection structure may also be formed between the second fixed bracket 32 and the second housing 30. This is not strictly limited in this application.

The flexible display is a multi-layer structure. The layers are bonded, for example, by an OCA optical glue, where the OCA optical glue is elastic. When the electronic device is bent, the flexible display generates a tension opposite to a bending direction. Because tension of each layer accumulates, the flexible display deforms in a bending process, and layers of the flexible display are staggered. When the electronic device is restored to the flattened state, because a screen self-healing time is affected by a physical characteristic, a crease appears in the bending part 2002 of the flexible display 200, thereby reducing flatness of the flexible display and affecting user experience. When the flexible display 200 is repeatedly folded, deformation generated on the screen is difficult to recover, and a screen crease problem becomes more serious.

In this embodiment of this application, an abutting force between folding mechanical parts accelerates crease recovery of the flexible display 200, thereby improving a flattening effect of the screen.

In some embodiments, as shown in FIG. 12 to FIG. 14, the rotating mechanism 20 may further include a first damping member 91. The first damping member 91 is disposed on the first fixed bracket 31, and the first rotating arm 51 abuts against the first damping member 91. The first elastic component may include a first damping member 91 and a first fixed bracket 31. In this embodiment of this application, an abutting force between the first rotating arm 51 and the first damping member 91 is used to accelerate crease recovery of the flexible display 200.

Figure 15:
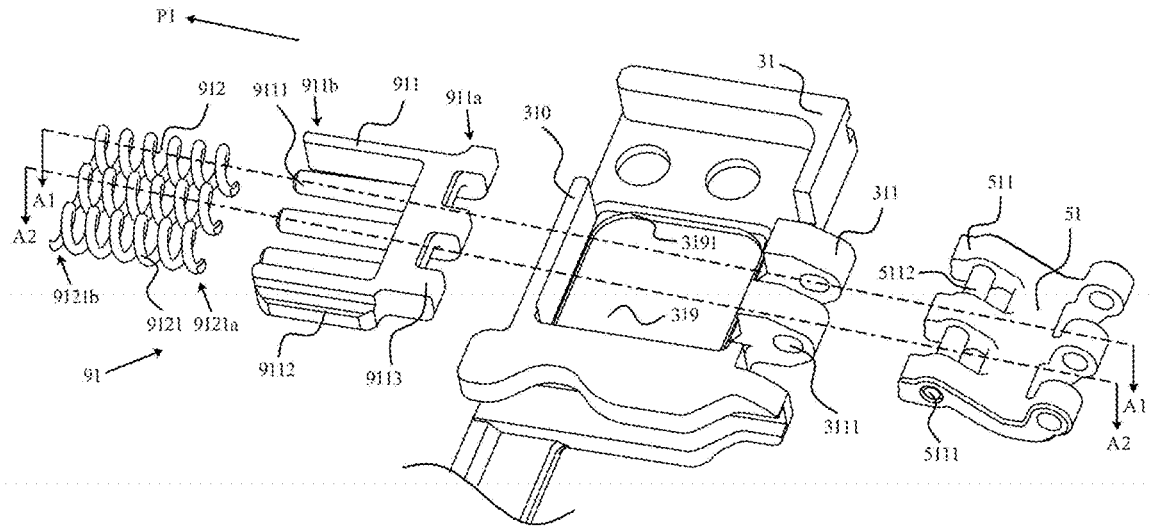
FIG. 15 is a schematic exploded view of partial structures shown in FIG. 12 to FIG. 14.

FIG. 15 is a schematic exploded view of partial structures shown in FIG. 12 to FIG. 14. The structure shown in FIG. 15 includes a first damping member 91, a part of a first fixed bracket 31, and a first rotating arm 51.

As shown in FIG. 12 and FIG. 14, the first rotating arm 51 is connected to the first connecting block 311 of the first fixed bracket 31 by using the rotating shaft 5112. The first connecting block 311 is in a claw shape, the first end 511 of the first rotating arm 51 is also in a claw shape, and the claw-shaped first connecting block 311 is connected to the claw-shaped first end 511 in a staggered manner. Specifically, the first end 511 of the first rotating arm 51 is provided with a connection hole 5111, and the first connecting block 311 is provided with a connection hole 3111. The rotating shaft 5112 penetrates through the connection hole 5111 and the connection hole 3111, so that the first end 511 of the first rotating arm 51 is connected to the first connecting block 311 in a staggered manner, thereby implementing connection between the first rotating arm 51 and the first connecting block 311.

As shown in FIG. 15, in some embodiments, the first damping member 91 may include a first bracket 911 and a first elastic part 912. The first bracket 911 is a rigid structure, and deformation is not likely to occur under an external force. The first elastic part 912 is of an elastic structure, and is prone to deformation under an external force.

As shown in FIG. 14 and FIG. 15, in some embodiments, the first fixed bracket 31 further has a first mounting groove 319, and the first damping member 91 is disposed in the first mounting groove 319. A middle part of a groove wall of the first mounting groove 319 is recessed to form guide space 3191 of the first mounting groove 319. The first bracket 911 of the first damping member 91 has a seventh flange 9112. The seventh flange 9112 of the first bracket 911 cooperates with the guide space 3191 of the first mounting groove 319, to implement a sliding connection between the first bracket 911 and the first mounting groove 319. A length of the guide space 3191 is greater than a length of the flange 9112, so that the first bracket 911 can slide in the first mounting groove 319.

As shown in FIG. 15, the first end 911a of the first bracket 911 of the first damping member 91 includes a third connecting block 9113 (the first mechanical part), the third connecting block 9113 may be in a claw shape, the third connecting block 9113 and the first connecting block 311 are disposed alternately, and the claw-shaped third connecting block 9113 abuts against the claw-shaped first end 511 of the first rotating arm 51. The second end 911b of the first bracket 911 elastically abuts against the first fixed bracket 31 by using the first elastic part 912. Therefore, the first damping member 91 abuts against the first rotating arm 51, and the first damping member 91 elastically abuts against the first fixed bracket 31, so that an abutting force between the first rotating arm 51 and the first damping member 91 is transferred to the first fixed bracket 31 by using the first damping member 91. With reference to FIG. 7, because the first fixed bracket 31 is fixedly connected to the first housing 10, the first housing 10 is fixedly connected to the first non-bending part 2001 of the flexible display 200. Therefore, by using the fixed connection between the first fixed bracket 31, the first housing 10, and the flexible display 200, an abutting force between the first rotating arm 51 and the first damping member 91 can be transferred to the first non-bending part 2001 of the flexible display 200, thereby accelerating crease recovery of the flexible display 200, and improving a flattening effect of the screen.

In some embodiments, as shown in FIG. 15, the second end 911b of the first bracket 911 may include a plurality of guide posts 9111, and the plurality of guide posts 9111 are spaced from each other. The first elastic part 912 may include a plurality of springs 9121, and the plurality of springs 9121 are sleeved on the plurality of guide posts 9111 in a one-to-one correspondence. A first end 9121a of the spring 9121 abuts against the first bracket 911. For example, the first end 9121a of the spring 9121 abuts against the third connecting block 9113 of the first bracket 911. The second end 9121b of the spring 9121 abuts against the first fixed bracket 31, for example, the second end 9121b of the spring 9121 abuts against the stop block 310. The stop block 310 is fixedly disposed on the first fixed bracket 31. The third connecting block 9113, the spring 9121, and the stop block 310 are sequentially arranged along the first direction P1. The first direction P1 is parallel to the length direction of the first elastic part 912 and far away from the main shaft 1. A gap is disposed between the first bracket 911 and the stop block 310, to reserve space for the first bracket 911 to slide in the first mounting groove 319. Because the first bracket 911 abuts against the first rotating arm 51, an abutting force of the first end 511 of the first rotating arm 51 against the first bracket 911 may push the first bracket 911 to slide along the first direction P1 relative to the guide space 3191 of the first mounting groove 319. When the first bracket 911 slides along the first direction relative to the first mounting groove 319, because the second end 9121b of the spring 9121 abuts against the stop block 310, the spring 9121 is compressed to generate elastic deformation, and the spring 9121 generates elastic force. Due to the abutment relationship between the spring 9121 and the stop block 310 of the first fixed bracket 31, the spring 9121 transmits an elastic force to the first fixed bracket 31 when compressed. In addition, a force in the first direction is transferred to the first non-bending part 2001 of the flexible display 200 by using the first fixed bracket 31 and the first housing 10, thereby accelerating crease recovery of the flexible display 200, especially rapid recovery of the crease at the bending part 2002 of the flexible display 200.

In this embodiment of this application, the spring is an implementation of the elastic structure, and constitutes no limitation on the elastic structure. The elastic structure may be a structure that is prone to elastic deformation under an external force and can be restored to the original state after the external force is removed. For example, in an implementation, the elastic structure may also be elastic rubber. A fitting relationship between the elastic structure and the first bracket is not limited to sleeved, for example, may also be abutting. For ease of description, a spring is used as an example for description in this embodiment of this application.

In a bending process of the electronic device, deformation of the flexible display varies with bending angles. For example, when the flexible display is in a closed state, tension between layers of the flexible display is the largest, a relative position misalignment between the layers is relatively serious, and deformation of the flexible display is relatively large. When the flexible display is restored from the bending state to the flattened state, because screen deformation requires a restoration time, a crease occurs on the bending part of the flexible display. Therefore, when the flexible display is in different states, applying different forces to the flexible display helps ensure structural reliability of the flexible display.

Figure 16:
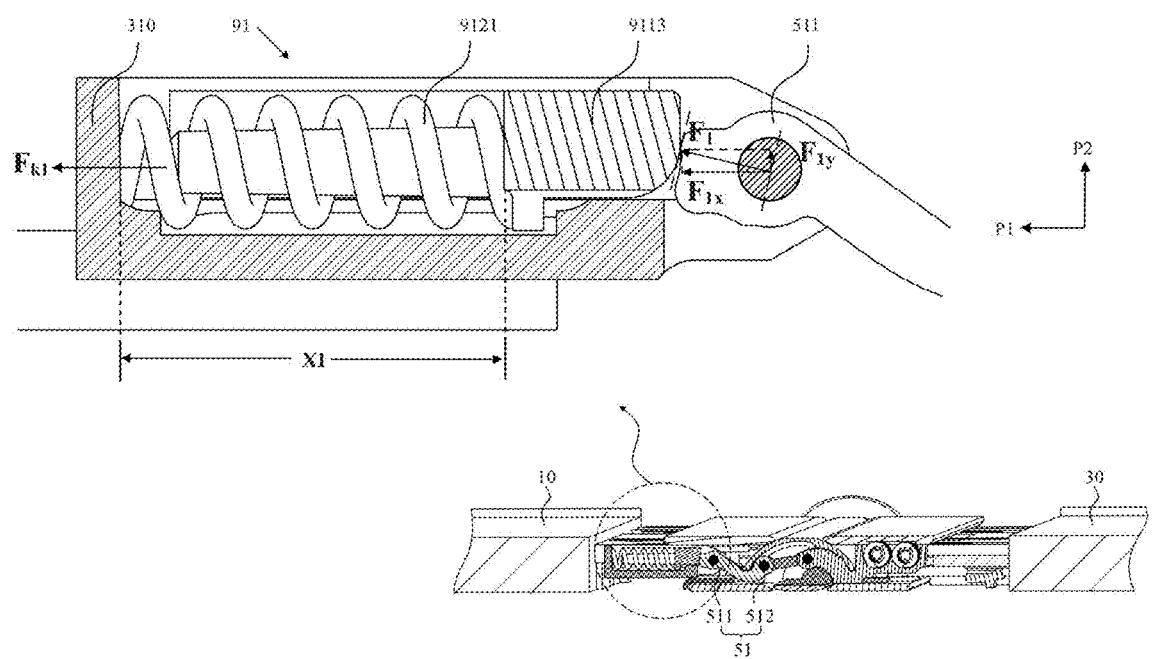
FIG. 16 is a schematic cross-sectional view of the folding apparatus shown in FIG. 2 in a flattened state along a line A1-A1 shown in FIG. 12.
Figure 17:
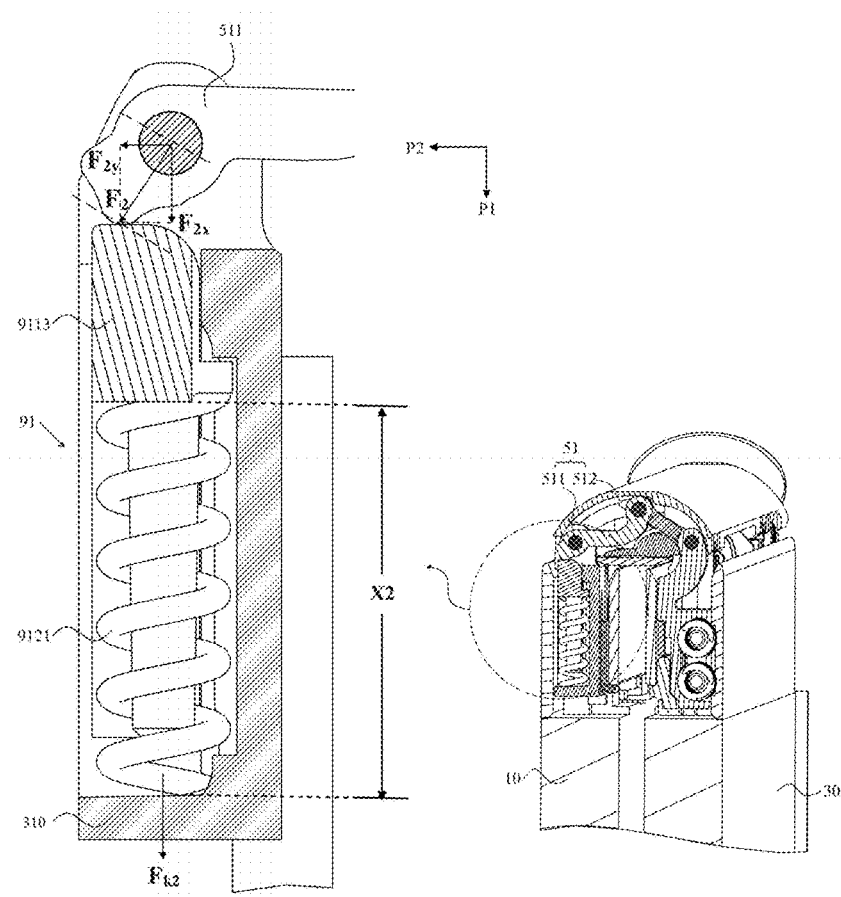
FIG. 17 is a schematic cross-sectional view of the folding apparatus shown in FIG. 2 in a closed state along a line A1-A1 shown in FIG. 12.

FIG. 16 is a schematic cross-sectional view of a position (that is, a section line A1-A1 shown in FIG. 12 and FIG. 15) of the first rotating arm 51 corresponding to a flattened state of the folding apparatus 100 shown in FIG. 2, and FIG. 17 is a schematic cross-sectional view of a position (that is, a section line A1-A1 shown in FIG. 12 and FIG. 15) of the first rotating arm 51 corresponding to a closed state of the folding apparatus 100 shown in FIG. 2.

As shown in FIG. 16 and FIG. 17, the first end 511 of the first rotating arm 51 is designed as a special-shaped structure. For example, as shown in FIG. 16, when the first housing 10 and the second housing 30 are relatively unfolded to a flattened state, the first portion of the third connecting block 9113 of the first bracket 911 abuts against the first portion of the first end 511 of the first rotating arm 51. That is, the first portion of the first mechanical part abuts against the first portion of the second mechanical part. The abutting force of the first rotating arm 51 against the first bracket 911 is $F_1$. $F_1$ is a component of force of $F_1$ in the first direction P1, and $F_{1y}$ is a component of force of $F_1$ in the second direction P2. The second direction P2 is perpendicular to the first direction P1 and the second direction P2 is perpendicular to the length direction of the main shaft 1. As described above, the component of force $F_1$ in the first direction causes the spring 9121 to compress and deform, the length of the spring 9121 after compression is X1, and the elastic deformation variable of the spring 9121 is $\Delta X1$. According to Hooke's Law, the spring force is proportional to the spring's elastic shape variable. Therefore, when the first housing 10 and the second housing 30 are relatively unfolded to a flattened state, an elastic force of the spring in the first direction P1 is $F_{k1}=k \cdot \Delta X1$, where k is a constant.

For example, as shown in FIG. 17, when the first housing 10 and the second housing 30 are relatively folded to an intermediate state or a closed state, an abutting force of the first rotating arm 51 against the first bracket 911 is $F_2$. $F_{2x}$ is a component of force of $F_2$ in the first direction P1, and $F_{2y}$ is a component of force of $F_2$ in the second direction P2. As described above, the component of force $F_{2x}$ in the first direction may enable the spring 9121 to deform after being compressed. A length of the spring 9121 after being compressed is X2, and an elastic shape variable of the spring 9121 is $\Delta X2$. Therefore, an elastic force of the spring in the first direction P1 is $F_k 2=k \cdot \Delta X2$, where k is a constant.

When the first housing 10 and the second housing 30 are relatively unfolded to a flattened state, a second portion of the third connecting block 9113 of the first bracket 911 abuts against a second portion of the first end 511 of the first rotating arm 51, that is, a second portion of the first mechanical part abuts against a second portion of the second mechanical part, where the first portion of the first mechanical part is different from the second portion of the first mechanical part, and the first portion of the second mechanical part is different from the second portion of the second mechanical part. A component of force $F_x$ of an abutting force $F_1$ of the first rotating arm 51 against the first bracket 911 in the first direction is greater than a component of force $F_{2x}$ of an abutting force $F_2$ of the first rotating arm 51 against the first bracket 911 in the first direction when the first housing 10 and the second housing 30 are folded to an intermediate state or a closed state. Therefore, the compression amount $\Delta X1$ of the spring is greater than $\Delta X2$. Further, $F_{k1}$ is greater than $F_{k2}$, that is, when the first housing 10 and the second housing 30 are relatively unfolded to an unfolded state, a force $F_{k1}$ transferred by the spring 9121 to the first fixed bracket 31 is greater than a force $F_{k2}$ transferred by the first elastic part 912 to the first fixed bracket 31 when the first housing 10 and the second housing 30 are folded to an intermediate state or a closed state. Therefore, when the first housing 10 and the second housing 30 are relatively unfolded to a flattened state, $F_{k1}$ transfers elastic force to the first non-bending part 2001 of the flexible display 200 by using the first fixed bracket 31 and the first housing 10, to restore the crease of the flexible display 200.

In another possible implementation, when the first housing 10 and the second housing 30 are folded relative to each other to an intermediate state or a closed state, the spring 9121 may also be in a free state or an elongated state.

Figure 18:
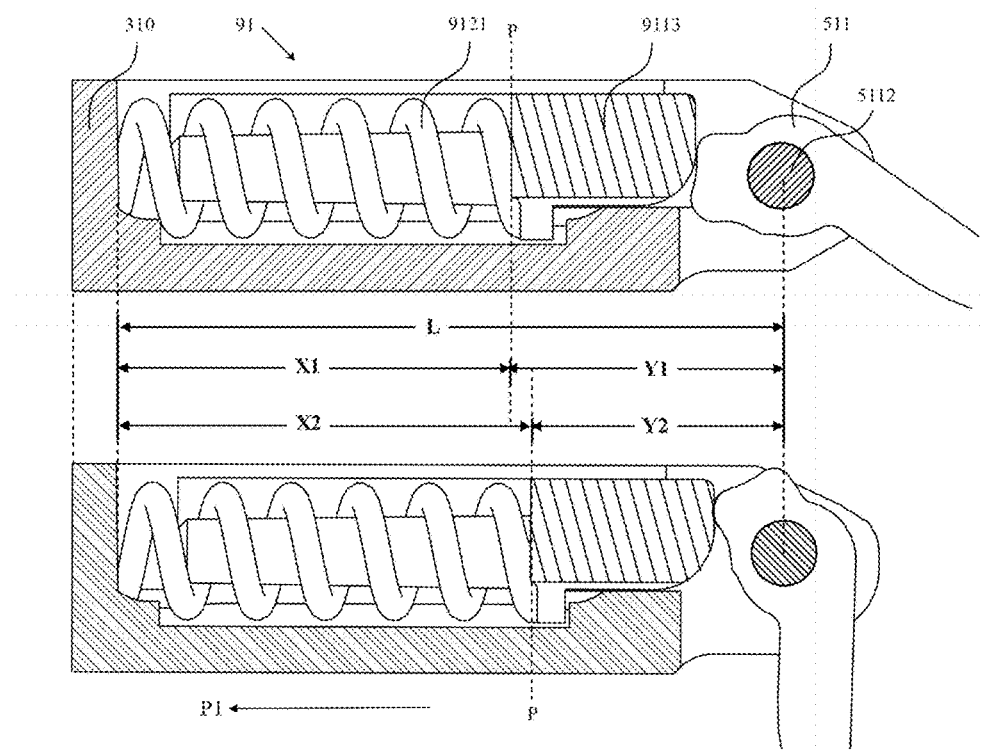
FIG. 18 is a schematic diagram of comparison between spring lengths of an electronic device in a flattened state and a folded state.

FIG. 18 is a schematic diagram of comparison between spring lengths of an electronic device in a flattened state (the upper part of FIG. 18) and a folded state (the lower part of FIG. 18).

For example, as shown in FIG. 18, the first end 511 of the first rotating arm 51 abuts against the third connecting block 9113 of the first bracket 911. A distance between an axis of the stop block 310 and an axis of the rotating shaft 5112 parallel to a length direction of the first elastic part 912 is L. Because the stop block 310 and the connection hole 3111 are fixedly disposed on the first fixed bracket, when relative locations of the rotating shaft 5112 and the connection hole 3111 of the first fixed bracket 31 in the first direction P1 remain unchanged, the distance L remains unchanged. A pressing surface between the first elastic part 912 and the third connecting block 9113 is P.

With reference to FIG. 16 and FIG. 18, when the first housing 10 and the second housing 30 are relatively unfolded to a flattened state, the spring 9121 is in a compressed state. For example, a length of the spring 9121 is X1, a distance between an axis of the rotating shaft 5112 and the abutting surface P in the first direction is Y1, and L=X1+Y1.

With reference to FIG. 17 and FIG. 18, when the first housing 10 and the second housing 30 are folded relative to each other to an intermediate state or a closed state, the spring 9121 may be in a compressed state. For example, a length of the spring 9121 is X2, a distance between an axis of the rotating shaft 5112 and the abutting surface P in the first direction is Y2, and L=X2+Y2.

Because the first end 511 of the first rotating arm 51 is of an abnormal structure, and Y1 is greater than Y2, X1 is less than X2. Therefore, by using a special-shaped structure design of the first end 511 of the first rotating arm 51, when the first housing 10 and the second housing 30 are folded to different states, lengths of the spring 9121 are different. To be specific, elastic shape variables of the spring 9121 are different, and elastic forces transferred by the spring 9121 to the first fixed bracket 31 are different. Therefore, forces transferred by the spring 9121 to the flexible display 200 by using the first fixed bracket 31 and the first housing 10 are different.

In a possible implementation, a pressing surface Q (not shown in the figure) between the third connecting block 9113 and the first end 511 of the first rotating arm 51 is perpendicular to the first direction P1. In this case, a distance between an axis of the rotating shaft 5112 and the pressing surface Q when the electronic device 1000 is in a flattened state is greater than a distance between an axis of the rotating shaft 5112 and the pressing surface Q when the electronic device 1000 is in a closed state.

In a possible implementation, the third connecting block 9113 may be of a special-shaped structure, so that a length of the spring 9121 when the first housing 10 and the second housing 30 are relatively unfolded to a flattened state is less than a length of the spring 9121 when the first housing 10 and the second housing 30 are relatively folded to an intermediate state or a closed state.

For example, according to the special-shaped structure design of the first end 511 of the first rotating arm 51 and/or the third connecting block 9113, when the first housing 10 and the second housing 30 are folded to different states, the first end 511 of the first rotating arm 51 abuts against the third connecting block 9113 of the first bracket 911 at different positions, and the first rotating arm 51 has different abutting forces on the first bracket 911, so that lengths of the springs 9121 are different, the forces transferred to the flexible display 200 are different. In other words, the first portion of the first end 511 of the first rotating arm 51 is different from the second portion of the first end 511 of the first rotating arm 51, and/or the first portion of the third connecting block 9113 is different from the second portion of the third connecting block 9113, that is, the first portion of the first mechanical part is different from the second portion of the first mechanical part, and/or the first portion of the second mechanical part is different from the second portion of the second mechanical part.

Figure 19:
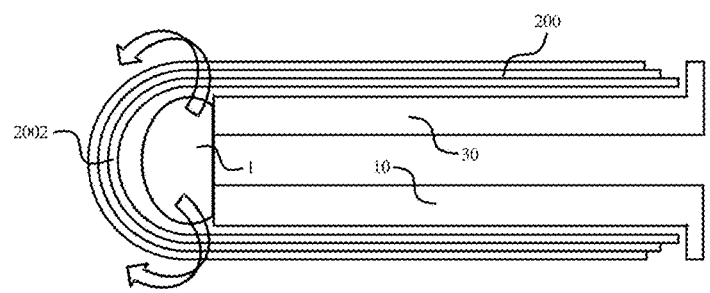
FIG. 19 is a schematic diagram of a closed state of an existing flexible display.

FIG. 19 is a schematic diagram of a closed state of an existing flexible display. For example, the flexible display 200 is of a three-layer composite structure. As shown in FIG. 19, an arrow direction is a tension direction in a bending process of the flexible display. When the included angle α between the first housing 10 and the second housing 30 decreases to 0°, the flexible display 200 is in a closed state, a bending part 2002 of the flexible display 200 generates an outward tension, and the flexible display 200 deforms. A three-layer structure shown in FIG. 19 has layered misalignment.

Figure 20:
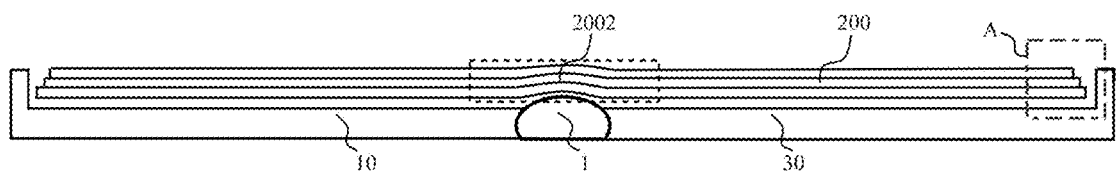
FIG. 20 is a schematic diagram of a flattened state of an existing flexible display.

FIG. 20 is a schematic diagram of a flattened state of an existing flexible display. As shown in FIG. 20, when the flexible display 200 expands from a closed state to a flattened state, tension of the flexible display 200 decreases, and layered misalignment of the three-layer structure at A shown in FIG. 20 decreases. Deformation generated by the flexible display 200 requires a recovery time. Therefore, when the flexible display 200 is unfolded, a crease occurs in an area of the bending part 2002.

Figure 21:
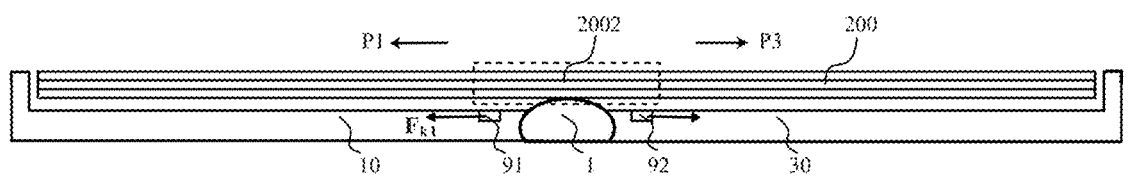
FIG. 21 is a schematic diagram of a flattened state of a flexible display according to this solution.

FIG. 21 is a schematic diagram of a flattened state of a flexible display shown in this solution. As shown in FIG. 21, when the electronic device 1000 expands from a closed state to a flattened state, as shown in FIG. 16 to FIG. 18, a component of force Fix parallel to a length direction of the spring 9121, that is, a first direction P1, causes the spring 9121 to deform, and an elastic force $F_{k1}$ generated by the spring 9121 is further transferred to the first non-bending part 2001 of the flexible display 200. Because a force $F_{k1}$ transferred by the spring 9121 to the first fixed bracket 31 when the electronic device 1000 is in the flattened state is greater than a force $F_{k2}$ transferred by the first elastic part 912 to the first fixed bracket 31 when the electronic device 1000 is in the closed state, a length X1 of the spring 9121 when the electronic device 1000 is in the flattened state is less than a length X2 of the spring 9121 when the electronic device 1000 is in the closed state. Therefore, the first damping member 91 is disposed, so that a force applied along the first direction P1 to the first non-bending part 2001 of the flexible display 200 in the flattened state is greater than a force applied along the first direction P1 to the first non-bending part 2001 in the closed state.

In some embodiments, as shown in FIG. 12 to FIG. 14, the rotating mechanism 20 may further include a second damping member 92. The second damping member 92 may be disposed on a side of the rotating mechanism 20 near the second housing 30. The second damping member 92 may include a second elastic part 922. The second elastic component may include a second damping member 92 and a second fixed bracket 32. Similarly, because the second fixed bracket 32 is fixedly connected to the second housing 30, the second housing 30 is fixedly connected to the second non-bending part 2003 of the flexible display 200. Therefore, by providing the second damping member 92, the second non-bending part 2003 of the flexible display 200 is subject to a force in the third direction P3 in the flattened state greater than a force in the third direction P3 in the closed state. The third direction P3 is parallel to the length direction of the second elastic part 922 and away from the main shaft 1.

In conclusion, when the electronic device 1000 is unfolded from the closed state to the flattened state, a force in the first direction to which the first non-bending part 2001 of the flexible display 200 is subjected is greater than a force in the first direction to which the first non-bending part 2001 of the flexible display 200 is subjected in the closed state. The second non-bending part 2003 is subject to a force in the third direction greater than the force in the third direction in the closed state. Therefore, by disposing the first damping member 91 and the second damping member 92, a layered misalignment phenomenon of the flexible display 200 when the electronic device is unfolded from the closed state to the flattened state can be reduced, crease recovery of the flexible display 200 can be accelerated, thereby improving a flattening effect of the screen.

For example, a structure of the second damping member 92 may be the same as a structure of the first damping member 91, so as to simplify a material type of the rotating mechanism 20 and reduce a design difficulty and a cost of the rotating mechanism 20. A specific structure of the second damping member 92 is not described again in this embodiment of this application. In some other embodiments, a structure of the second damping member 92 may also be different from a structure of the first damping member 91. The first damping member 91 and the second damping member 92 are disposed, so that recovery of a crease of the flexible display when the electronic device is folded to unfolded can be accelerated, flatness of the flexible display can be improved, and user experience can be improved.

Figure 22:
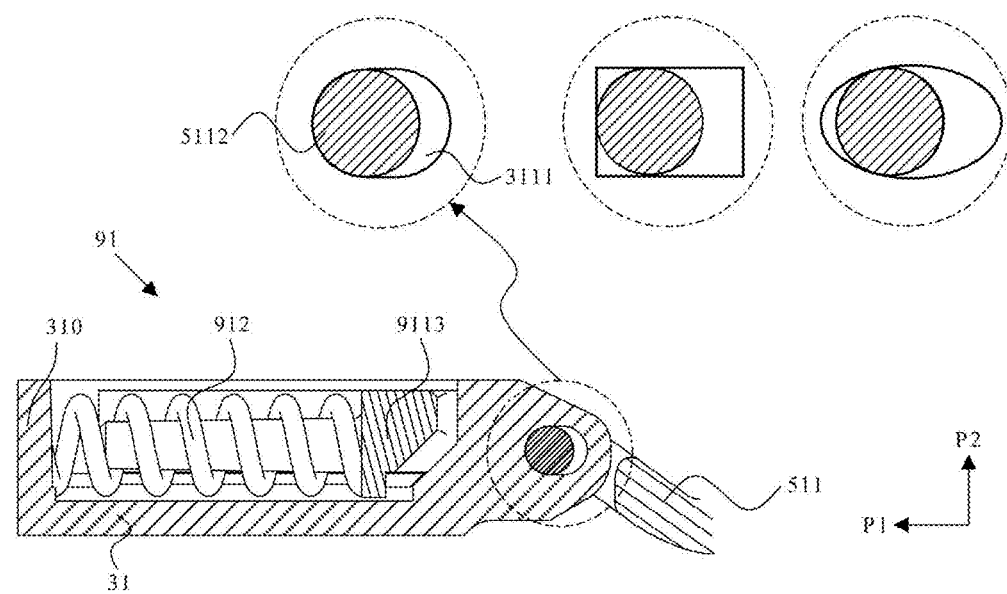
FIG. 22 is a schematic cross-sectional view of the structure shown in FIG. 12 along a line A2-A2.

Refer to FIG. 12, FIG. 15, and FIG. 22 together. FIG. 22 is a schematic cross-sectional view of a position (that is, a cross section A2-A2 shown in FIG. 12 and FIG. 15) of the first connecting block 311 corresponding to the structure shown in FIG. 12.

As shown in FIG. 22, a cross-sectional area of the connection hole 3111 of the first fixed bracket 31 is greater than an area of a cross-sectional area of the rotating shaft 5112. Therefore, the rotating shaft 5112 may move in the connection hole 3111. To ensure reliability of the folded structure in an expansion or folding process, in some embodiments, lengths of the connection hole 3111 and the rotating shaft 5112 in a direction perpendicular to the first damping member 91, that is, the second direction P2, may be equal. As shown in FIG. 22, in some embodiments, a shape of a cross section of the connection hole 3111 is a waist-round shape. In some other embodiments, a cross-sectional shape of the connection hole 3111 may be a rectangle, an ellipse, or the like.

Figure 23A:
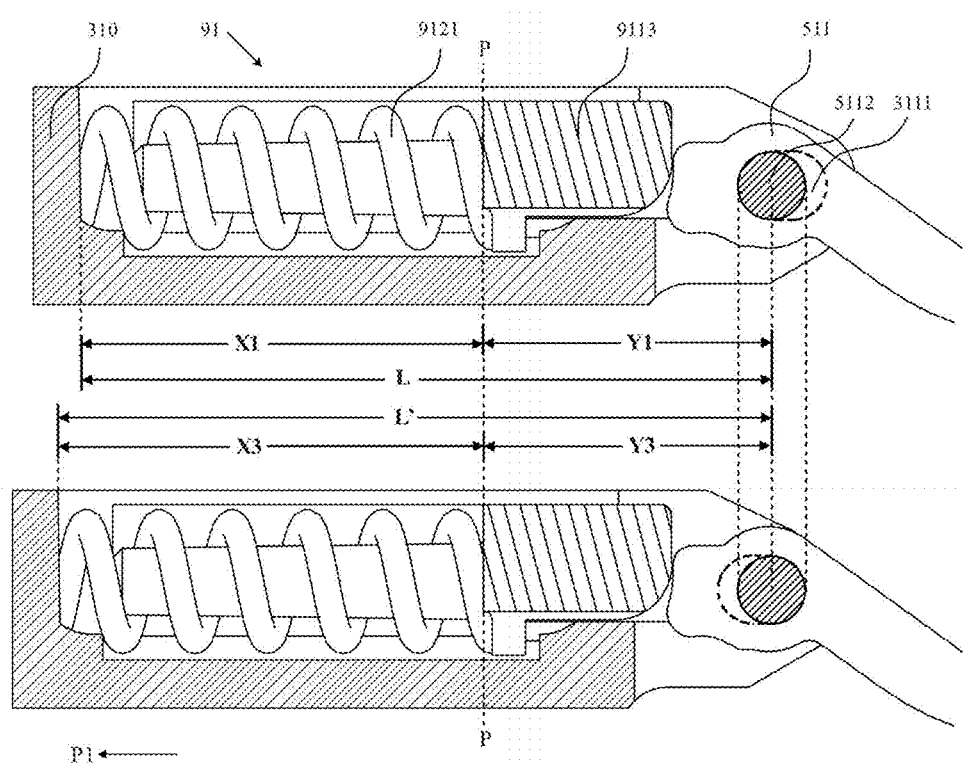
FIG. 23a is a schematic diagram of a fitting relationship between a rotating shaft and a connection hole at an early stage of use of a flexible display and after a period of use.

FIG. 23*a* is a schematic diagram of a fitting relationship between a rotating shaft 5112 and a connection hole 3111 at an early stage (the upper part of FIG. 23*a*) of use of a flexible display and after a period of use (the lower part of FIG. 23*a*).

As shown in FIG. 23*a*, an example in which a cross-sectional shape of the connection hole 3111 is a waist-round shape is used. At an early stage of use of the flexible display 200, for example, within one year of use, the rotating shaft 5112 is tangent to the connection hole 3111 on a first side wall close to the first housing 10, that is, on a left side of the waist-round shape shown in FIG. 23*a*, a distance between an axis center of the rotating shaft 5112 and a stop block 310 in a direction that is parallel to a length direction of the first elastic part 912, that is, a first direction P1, is L. When the first housing 10 and the second housing 30 are relatively unfolded to a flattened state, the spring 9121 is in a compressed state. With reference to FIG. 16, for example, a length of the spring 9121 is X1, a compression amount of the spring 9121 is ΔX1, a distance between the axis center of the rotating shaft 5112 and the abutting surface P in the first direction P1 is Y1, and L=X1+Y1.

As a use time becomes longer, for example, a use time of the folding apparatus 100 exceeds two years, after the flexible display 200 is folded and aged for a plurality of times, deformation generated by screen layering is difficult to restore to an original state, and the flexible display 200 slightly becomes longer. Because the first housing 10 is fixedly connected to the first non-bending part 2001 of the flexible display 200, the first fixed bracket 31 is fixedly connected to the first housing 10. As the flexible display 200 becomes longer, the first non-bending part 2001 of the flexible display 200 drives the first housing 10 and the first fixed bracket 31 to slightly move away from the main shaft 1, that is, the connection hole 3111 moves in a direction away from the main shaft 1 relative to the rotating shaft 5112, until the rotating shaft 5112 is tangent to the second side wall of the connection hole 3111 away from the first housing 10, that is, on the right side of the waist-round shape shown in FIG. 23*a*. A first side wall of the connection hole 3111 is opposite to a second side wall.

As shown in FIG. 23*a*, after the flexible display 200 is aged after being used for a period of time, a distance between an axis center of the rotating shaft 5112 and the stop block 310 parallel to the length direction of the first elastic part 912 is L'. When the first housing 10 and the second housing 30 are relatively unfolded to a flattened state, the spring 9121 is in a compressed state. For example, a length of the spring 9121 is X3, a compression amount of the spring 9121 is ΔX3, a distance between the axis center of the rotating shaft 5112 and the abutting surface P in the first direction P1 is Y3, and L'=X3+Y3. As described above, L' is greater than L.

According to a shape design of the connection hole 3111 of the first fixed bracket 31, the folding apparatus 100 may slightly extend as the flexible display 200 ages, so that the flexible display 200 is more attached to the folding apparatus 100, and a crease of the flexible display 200 is weakened.

As shown in FIG. 23*a*, in an implementation, when the first housing 10 and the second housing 30 are relatively unfolded to a flattened state, the first end 511 of the first rotating arm 51 always abuts against the first connecting block 311, and a pressing position remains unchanged. Therefore, a distance between the axis center of the rotating shaft 5112 and the abutting surface P in the first direction P1 remains unchanged, that is, Y1=Y3. Therefore, X1 is less than X3, that is, the compression amount ΔX3 of the spring is less than ΔX1. Therefore, after the flexible display 200 is aged after being used for a period of time, when the first housing 10 and the second housing 30 are relatively unfolded to a flattened state, a compression amount of the spring 9121 decreases, and a force transferred by the spring 9121 to the flexible display 200 by using the first fixed bracket 31 and the first housing 10 decreases.

Figure 23B:
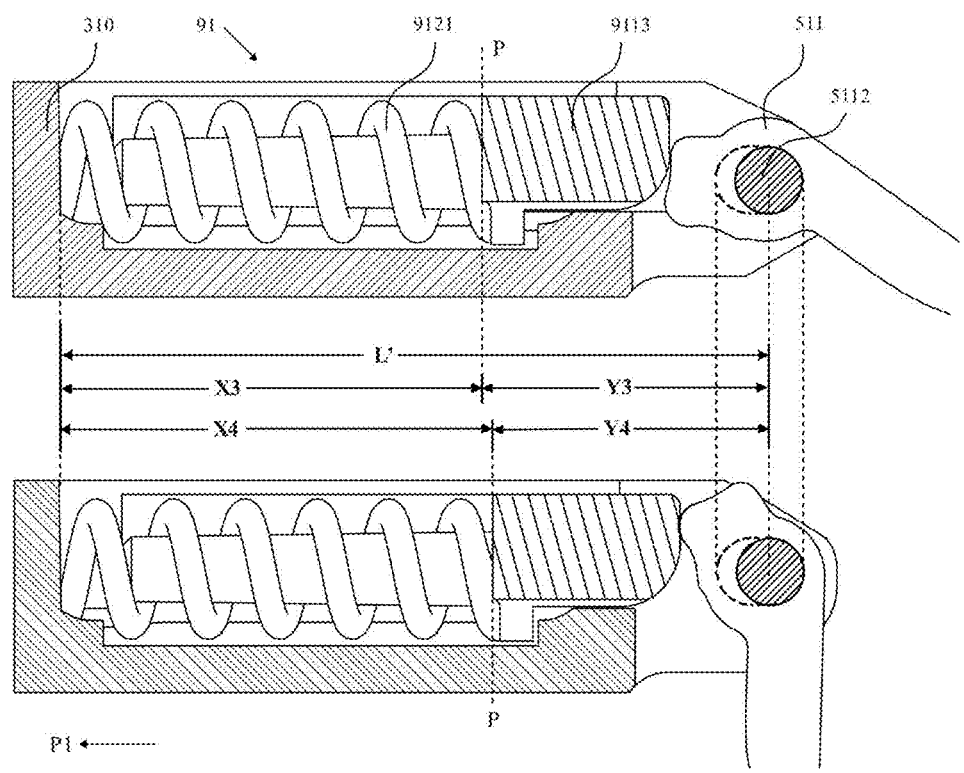
FIG. 23b is a schematic diagram of comparison between spring lengths of an electronic device in a flattened state and a folded state after aging of a flexible display.

FIG. 23*b* is a schematic diagram of comparison between spring lengths of an electronic device in a flattened state (the upper part of FIG. 23*b*) and a folded state (the lower part of FIG. 23*b*) after aging of a flexible display.

For example, as shown in FIG. 23*b*, a distance between an axis center of the stop block 310 and an axis center of the rotating shaft 5112 parallel to a length direction of the first elastic part 912 is L'. Because the stop block 310 and the connection hole 3111 are fixedly disposed on the first fixed bracket, when relative locations of the rotating shaft 5112 and the connection hole 3111 of the first fixed bracket 31 in the first direction P1 remain unchanged, the distance L' remains unchanged.

As shown in FIG. 23*b*, when the first housing 10 and the second housing 30 are relatively unfolded to a flattened state, the spring 9121 is in a compressed state. For example, a length of the spring 9121 is X3, a distance between an axis center of the rotating shaft 5112 and the abutting surface P in the first direction is Y3, and L'=X3+Y3. When the first housing 10 and the second housing 30 are folded relative to each other to an intermediate state or a closed state, the spring 9121 may be in a compressed state. For example, a length of the spring 9121 is X4, a distance between an axis center of the rotating shaft 5112 and the abutting surface P in the first direction is Y4, and L'=X4+Y4.

Because the first end 511 of the first rotating arm 51 is of an abnormal structure, and Y3 is greater than Y4, X3 is less than X4. Similarly, according to an abnormal-shaped structure design of the first end 511 of the first rotating arm 51, after the flexible display 200 ages, a force that is applied to the first non-bending part 2001 of the flexible display 200 in the spread state and that is along the first direction P1 is greater than a force that is applied to the first non-bending part 2001 of the flexible display 200 in the closed state and that is along the first direction P1.

With reference to FIG. 23*a* and FIG. 23*b*, after the flexible display 200 ages and becomes longer, a crease of the flexible display 200 in a flattened state is jointly weakened by using an elliptical hole and an abnormal-shaped structure design of the first end 511 of the first rotating arm 51.

As shown in FIG. 14, for example, a shape of the connection hole 3211 of the second fixed bracket 32 may be the same as or similar to a shape of the connection hole 3111 of the first fixed bracket. Because the second housing 30 is fixedly connected to the second non-bending part 2003 of the flexible display 200, the second fixed bracket 32 is fixedly connected to the second housing 30. Based on a reason the same as or similar to the foregoing, as a use time of the screen becomes longer, the rotating shaft 5212 may move in the connection hole 3211, and the second non-bending part 2003 of the flexible display 200 drives the second housing 30 and the second fixed bracket 32 to slightly move away from the main shaft 1. In conclusion, because the flexible display 200 is fastened to the folding apparatus 100, by using shape design of the connection hole 3111 of the first fixed bracket 31 and the connection hole 3211 of the second fixed bracket 32, the folding apparatus 100 may slightly extend as the flexible display 200 ages, so that the flexible display 200 is more attached to the folding apparatus 100, and creases of the flexible display 200 are weakened, so that the flexible display 200 is flatter when the electronic device 1000 is in a flattened state, thereby improving user experience.

Figure 24:
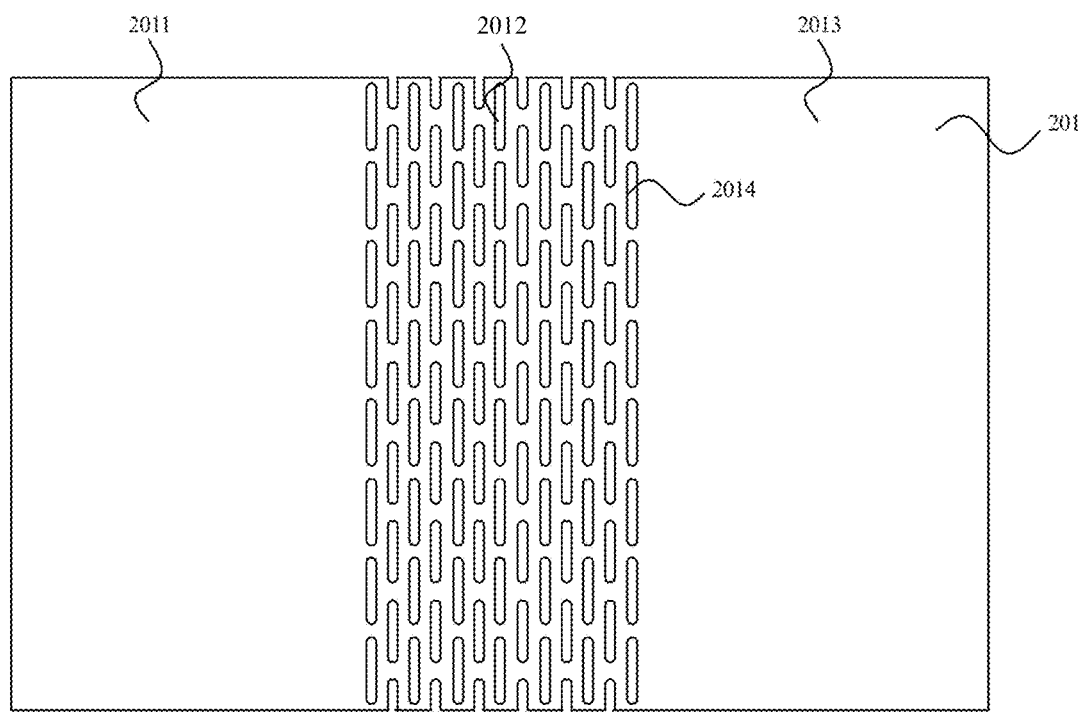
FIG. 24 is a schematic diagram of a structure of a supporting plate of a flexible display.

In some embodiments, the flexible display 200 may include a holding plate 201. The holding plate 201 is disposed on a surface that is of the flexible display 200 and that is fixedly connected to the folding apparatus 100, that is, a non-display side of the flexible display 200, to improve overall strength of the flexible display 200. Specifically, the holding plate 201 may be a plate-like structure having specific rigidity, such as a metal plate, a glass plate, or a plastic plate. As shown in FIG. 24, the holding plate 201 includes a first fastening portion 2011, a connection portion 2012, and a second fastening portion 2013 that are sequentially connected. For example, through holes 2014 that penetrate the upper and lower plate surfaces of the holding plate 201 may be disposed at the connection portion 2012, thereby reducing rigidity of the area. When the flexible display 200 ages and becomes longer, the connection portion 2012 provided with the through hole 128 may deform, so that the holding plate 201 deforms.

Figure 25:
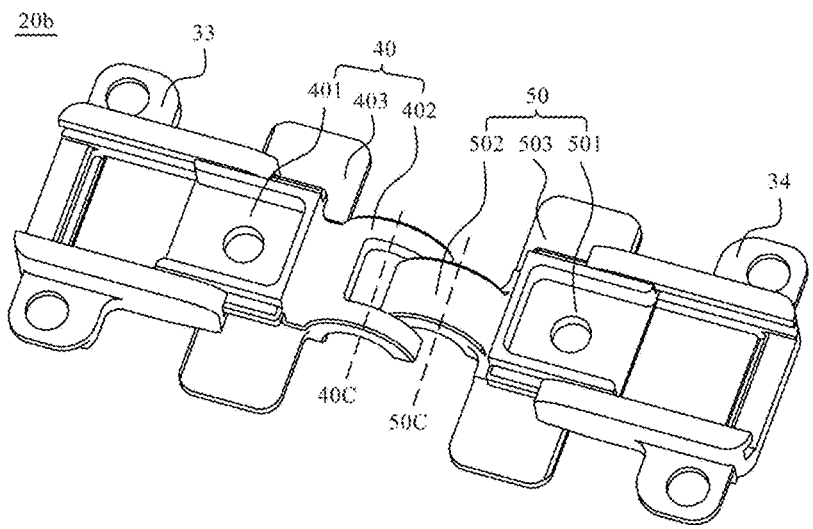
FIG. 25 is a schematic diagram of a structure of a middle connection component shown in FIG. 11.
Figure 26:
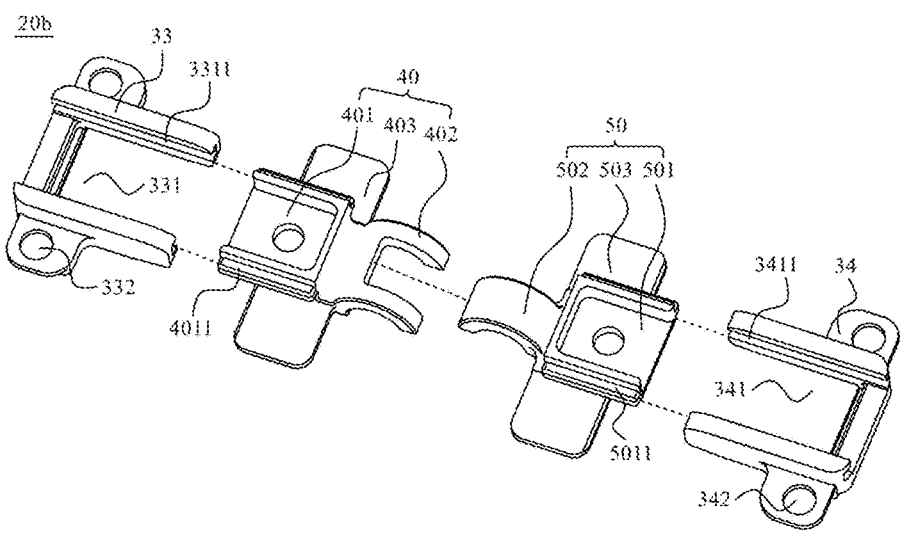
FIG. 26 is a schematic exploded view of a middle connection component shown in FIG. 25.

Refer to both FIG. 25 and FIG. 26. FIG. 25 is a schematic diagram of a structure of the middle connection component 20b shown in FIG. 11, and FIG. 26 is a schematic exploded structural diagram of the middle connection component 20b shown in FIG. 25.

In some embodiments, the rotating mechanism 20 further includes a third fixed bracket 33, a fourth fixed bracket 34, a third transmission arm 40, and a fourth transmission arm 50. The third fixed bracket 33 may be fastened to the first housing 10, one end of the third transmission arm 40 is rotatably connected to the main shaft 1, and the other end is slidably connected to the third fixed bracket 33. The fourth fixed bracket 34 may be fastened to the second housing 30, one end of the fourth transmission arm 50 is rotatably connected to the main shaft 1, and the other end is slidably connected to the fourth fixed bracket 34.

As shown in FIG. 26, in some embodiments, the third fixed bracket 33 may have a plurality of fastening holes 332, and the fourth fixed bracket 34 may have a plurality of fastening holes 342. With reference to FIG. 8, the plurality of fastening holes 332 of the third fixed bracket 33 may be aligned with the plurality of fastening holes 1021 of the first positioning plate 102, and the third fixed bracket 33 and the first positioning plate 102 are locked by using fasteners, to fasten the third fixed bracket 33 and the first housing 10. With reference to FIG. 9, the plurality of fastening holes 342 of the fourth fixed bracket 34 may be aligned with the plurality of fastening holes 3021 of the second positioning plate 302, and the third fixed bracket 33 and the second positioning plate 302 are locked by using fasteners, so as to fasten the fourth fixed bracket 34 and the second housing 30. The fastener may include but is not limited to a screw, a bolt, a rivet, and the like. In some other embodiments, another connection structure may also be formed between the third fixed bracket 33 and the first housing 10, and between the fourth fixed bracket 34 and the second housing 30. This is not strictly limited in this application.

In this embodiment, the third fixed bracket 33, the fourth fixed bracket 34, the third transmission arm 40, and the fourth transmission arm 50 are disposed in the rotating mechanism 20, to increase interaction forces between the rotating mechanism 20 and the first housing 10 and between the rotating mechanism 20 and the second housing 30, so that the folding apparatus 100 is more easily folded and unfolded.

As shown in FIG. 26, in some embodiments, the third fixed bracket 33 has a fifth sliding groove 331, and a side wall of the fifth sliding groove 331 may have recessed guide space 3311. The third transmission arm 40 includes a sliding end 401, a rotating end 402, and a supporting block 403. The sliding end 401 of the third transmission arm 40 has a fifth flange 4011. Through cooperation between the fifth flange 4011 and the guide space 3311 of the fifth sliding groove 331, a sliding connection between the sliding end 401 of the third transmission arm 40 and the fifth sliding groove 331 may be implemented, so as to implement a sliding connection between the third transmission arm 40 and the third fixed bracket 33. The rotating end 402 of the third transmission arm 40 is in an arc shape, and a rotation connection may be implemented between the rotating end 402 of the third transmission arm 40 and the main shaft 1 by using a virtual shaft. In some other embodiments, a rotatable connection may also be implemented between the third transmission arm 40 and the main shaft 1 by using a solid shaft. This is not strictly limited in this application. Specifically, that the mechanical part is connected to the main shaft 1 by using a virtual shaft means that the mechanical part cooperates with the movable space formed inside the main shaft 1, and that the mechanical part is connected to the main shaft 1 by using a solid shaft means that the mechanical part is connected to the main shaft 1 by using a rotating shaft such as a pin.

As shown in FIG. 26, in some embodiments, the fourth fixed bracket 34 has a sixth sliding groove 341, and a side wall of the sixth sliding groove 341 may have a recessed guide space 3411. The fourth transmission arm 50 includes a sliding end 501, a rotating end 502, and a support block 503. The sliding end 501 of the fourth transmission arm 50 has a sixth flange 5011. Through cooperation between the sixth flange 5011 and the guide space 3411 of the sixth sliding groove 341, a sliding connection between the sliding end 501 of the fourth transmission arm 50 and the sixth sliding groove 341 can be implemented, so as to implement a sliding connection between the fourth transmission arm 50 and the fourth fixed bracket 34. The rotating end 502 of the fourth transmission arm 50 is in an arc shape. A rotatable connection may be implemented between the rotating end 502 of the fourth transmission arm 50 and the main shaft 1 by using a virtual shaft. In some other embodiments, a rotatable connection may also be implemented between the fourth transmission arm 50 and the main shaft 1 by using a solid shaft. This is not strictly limited in this application.

Figure 27:
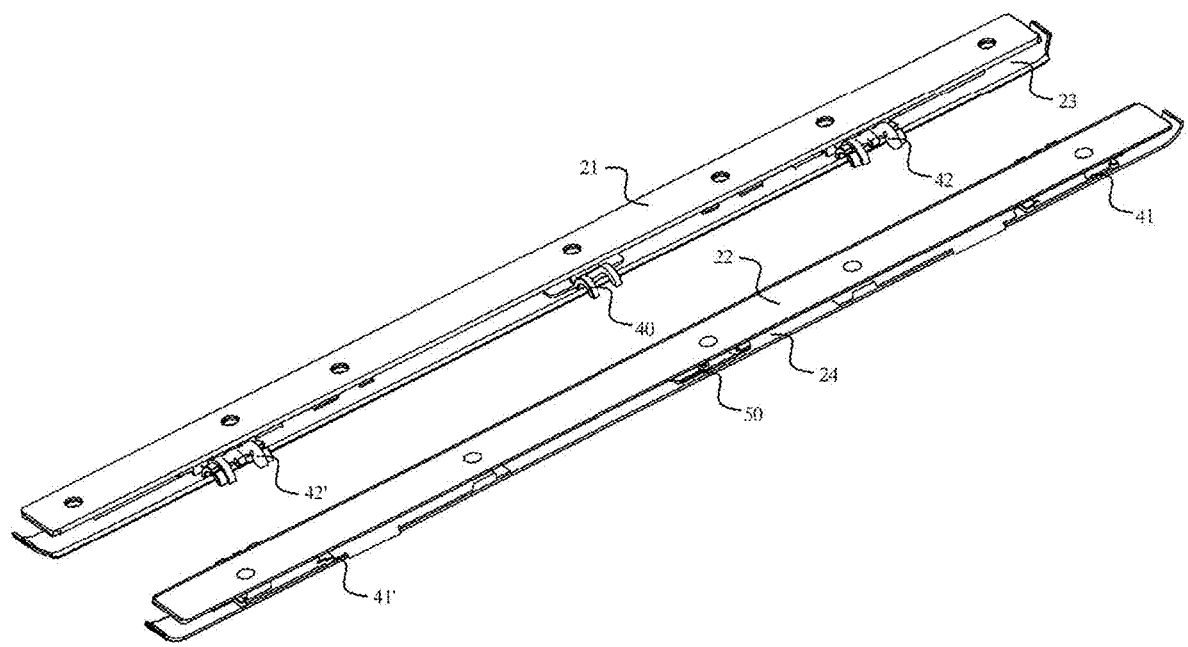
FIG. 27 is a schematic diagram of a partial structure of a rotating mechanism shown in FIG. 7.
Figure 28:
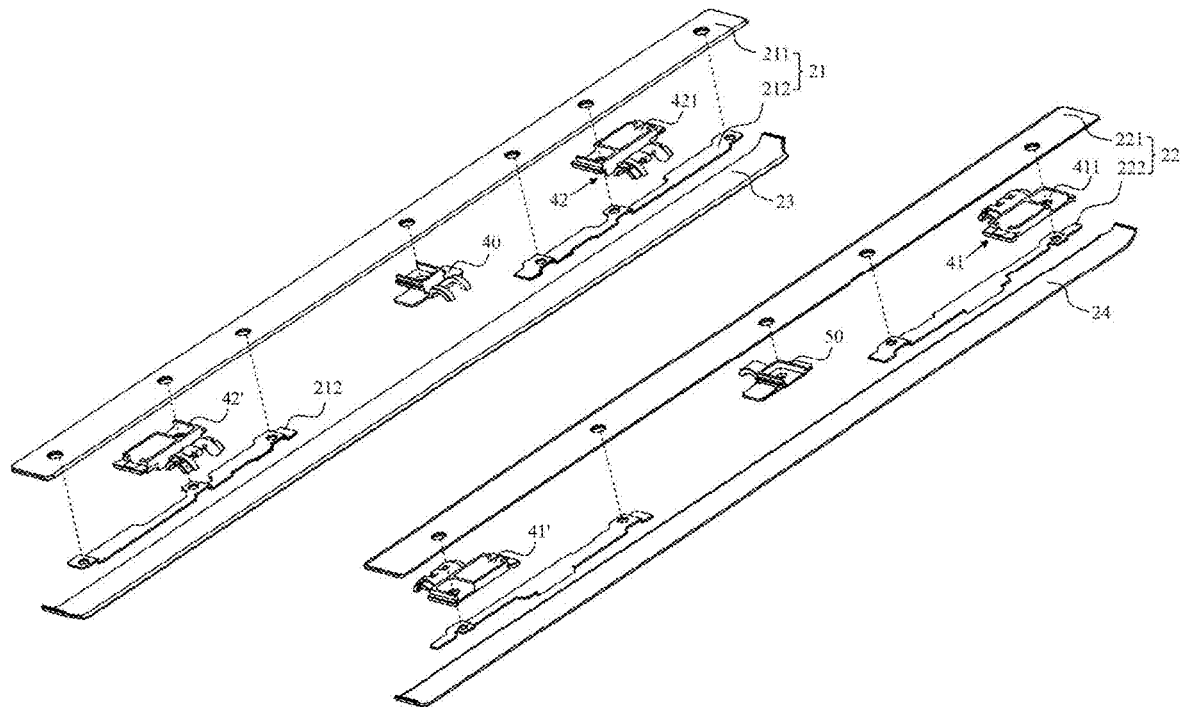
FIG. 28 is a schematic exploded view of the structure shown in FIG. 27.

Refer to FIG. 27 and FIG. 28 together. FIG. 27 is a schematic diagram of a partial structure of the rotating mechanism 20 shown in FIG. 7, and FIG. 28 is a schematic exploded view of the structure shown in FIG. 27.

As shown in FIG. 28, the first supporting plate 21 includes a first plate member 211 and a second plate member 212, and the first plate member 211 and the second plate member 212 are respectively located on two sides of the second transmission arm 42. The first plate member 211, the sliding end 421 of the second transmission arm 42, and the second plate member 212 are sequentially fastened by using fasteners. The second supporting plate 22 includes a third plate member 221 and a fourth plate member 222, and the third plate member 221 and the fourth plate member 222 are respectively located on two sides of the first transmission arm 41. The third plate member 221, the sliding end 411 of the first transmission arm 41, and the fourth plate member 222 are sequentially fastened by using fasteners. The first supporting plate 21 and the second supporting plate 22 are divided into two plate members, which can facilitate production and manufacturing. In some other embodiments, the first supporting plate 21 and/or the second supporting plate 22 may alternatively be an integrally formed mechanical part.

In some embodiments, as shown in FIG. 27 and FIG. 28, the first supporting plate 21 is fixedly connected to the sliding end 421 of the second transmission arm 42, and the second supporting plate 22 is fixedly connected to the sliding end 411 of the first transmission arm 41. The first shielding plate 23 is located on a side that is of the second plate member 212 of the first supporting plate 21 and that is opposite to the second transmission arm 42, and is fixedly connected to the second plate member 212 of the first shielding plate 21. The second shielding plate 24 is located on a side that is of the second plate member 222 of the second supporting plate 22 and that is opposite to the first transmission arm 41, and is fixedly connected to the second plate member 222 of the second shielding plate 22. The first shielding plate 23 and the second plate member 212, and the second shielding plate 24 and the fourth plate member 222 may be fastened to each other in a manner such as bonding.

In this embodiment, the first supporting plate 21, the first shielding plate 23, and the second transmission arm 42 are assembled into one component, and the second supporting plate 22, the second shielding plate 24, and the first transmission arm 41 are assembled into one component. Therefore, the second transmission arm 42 can directly control motion tracks of the first supporting plate 21 and the first shielding plate 23, and the first transmission arm 41 can directly control motion tracks of the second supporting plate 22 and the second shielding plate 24. In this way, precision is high in controlling movement processes of the first supporting plate 21, the second supporting plate 22, the first shielding plate 23, and the second shielding plate 24, and hysteresis is small, to implement accurately extending or retracting when the folding apparatus 100 is rotated, so as to meet a requirement of supporting the flexible display 200 and a self-shielding requirement of the rotating mechanism 20.

For example, the first supporting plate 21 is fastened to the second transmission arm 42 of the first end connection component 20a, and the first supporting plate 21 is further fastened to the second transmission arm 42' of the second end connection component 20a'. The first shielding plate 23 is fastened to the second transmission arm 42 of the first end connection component 20a, the first shielding plate 23 is further fastened to the second transmission arm 42' of the second end connection component 20a', the first supporting plate 21 may be further fastened to the third transmission arm 40 of the middle connection component 20b, and the first shielding plate 23 may be further fastened to the third transmission arm 40 of the middle connection component 20b. The second supporting plate 22 is fixedly connected to the first transmission arm 41 of the first end connection component 20a, the second supporting plate 22 is further fixedly connected to the first transmission arm 41' of the second end connection component 20a', and the second supporting plate 22 may be further fixedly connected to the fourth transmission arm 50 of the middle connection component 20b. The second shielding plate 24 is fixedly connected to the first transmission arm 41 of the first end connection component 20a, the second shielding plate 24 is further fixedly connected to the first transmission arm 41' of the second end connection component 20a', and the second shielding plate 24 may be further fixedly connected to the fourth transmission arm 50 of the middle connection component 20b. In this case, the plurality of connection components (20a, 20a', and 20b) may jointly drive the first supporting plate 21, the first shielding plate 23, the second supporting plate 22, and the second shielding plate 24 to move, to reduce motion control difficulty and improve motion control precision.

In some embodiments, the transmission arm may be fixedly connected to the supporting plate or the shielding plate by using a fastener. For example, the sliding end of the transmission arm is fixedly connected to the supporting plate by using the fastener, or the sliding end of the transmission arm is fixedly connected to the shielding plate by using the fastener. The fastener includes but is not limited to a screw, a bolt, a rivet, a dowel pin, and the like. Concave-convex fitting structures may be further disposed between the sliding ends of the plurality of transmission arms and the supporting plate, and between the sliding ends of the plurality of transmission arms and the shielding plate, so that assembly precision and reliability are improved.

In this embodiment, a structure of the second supporting plate 22 may be the same as or similar to a structure of the first supporting plate 21, and a structure of the second shielding plate 24 may be the same as or similar to a structure of the first shielding plate 23, so as to simplify material types of the rotating mechanism 20, and reduce design difficulty and costs of the rotating mechanism 20.

Figure 29:
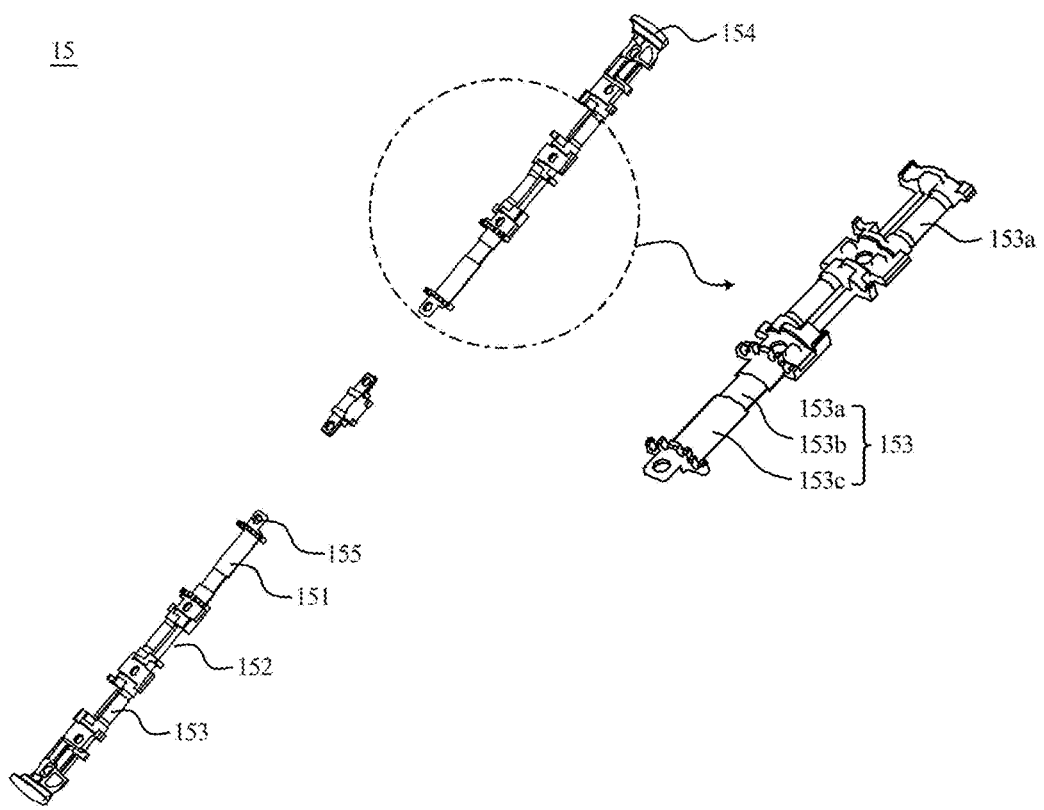
FIG. 29 is a schematic diagram of a structure of a main inner shaft shown in FIG. 11.
Figure 30:
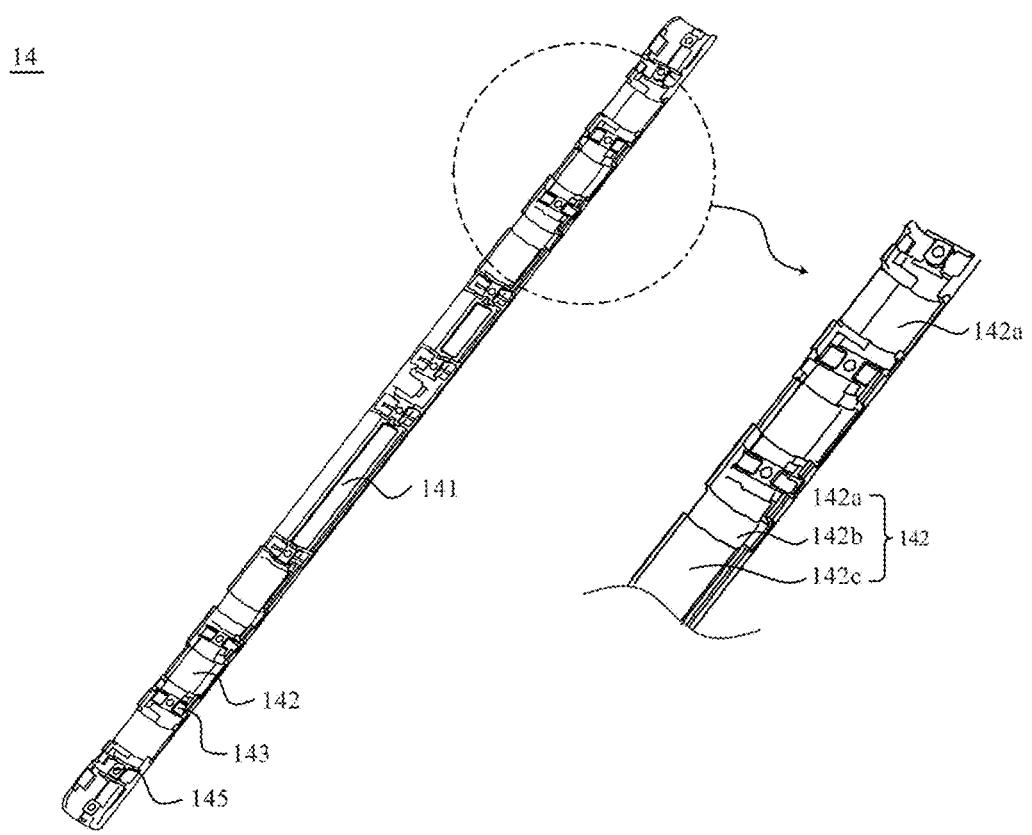
FIG. 30 is a schematic diagram of a structure of a main outer shaft shown in FIG. 11 from another angle.

Refer to FIG. 29 and FIG. 30 together. FIG. 29 is a schematic diagram of a structure of the main inner shaft 15 shown in FIG. 11, and FIG. 30 is a schematic diagram of a structure of the main outer shaft 14 shown in FIG. 11 at another angle.

In some embodiments, as shown in FIG. 29, the main inner shaft 15 includes a main inner shaft body 151, a plurality of grooves 152, a plurality of projections 153, two end stoppers 154, and a plurality of fastening holes 155. The main inner shaft body 151 may be divided into a plurality of segments to reduce weight. The plurality of projections 153 are formed on the main inner shaft body 151, the plurality of grooves 152 are formed on the main inner shaft body 151 and/or the plurality of projections 153, and the projections 153 and the grooves 152 are combined with each other to form a plurality of three-dimensional space structures. The two end stoppers 154 are fastened at two ends of the main inner shaft body 151. The plurality of fastening holes 155 are formed on the main inner shaft body 151. Some grooves 152, some projections 153, and some fastening holes 155 are schematically marked in FIG. 29.

As shown in FIG. 30, the main outer shaft 14 includes a main outer shaft body 141, a plurality of grooves 142, a plurality of projections 143, and a plurality of fastening holes 145. The main outer shaft body 141 is roughly arc-shaped plate-shaped. The plurality of projections 143 are formed on the main outer shaft body 141, the plurality of grooves 142 are formed on the main outer shaft body 141 and/or the plurality of projections 143, and the projections 143 and the grooves 142 are combined with each other to form a plurality of three-dimensional spatial structures. The plurality of fastening holes 145 are formed on the plurality of projections 143. Some grooves 142, some projections 143, and some fastening holes 145 are schematically marked in FIG. 30.

After the main outer shaft 14 and the main inner shaft 15 are mutually fixed, the main outer shaft body 141, the main inner shaft body 151, and the two end stoppers 154 are jointly enclosed to form internal space of the main shaft 1. The two end stoppers 154 are exposed. A plurality of fastening holes 145 of the main outer shaft 14 are aligned with a plurality of fastening holes 155 of the main inner shaft 15, and the main inner shaft 15 and the main outer shaft 14 are fastened by using fasteners (not shown in the figure). The fastener includes but is not limited to a screw, a bolt, a rivet, a pin, and the like.

After the main outer shaft 14 and the main inner shaft 15 are assembled, the plurality of grooves and protrusions on the main outer shaft 14 and the plurality of grooves and protrusions on the main inner shaft 15 may jointly form a plurality of movable spaces of the main shaft 1, and mechanical parts of the plurality of connecting components (20a, 20a', and 20b) are movably mounted in the plurality of movable spaces of the main shaft 1, so as to implement connection to the main shaft 1. The main inner shaft 15 and the main outer shaft 14 are separately designed. This helps reduce a difficulty of making the main shaft 1, and improve precision of making the main shaft 1 and a product yield rate.

For example, some movable space structures of the plurality of movable spaces of the main shaft 1 are the same, and some movable space structures are different. Movable spaces with different structures are used to cooperate with mechanical parts with different structures, so that a connection structure between the main shaft 1 and a plurality of connection components (20a, 20a', and 20b) is more flexible and diversified. The movement space having a same structure is used to cooperate with the mechanical part having a same structure. This helps reduce design difficulty and costs of the main shaft 1 and the connection component.

It may be understood that the main shaft 1 in this embodiment of this application may alternatively have another structure. This is not strictly limited in this application.

Figure 31:
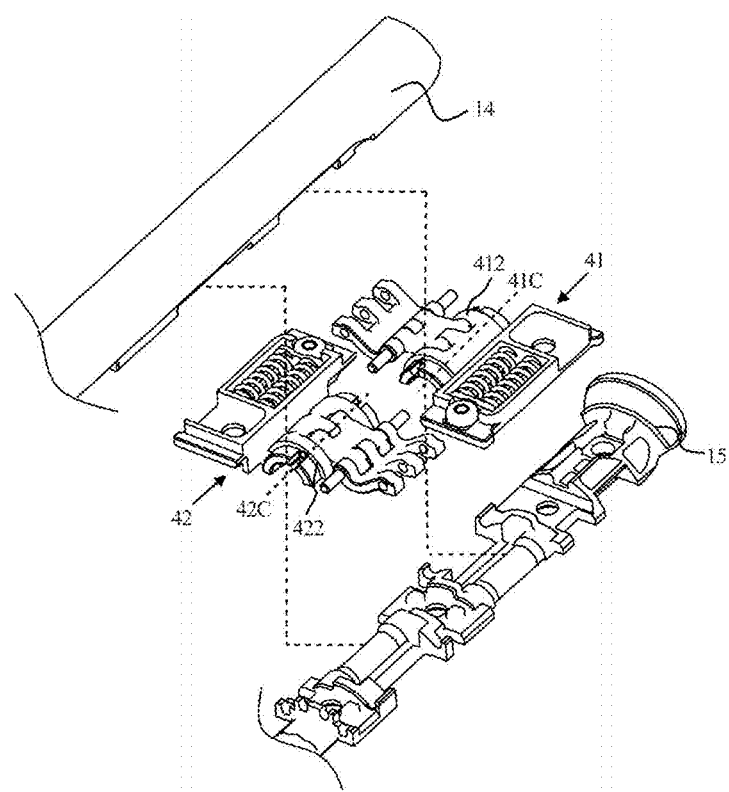
FIG. 31 is a schematic diagram of a fitting relationship between a partial structure shown in FIG. 14 and a main shaft.
Figure 32:
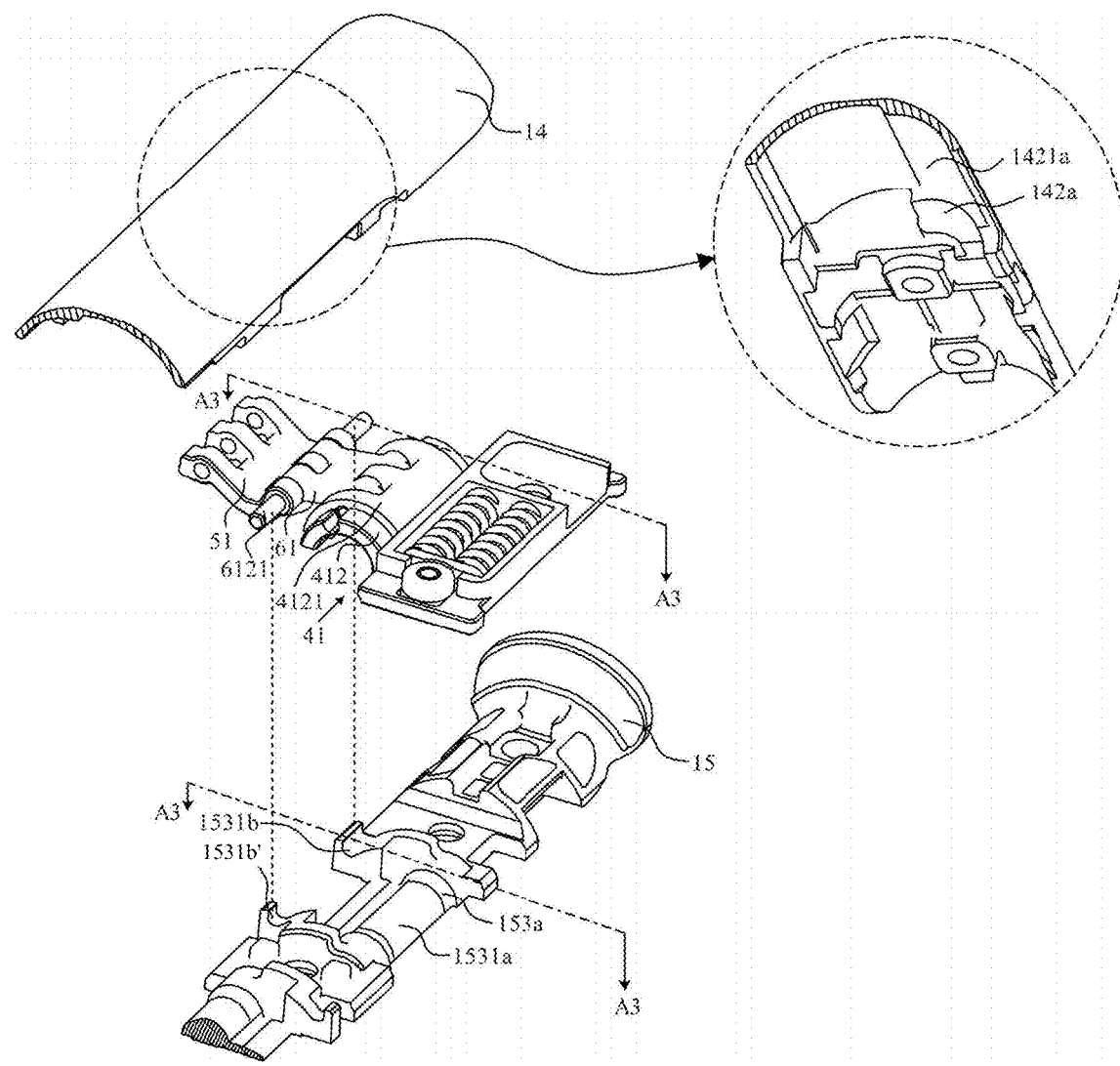
FIG. 32 is a schematic diagram of a fitting relationship between a partial structure shown in FIG. 31 and a main shaft.

FIG. 31 is a schematic diagram of a fitting relationship between the partial structure shown in FIG. 14 and the main shaft 1, and FIG. 32 is a schematic diagram of a fitting relationship between the partial structure shown in FIG. 31 and the main shaft 1. As shown in FIG. 31, the main outer shaft 14 and the main inner shaft 15 are jointly enclosed to form a plurality of movable spaces of the main shaft 1 for matching with different mechanical parts of the connection component.

In some embodiments, as shown in FIG. 31, the rotating end 412 of the first transmission arm 41 is arc-shaped. The rotating end 412 of the first transmission arm 41 is rotatably connected to the main shaft 1. A rotation axis along which the first transmission arm 41 rotates relative to the main shaft 1 may be a first rotation axis 41C.

In some embodiments, as shown in FIG. 32, the rotating end 412 of the first transmission arm 41 cooperates with the arc-shaped groove 142a of the main outer shaft 14 and the arc-shaped projection 153a of the main inner shaft 15, so as to implement a rotational connection to the main shaft 1. The rotating end 412 of the first transmission arm 41 may further include a limiting protrusion 4121, and the limiting protrusion 4121 is formed at an inner position and/or an outer position of the rotating end 412. The arc-shaped groove 142a of the main outer shaft 14 may further include a limiting groove 1421a, the arc-shaped projection 153a of the main inner shaft 15 may further include a limiting groove 1531a, and the limiting protrusion 4121 of the first transmission arm 41 cooperates with the limiting groove 1421a and/or the limiting groove 1531a of the main shaft 1. In this way, the first transmission arm 41 and the main shaft 1 are mutually limited in an axial direction of the main shaft 1, so as to improve reliability of the connection structure. It may be understood that one limiting groove (1531a or 1421a) is disposed in a same movable space, so that the mechanical part can be limited in an axial direction of the main shaft 1. Certainly, in some embodiments, two limiting grooves (1531a and 1421a) may also be disposed in a same movable space, to improve limiting stability. The main inner shaft 15 may further include a limiting groove 1531b and a limiting groove 1531b', and two ends of the rotating shaft 6121 respectively cooperate with the limiting groove 1531b and the limiting groove 1531b'.

In some embodiments, as shown in FIG. 31, the rotating end 422 of the second transmission arm 42 is arc-shaped. A rotating end 422 of the second transmission arm 42 is rotatably connected to the main shaft 1. A rotation axis along which the second transmission arm 41 rotates relative to the main shaft 1 may be a second rotation axis 42C. Movable space in which the main shaft 1 accommodates the first transmission arm 41 and the second transmission arm 42 is disposed in pairs, and is of a centrosymmetric structure. For a fitting relationship between the second transmission arm 42 and the main shaft 1, refer to the fitting relationship between the first transmission arm 41 and the main shaft 1. Details are not described in this application.

In this embodiment, the first transmission arm 41 and the second transmission arm 42 are connected to the main shaft 1 by using a virtual shaft. A rotating connection structure is simple, and a small space is occupied. This helps reduce a thickness of the rotating mechanism 20, so that the folding apparatus 100 and the electronic device 1000 are lighter and thinner. In some other embodiments, the first transmission arm 41 and/or the second transmission arm 42 may also be connected to the main shaft 1 by using a solid shaft. This is not strictly limited in this embodiment of this application.

The following describes a structure of the first end connection component 20a with reference to a plurality of schematic structural diagrams and internal structural diagrams of the folding apparatus 100 in a flattened state, an intermediate state, and a closed state respectively.

Figure 33:
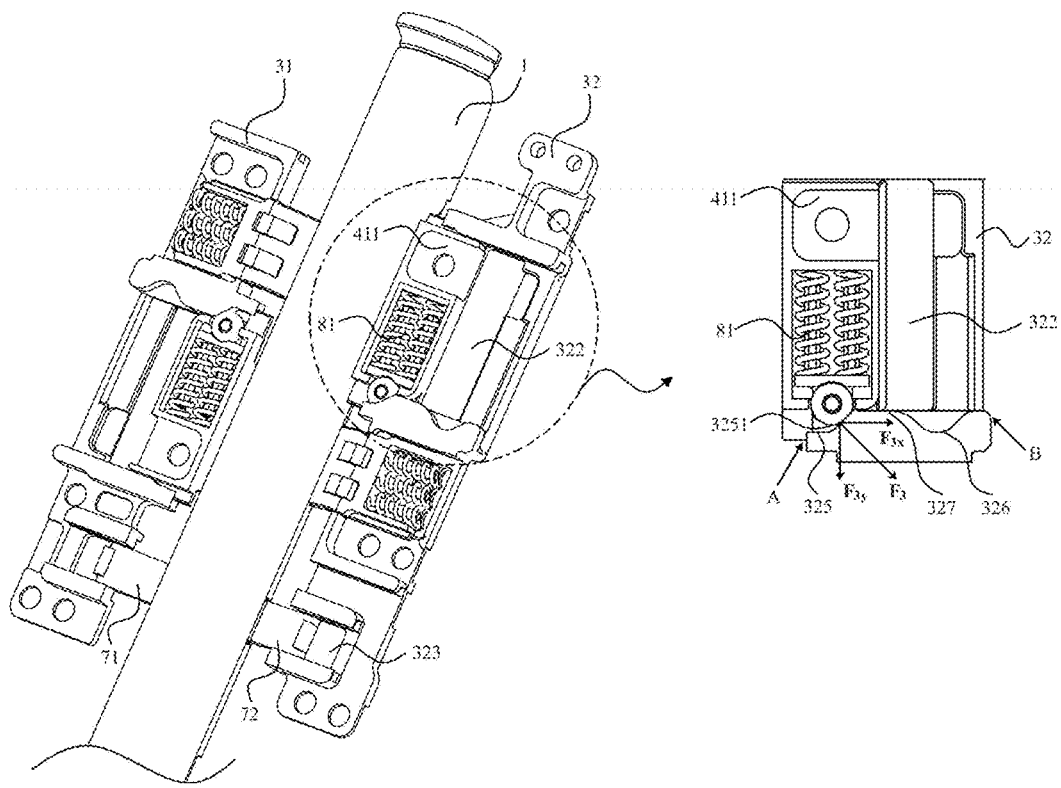
FIG. 33 is a schematic diagram of a partial structure of the folding apparatus shown in FIG. 2 in a flattened state.
Figure 34:
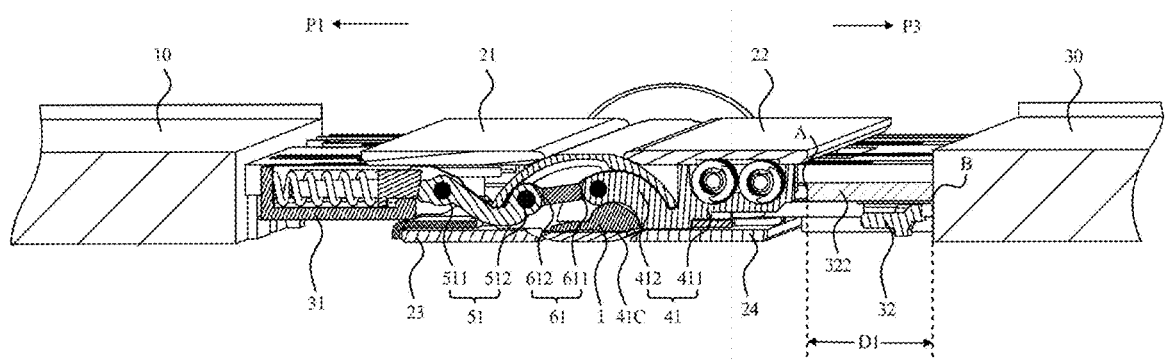
FIG. 34 is a schematic cross-sectional view of the folding apparatus shown in FIG. 2 in a flattened state along a line A1-A1 shown in FIG. 12.
Figure 35:
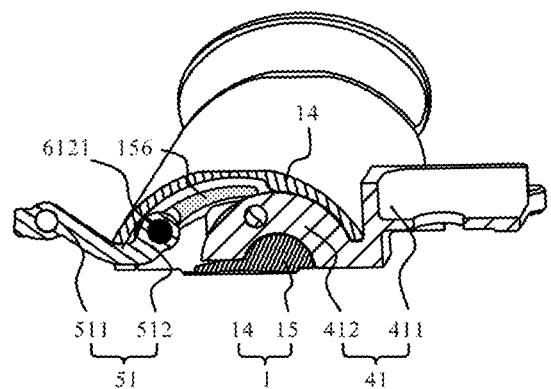
FIG. 35 is a schematic cross-sectional view of the structure shown in FIG. 32 in a flattened state along a line A3-A3 shown in FIG. 12.

Refer to both FIG. 33 and FIG. 34. FIG. 33 is a schematic diagram of a partial structure when the folding apparatus 100 shown in FIG. 2 is in a flattened state, and FIG. 34 is a schematic cross-sectional view of a position (that is, a section line A1-A1 shown in FIG. 12) of the first transmission arm 41 corresponding to the flattened state of the folding apparatus 100 shown in FIG. 2. FIG. 35 is a schematic cross-sectional view of another position (that is, a section line A3-A3 shown in FIG. 12 and FIG. 32) of the first transmission arm 41 corresponding to a flattened state of the structure shown in FIG. 32.

As shown in FIG. 33 and FIG. 34, when the first housing 10 and the second housing 30 are relatively unfolded to a flattened state, the rotating end 412 of the first transmission arm 41 is rotatably connected to the main shaft 1, and an area of a lap joint surface between the rotating end 412 of the first transmission arm 41 and the main shaft 1 is a first lap area. With reference to FIG. 14, the first flange 4111 of the sliding end 411 of the first transmission arm 41 is slidably connected to the guide space 3221 of the first sliding groove 322 of the second fixed bracket 32. With reference to FIG. 14, the first sliding groove 322 has an end A close to the main shaft 1 and an end B away from the main shaft 1, that is, a distance between the end A of the first sliding groove 322 and the main shaft 1 in the first direction P1 is less than a distance between the end B of the first sliding groove 322 and the main shaft 1 in the first direction P1. As shown in FIG. 34, when the first housing 10 and the second housing 30 are relatively unfolded to a flattened state, a distance between the first transmission arm 41 and the end B of the first sliding groove 322 in the third direction P3 is a first distance D1. The first rotating arm 51 is linked with the first transmission arm 41 by using the first connecting piece 61. As shown in FIG. 32 and FIG. 35, the main outer shaft 14 and the limiting groove 1531b of the main inner shaft 15 are jointly enclosed to form an arc-shaped groove 156, one end of the rotating shaft 6121 cooperates with the arc-shaped groove 156, and the rotating shaft 6121 is located at an end that is of the arc-shaped groove 156 and that is close to the first housing 10. Similarly, the other end of the rotating shaft 6121 cooperates with the arc-shaped groove 156' (which is disposed in pairs with the arc-shaped groove 156 and has a same structure, and is not shown in the figure) jointly enclosed by the main outer shaft 14 and the limiting groove 1531b' of the main inner shaft 15, to jointly implement a rotatable connection between the first rotating arm 51 and the main shaft 1.

Figure 36:
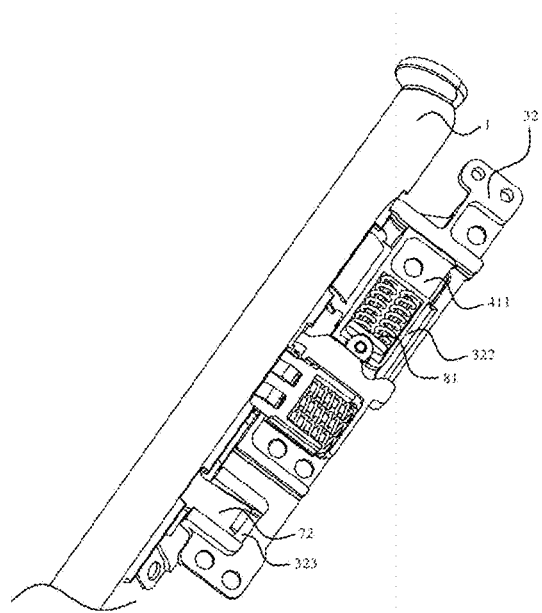
FIG. 36 is a schematic diagram of a partial structure of the folding apparatus shown in FIG. 2 in an intermediate state.
Figure 37:
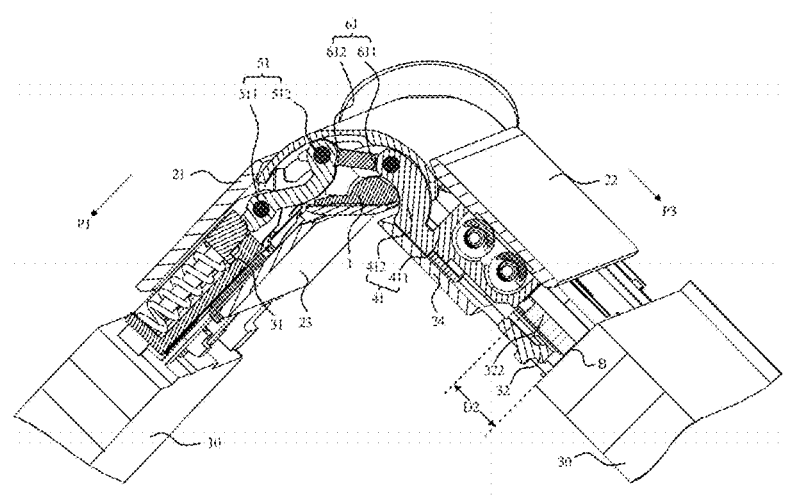
FIG. 37 is a schematic cross-sectional view of the folding apparatus shown in FIG. 2 in an intermediate state along a line A1-A1 shown in FIG. 12.
Figure 38:
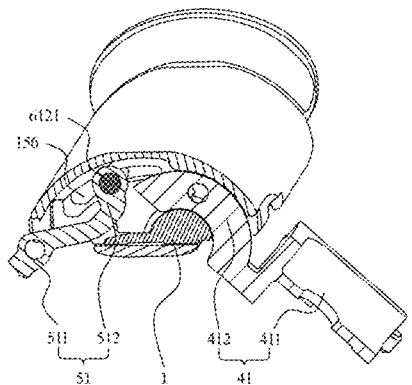
FIG. 38 is a schematic cross-sectional view of the structure shown in FIG. 31 in an intermediate state along a line A3-A3 shown in FIG. 12.

Refer to both FIG. 36 and FIG. 37. FIG. 36 is a schematic diagram of a partial structure when the folding apparatus 100 shown in FIG. 2 is in an intermediate state, and FIG. 37 is a schematic cross-sectional view of a position (that is, a cross-sectional line A1-A1 shown in FIG. 12) of the first rotating arm 41 corresponding to the intermediate state of the folding apparatus 100 shown in FIG. 2. FIG. 38 is a schematic cross-sectional view of another position (that is, a section line A3-A3 shown in FIG. 12 and FIG. 32) of the first transmission arm 41 corresponding to an intermediate state of the structure shown in FIG. 31.

As shown in FIG. 36 and FIG. 37, in a process in which the first housing 10 and the second housing 30 are relatively folded from a flattened state to an intermediate state, the rotating end 412 of the first transmission arm 41 rotates relative to the main shaft 1, and the first flange 4111 of the first transmission arm 41 slides in the guide space 3221 of the second fixed bracket 32, that is, the first transmission arm 41 slides in the first sliding groove 322, and the first transmission arm 41 gradually approaches the second fixed bracket 32 and the second housing 30, the second fixed bracket 32 and the second housing 30 gradually approach the main shaft 1. The first rotating arm 51 is linked with the first transmission arm 41 by using the first connecting piece 61, and the second end 512 of the first rotating arm 51 is connected to the first connecting piece 61 by using the rotating shaft 6121. As shown in FIG. 38, the rotating shaft 6121 slides in the arc-shaped groove 156 and the arc-shaped groove 156', and the first fixed bracket 31 and the first housing 10 gradually approach the main shaft 1. When the first housing 10 and the second housing 30 are in an intermediate state, an area of the lap joint surface between the rotating end 412 of the first transmission arm 41 and the main shaft 1 is a second lap joint area, and the second lap joint area is less than the first lap joint area; and a distance between the first transmission arm 41 and the end B of the first sliding groove 322 in the third direction P3 is a second distance D2, and the second distance D2 is less than the first distance D1.

Figure 39:
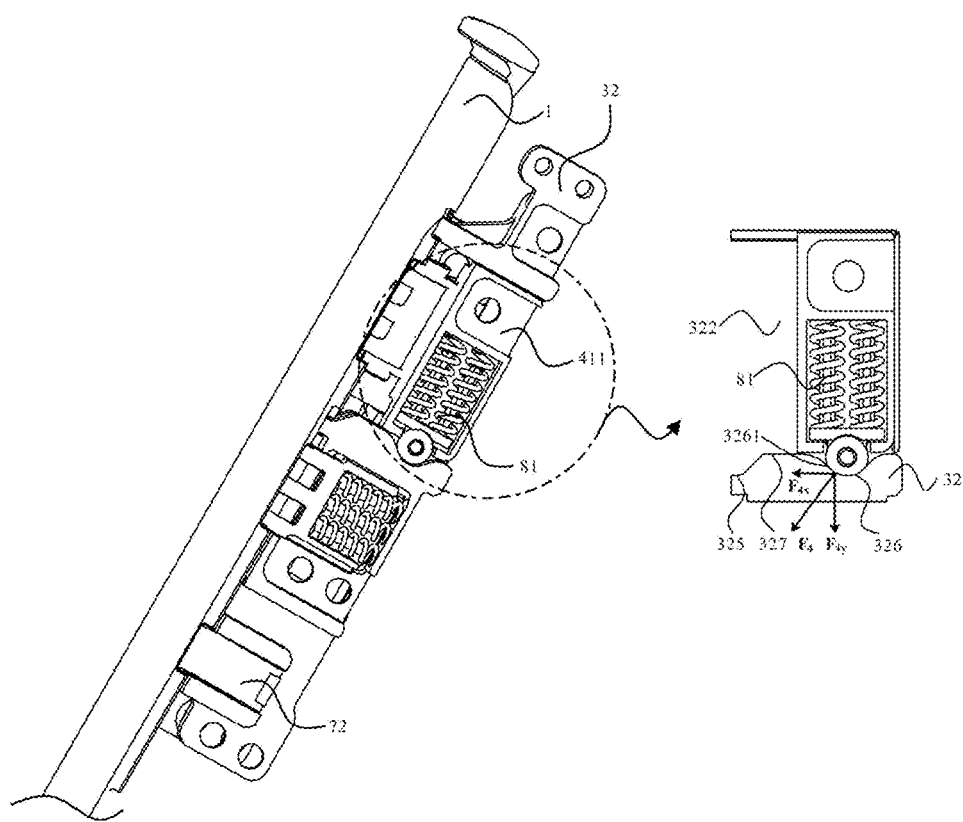
FIG. 39 is a schematic diagram of a partial structure of the folding apparatus shown in FIG. 2 in a closed state.
Figure 40:
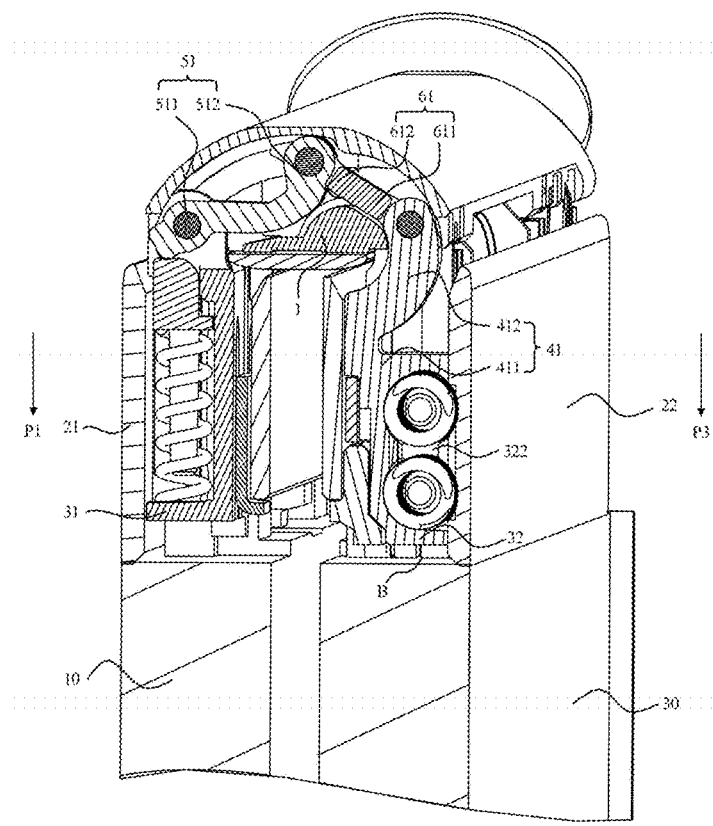
FIG. 40 is a schematic cross-sectional view of the folding apparatus shown in FIG. 2 in a closed state along a line A1-A1 shown in FIG. 12.

Refer to FIG. 39 and FIG. 40 together. FIG. 39 is a schematic diagram of a partial structure when the folding apparatus 100 shown in FIG. 2 is in a closed state, and FIG. 40 is a schematic cross-sectional view of a position (that is, a section line A1-A1 shown in FIG. 12) of the first rotating arm 41 corresponding to the closed state of the folding apparatus 100 shown in FIG. 2.

As shown in FIG. 39 and FIG. 40, in a process in which the first housing 10 and the second housing 30 are relatively folded from an intermediate state to a closed state, the rotating end 412 of the first transmission arm 41 continues to rotate relative to the main shaft 1, and the first flange 4111 of the first transmission arm 41 slides in the guide space 3221 of the second fixed bracket 32, that is, the first transmission arm 41 slides in the first sliding groove 322, and the first transmission arm 41 continues to approach the second fixed bracket 32 and the second housing 30, the second fixed bracket 32 and the second housing 30 continue to approach the main shaft 1. The first rotating arm 51 is linked with the first transmission arm 41 by using the first connecting piece 61, and the first fixed bracket 31 and the first housing 10 continue to approach the main shaft 1. When the first housing 10 and the second housing 30 are in a closed state, an area of the lap joint surface between the rotating end 412 of the first transmission arm 41 and the main shaft 1 is a third lap area, and the third lap area is less than the second lap area. A distance between the first transmission arm 41 and the end B of the first sliding groove 322 in a third direction P3 is a third distance D3, and the third distance D3 is less than the second distance D2. For example, the third distance D3 may be close to zero.

Figure 41:
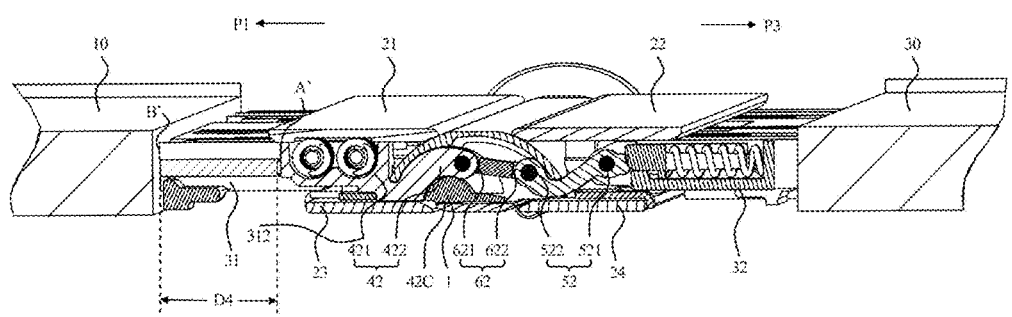
FIG. 41 is a schematic cross-sectional view of the folding apparatus shown in FIG. 2 in a flattened state along a line B-B shown in FIG. 12.
Figure 42:
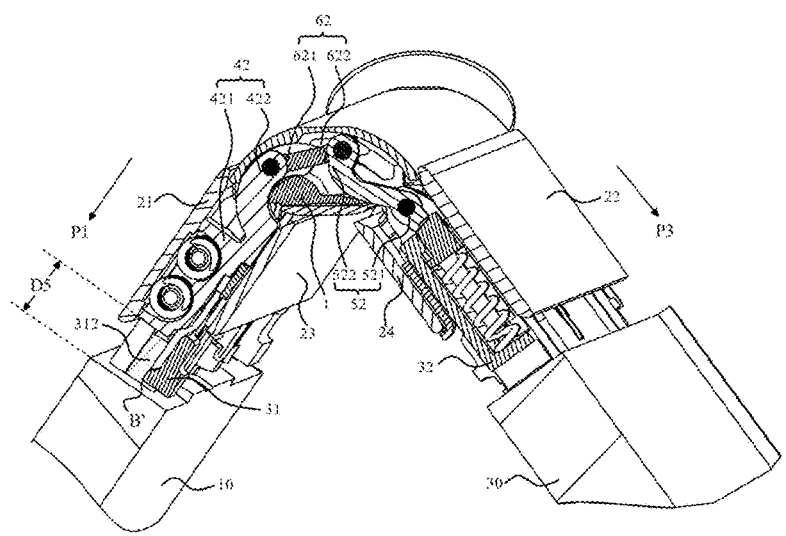
FIG. 42 is a schematic cross-sectional view of the folding apparatus shown in FIG. 2 in an intermediate state along a line B-B shown in FIG. 12.
Figure 43:
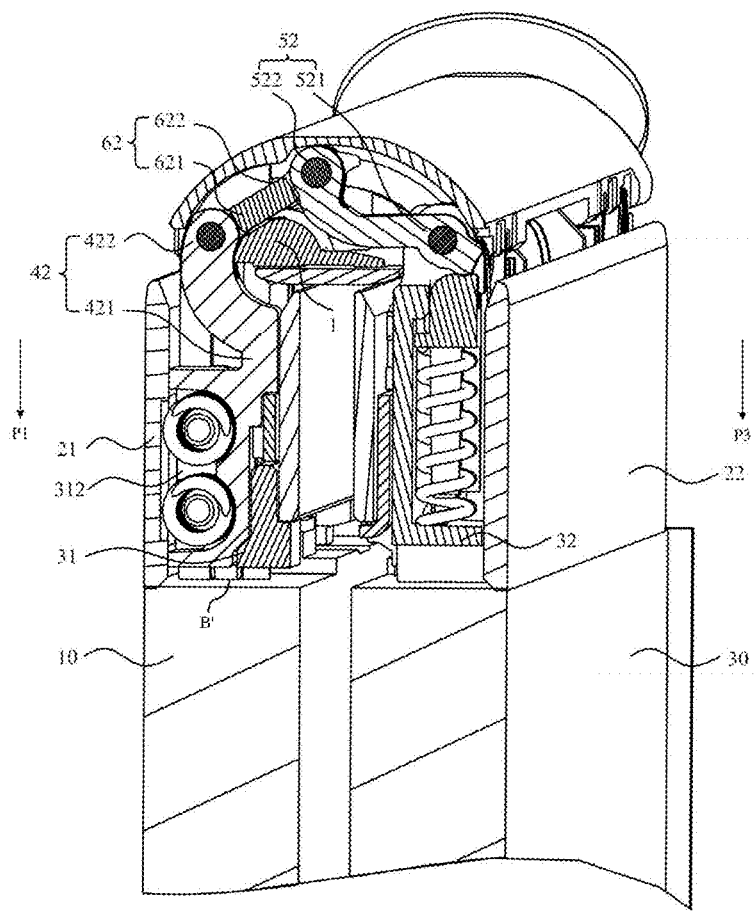
FIG. 43 is a schematic cross-sectional view of the folding apparatus shown in FIG. 2 in a closed state along a line B-B shown in FIG. 12.

Refer to FIG. 41 to FIG. 43 together. FIG. 41 is a schematic cross-sectional view of a position (that is, a B-B section shown in FIG. 12) of the second transmission arm 42 corresponding to a flattened state of the folding apparatus 100 shown in FIG. 2, and FIG. 42 is a schematic cross-sectional view of a position (that is, a B-B section shown in FIG. 12) of the second rotating arm 42 corresponding to an intermediate state of the folding apparatus 100 shown in FIG. 2. FIG. 43 is a schematic cross-sectional view of a position (that is, a B-B section line shown in FIG. 12) of the second rotating arm 42 corresponding to a closed state of the folding apparatus 100 shown in FIG. 2. FIG. 41 to FIG. 43 show a position change of the second transmission arm 42 in a process in which the folding apparatus 100 switches from the flattened state to the closed state.

As shown in FIG. 41, when the first housing 10 and the second housing 30 are relatively unfolded to a flattened state, an area of a joint surface between the rotating end 422 of the second transmission arm 42 and the main shaft 1 is a fourth joint area. With reference to FIG. 14, the second flange 4211 of the sliding end 421 of the second transmission arm 42 is slidably connected to the guide space 3121 of the second sliding groove 312 of the first fixed bracket 31. With reference to FIG. 14, the second sliding groove 312 has an end A' close to the main shaft 1 and an end B' away from the main shaft 1, that is, a distance between the end A' of the second sliding groove 312 and the main shaft 1 in the first direction P1 is less than a distance between the end B' of the second sliding groove 312 and the main shaft 1 in the first direction P1. As shown in FIG. 41, a distance between the second transmission arm 42 and the end B' of the second sliding groove 312 in the first direction P1 is a fourth distance D4. The second rotating arm 52 is linked with the second transmission arm 42 by using the second connecting piece 62.

As shown in FIG. 42, in a process in which the first housing 10 and the second housing 30 are relatively folded from a flattened state to an intermediate state, a rotating end 422 of the second transmission arm 42 rotates relative to the main shaft 1, and a second flange 4211 of the second transmission arm 42 slides in guide space 3121 of the first fixed bracket 31, that is, the second transmission arm 42 slides in the second sliding groove 312, and the second transmission arm 42 gradually approaches the first fixed bracket 31 and the first housing 10. The first fixed bracket 31 and the first housing 10 gradually approach the main shaft 1. The second rotating arm 52 is linked with the second transmission arm 42 by using the second connecting piece 62, and the second fixed bracket 32 and the second housing 30 gradually approach the main shaft 1. When the first housing 10 and the second housing 30 are in an intermediate state, an area of the lap joint surface between the rotating end 422 of the second transmission arm 42 and the main shaft 1 is a fifth lap area, and the fifth lap area is less than a fourth lap area. A distance between the second transmission arm 42 and the end B' of the second sliding groove 312 in the first direction P1 is a fifth distance D5, and the fifth distance D5 is less than a fourth distance D4.

As shown in FIG. 43, in a process in which the first housing 10 and the second housing 30 are relatively folded from an intermediate state to a closed state, the rotating end 422 of the second transmission arm 42 rotates relative to the main shaft 1, and the second flange 4211 of the second transmission arm 42 slides in the guide space 3121 of the first fixed bracket 31, that is, the second transmission arm 42 slides in the second sliding groove 312, and the second transmission arm 42 continues to approach the first fixed bracket 31 and the first housing 10. The first fixed bracket 31 and the first housing 10 continue to approach the main shaft 1. The second rotating arm 52 is linked with the second transmission arm 42 by using the second connecting piece 62, and the second fixed bracket 32 and the second housing 30 continue to approach the main shaft 1. When the first housing 10 and the second housing 30 are in a closed state, an area of the lap joint surface between the rotating end 422 of the first transmission arm 42 and the main shaft 1 is a sixth lap area, and the sixth lap area is less than the fifth lap area; and a distance between the second transmission arm 42 and the end B' of the second sliding groove 312 in the first direction P1 is a sixth distance D6, and the sixth distance D6 is less than the fifth distance D5. For example, the sixth distance D6 may be close to zero.

In other words, in a process in which the first housing 10 and the second housing 30 are relatively folded from a flattened state to a closed state, overlapping areas between the main shaft 1 and the rotating end 412 of the first transmission arm 41 and the rotating end 422 of the second transmission arm 42 gradually decrease, and a distance between the first transmission arm 41 and the second housing 30 gradually decreases. A distance between the second transmission arm 42 and the first housing 10 gradually decreases, and the first housing 10 and the second housing 30 gradually approach the main shaft 1.

As shown in FIG. 31 and FIG. 34, when the first housing 10 and the second housing 30 are relatively folded from a flattened state to a closed state, the first transmission arm 41 rotates around the first rotation axis 41C. As shown in FIG. 34, the first rotation axis 41C on which the first transmission arm 41 rotates relative to the main shaft 1 is close to the main inner shaft 15 and far away from the main outer shaft 14, close to the second fixed bracket 32, and far away from the first fixed bracket 31. As shown in FIG. 31 and FIG. 41, when the first housing 10 and the second housing 30 are relatively folded from the flattened state to the closed state, the second transmission arm 42 rotates around the second rotation axis 42C. As shown in FIG. 41, the second rotation axis 42C on which the second transmission arm 42 rotates relative to the main shaft 1 is close to the main inner shaft 15 and far away from the main outer shaft 14, close to the first fixed bracket 31, and far away from the second fixed bracket 32.

In this embodiment, positions of the first rotation axis 41C and the second rotation axis 42C are set, so that the rotating mechanism 20 can more easily implement an in-shell pull motion of the folding apparatus 100 in a process of changing from a flattened state to a closed state, and an out-shell push motion of the folding apparatus 100 in a process of changing from a closed state to a flattened state, thereby implementing a deformation motion using the flexible display 200 as a neutral surface.

In some embodiments, as shown in FIG. 12 and FIG. 25, in a process of expanding or folding the folding apparatus 100, the first transmission arm 41 rotates around the first rotation axis 41C, that is, the first transmission arm 41 rotates around the first rotation axis 41C relative to the main shaft 1. The second transmission arm 42 rotates around the second rotation axis 42C, that is, the second transmission arm 42 rotates around the second rotation axis 42C relative to the main shaft 1. The third transmission arm 40 rotates around the third rotation axis 40C, that is, the third transmission arm 40 rotates around the third rotation axis 40C relative to the main shaft 1. The fourth transmission arm 50 rotates around the fourth rotation axis 50C, that is, the fourth transmission arm 50 rotates around the fourth rotation axis 50C relative to the main shaft 1. A rotation axis 40C on which the third transmission arm 40 rotates relative to the main shaft 1 is collinear with a rotation axis 42C on which the second transmission arm 42 rotates relative to the main shaft 1. A rotation axis 50C on which the fourth transmission arm 50 rotates relative to the main shaft 1 is collinear with a rotation axis 41C on which the first transmission arm 41 rotates relative to the main shaft 1.

In this embodiment, the third transmission arm 40 and the rotation axis on which the second transmission arm 42 rotates relative to the main shaft 1 are collinear, and the third transmission arm 40 is slidably connected to the third fixed bracket 33. The fourth transmission arm 50 and the rotation axis on which the first transmission arm 41 rotates relative to the main shaft 1 are collinear, and the fourth transmission arm 50 is slidably connected to the fourth fixed bracket 34. Therefore, motion of the third transmission arm 40 can be synchronized with motion of the second transmission arm 42, and motion of the fourth transmission arm 50 can be synchronized with motion of the first transmission arm 41. Therefore, a structure design and a connection relationship of the rotating mechanism 20 can be simplified, and reliability of the rotating structure can be improved.

In this embodiment of this application, as shown in FIG. 33 to FIG. 43, the rotating end 412 of the first transmission arm 41 is rotatably connected to the main shaft 1, the sliding end 411 is slidably connected to the second fixed bracket 32, the second fixed bracket 32 is fastened to the second housing 30, the rotating end 422 of the second transmission arm 42 is rotatably connected to the main shaft 1, the sliding end 421 is connected to the first fixed bracket 31, and the first fixed bracket 31 is fastened to the first housing 10. Therefore, in a process in which the first housing 10 rotates relative to the second housing 30, the first fixed bracket 31 rotates relative to the main shaft 1, the second transmission arm 42 rotates relative to the main shaft 1, the second transmission arm 42 slides relative to the first fixed bracket 31, the second fixed bracket 32 rotates relative to the main shaft 1, the first transmission arm 41 rotates relative to the main shaft 1, and the first transmission arm 41 slides relative to the second fixed bracket 32, therefore, the folding apparatus 100 can freely switch between a flattened state and a closed state. The first housing 10 and the second housing 30 can be relatively unfolded to a flattened state, so that the flexible display 200 is in a flattened form, to implement large-screen display. The first housing 10 and the second housing 30 can also be relatively folded to a closed state, so that the electronic device 1000 is easy to receive and carry. In addition, when the first housing 10 and the second housing 30 are folded relative to each other to the closed state by using the rotating mechanism 20, the first housing 10 and the second housing 30 can be basically completely closed, and there is no gap between the first housing 10 and the second housing 30 or a gap between the first housing 10 and the second housing 30 is small. Therefore, appearance integrity of the folding apparatus 100 is implemented, and self-shielding in appearance is implemented. Appearance integrity of the electronic device 1000 to which the folding apparatus 100 is applied is implemented, so that product reliability and user experience are improved.

Refer to both FIG. 13 and FIG. 34. In a process in which the first housing 10 rotates relative to the second housing 30, the rotating end 412 of the first transmission arm 41 is connected to the second end 512 of the first rotating arm 51 by using the first connecting piece 61, the rotating end 412 of the first transmission arm 41 is connected to the first end 611 of the first connecting piece 61 by using the rotating shaft 6111, and the rotating end 412 of the first transmission arm 41 may rotate around the first end 611 of the first connecting piece 61. The second end 512 of the first rotating arm 51 is rotated and connected to the second end 612 of the first connecting piece 61 by using the rotating shaft 6121, and the second end 512 of the first rotating arm 51 may rotate around the second end 612 of the first connecting piece 61. Therefore, the first rotating arm 41, the first connecting piece 61, and the first rotating arm 51 form a linkage structure. Similarly, as shown in FIG. 41, the second rotating arm 42, the second connecting piece 62, and the second rotating arm 52 also form a linkage structure.

Refer to FIG. 12 and FIG. 41 together. In a process in which the first housing 10 rotates relative to the second housing 30, because the first housing 10 moves synchronously with the first fixed bracket 31, the second housing 30 moves synchronously with the second fixed bracket 32, that is, the first fixed bracket 31 rotates relative to the second fixed bracket 32. Because the sliding end 412 of the second transmission arm 42 is slidably connected to the first fixed bracket 31, when the first fixed bracket 31 rotates, the sliding end 421 of the second transmission arm 42 slides in the second sliding groove 312, and the rotating end 422 of the second transmission arm 42 rotates relative to the main shaft 1. With reference to FIG. 34 and FIG. 35, the first fixed bracket 31 is rotatably connected to the first rotating arm 51.

When the first fixed bracket 31 rotates, the first rotating arm 51 rotates. Due to a limitation of the main outer shaft 14 on the first rotating arm 51 and a limitation of the limiting groove 156 on the moving track of the rotating shaft 6121, the first rotating arm 51 can only move within the main shaft 1 along a predetermined track. The first rotating arm 51 is linked with the first transmission arm 41 by using the first connecting piece 61, the second rotating arm 52 is linked with the second transmission arm 42 by using the second connecting piece 62, and the two linkage structures are symmetrical to each other. Therefore, rotation angles of the rotating end 412 of the first transmission arm 41 and the rotating end 422 of the second transmission arm 42 are equal, and directions are opposite. The first housing 10 rotates synchronously with the rotating end 422 of the second transmission arm 42, and the second housing 30 rotates synchronously with the rotating end 412 of the first transmission arm 41, thereby ensuring synchronization and consistency of rotation actions of the first housing 10 and the second housing 30.

As shown in FIG. 34 to FIG. 43, in a process in which the first housing 10 and the second housing 30 are relatively unfolded to a flattened state, the first transmission arm 41 rotates relative to the main shaft 1, and the first rotating arm 51 is linked to the first transmission arm 41 by using the first connecting piece 61.

The first fixed bracket 31 and the first housing 10 gradually move away from the main shaft 1. The second transmission arm 42 rotates relative to the main shaft 1. The second rotating arm 52 is linked to the second transmission arm 42 by using the second connecting piece 62. The second fixed bracket 32 and the second housing 30 gradually move away from the main shaft 1. In a process in which the first housing 10 and the second housing 30 are folded relative to each other to a closed state, the first transmission arm 41 rotates relative to the main shaft 1, the first rotating arm 51 is linked to the first transmission arm 41 by using the first connecting piece 61, and the first fixed bracket 31 and the first housing 10 gradually approach the main shaft 1. The second transmission arm 42 rotates relative to the main shaft 1, the second rotating arm 52 is linked to the second transmission arm 42 by using the second connecting piece 62, and the second fixed bracket 32 and the second housing 30 gradually approach the main shaft 1. Therefore, in a process in which the first housing 10 and the second housing 30 are relatively unfolded, the rotating mechanism 20 can move the first housing 10 in a direction away from the main shaft 1, and move the second housing 30 in a direction away from the main shaft 1. In a process in which the first housing 10 and the second housing 30 are relatively folded, the first housing 10 moves in a direction close to the main shaft 1, and the second housing 30 moves in a direction close to the main shaft 1. In other words, the rotating mechanism 20 can implement inward pulling motion of the housing in a process in which the folding apparatus 100 changes from a flattened state to a closed state, and outward push motion of the housing in a process in which the folding apparatus 100 changes from a closed state to a flattened state, so that deformation motion of the flexible display 200 as a neutral surface can be implemented in a process in which the folding apparatus 100 is unfolded or folded, thereby reducing a risk of pulling or squeezing the flexible display 200, and maintaining a constant length of the flexible display 200, so as to protect the flexible display 200 and improve reliability of the flexible display 200, so that the flexible display 200 and the electronic device 1000 have a relatively long service life.

As shown in FIG. 34 and FIG. 41, when the first housing 10 and the second housing 30 are relatively unfolded to a flattened state, the first supporting plate 21 is flush with the second supporting plate 22, the first supporting plate 21 is disposed between the first fixed bracket 31 and the main shaft 1, and the second supporting plate 22 is disposed between the second fixed bracket 32 and the main shaft 1. The first supporting plate 21, the main shaft 1, and the second supporting plate 22 can jointly form complete planar support for the bending part 2002 of the flexible display 200. As shown in FIG. 40 and FIG. 43, when the first housing 10 and the second housing 30 are folded relative to each other to the closed state, the first supporting plate 21 is stacked on a side that is of the first fixed bracket 31 and that is away from the second fixed bracket 32, and the second supporting plate 22 is stacked on a side that is of the second fixed bracket 32 and that is away from the first fixed bracket 31. The first supporting plate 21 and the second supporting plate 22 can slide and be received relative to the first housing 10 and the second housing 30 respectively, so that the main shaft 1 is exposed to form complete support for the bending part 2002 of the flexible display 200. In other words, when the folding apparatus 100 is in the flattened state or the closed state, the rotating mechanism 20 can fully support the bending part 2002 of the flexible display 200, thereby helping protect the flexible display 200 and improving user experience.

As shown in FIG. 34 and FIG. 41, when the first housing 10 and the second housing 30 are relatively unfolded to a flattened state, the first shielding plate 23 is flush with the second shielding plate 24, the first shielding plate 23 is disposed between the first fixed bracket 31 and the main shaft 1, and can shield a gap between the first fixed bracket 31 and the main shaft 1, and the second shielding plate 24 is disposed between the second fixed bracket 32 and the main shaft 1. The gap between the second fixed bracket 32 and the main shaft 1 can be shielded. Therefore, the folding apparatus 100 can implement self-shielding, which helps improve appearance integrity, and can also reduce a risk that external dust, sundries, and the like enter the rotating mechanism 20, so as to ensure reliability of the folding apparatus 100. As shown in FIG. 40 and FIG. 43, when the first housing 10 and the second housing 30 are folded relative to each other to the closed state, the first shielding plate 23 can be received between the first fixed bracket 31 and the first housing 10, and the second shielding plate 24 can be received between the second fixed bracket 32 and the second housing 30, so that avoidance is achieved. In this way, the folding apparatus 100 can be smoothly folded to the closed form, and mechanism reliability is high.

In addition, as shown in FIG. 28, because the first supporting plate 21 and the first shielding plate 23 are fastened to the sliding end 411 of the first transmission arm 41, the first supporting plate 21 and the first shielding plate 23 move along with the sliding end 411 of the first transmission arm 41. The second supporting plate 22 and the second shielding plate 24 are fastened to the sliding end 421 of the second transmission arm 42, and the second supporting plate 22 and the second shielding plate 24 move along with the sliding end 421 of the second transmission arm 42. Therefore, in a process in which the folding apparatus 100 changes from the closed state to the flattened state and a process in which the folding apparatus 100 changes from the flattened state to the closed state, the first supporting plate 21 and the second supporting plate 22 gradually approach the main shaft 1 or move away from the main shaft 1, so that the folding apparatus 100 can completely support the flexible display 200 in various forms, thereby improving reliability and a service life of the flexible display 200 and the electronic device 1000. In a process in which the folding apparatus 100 is switched from the closed state to the flattened state or the folding apparatus 100 is switched from the flattened state to the closed state, the first shielding plate 23 and the second shielding plate 24 gradually approach the main shaft 1 or move away from the main shaft 1, so that the folding apparatus 100 in the various forms can adapt to forms of the rotating mechanism 20, to implement self-shielding. In this way, mechanism reliability is high.

Because both the first supporting plate 21 and the first shielding plate 23 are fastened to the sliding end 411 of the first transmission arm 41, and both the second supporting plate 22 and the second shielding plate 24 are fastened to the sliding end 421 of the second transmission arm 42, the first transmission arm 41 and the second transmission arm 42 not only control rotation actions of the first housing 10 and the second housing 30, but also control extending or retracting of the first supporting plate 21, the first shielding plate 23, the second supporting plate 22, and the second shielding plate 24. Therefore, the rotating mechanism 20 is highly integrated, an overall connection relationship is simple, and mechanism reliability is high.

In some embodiments, as shown in FIG. 12 to FIG. 14, the rotating mechanism 20 may further include a first limiting component 81. The first limiting component 81 is mounted on the sliding end 411 of the first transmission arm 41, and the first limiting component 81 is clamped to the second fixed bracket 32. In this embodiment, the first limiting component 81 is configured to limit a relative position relationship between the first transmission arm 41 and the second fixed bracket 32, so that the first transmission arm 41 and the second fixed bracket 32 can maintain a preset relative position relationship when no large external force is applied, the rotating mechanism 20 can stay at a preset angle, and the rotating apparatus can maintain the flattened state or the closed state. In this way, user experience of the folding apparatus 100 and the electronic device 1000 is improved.

Figure 44:
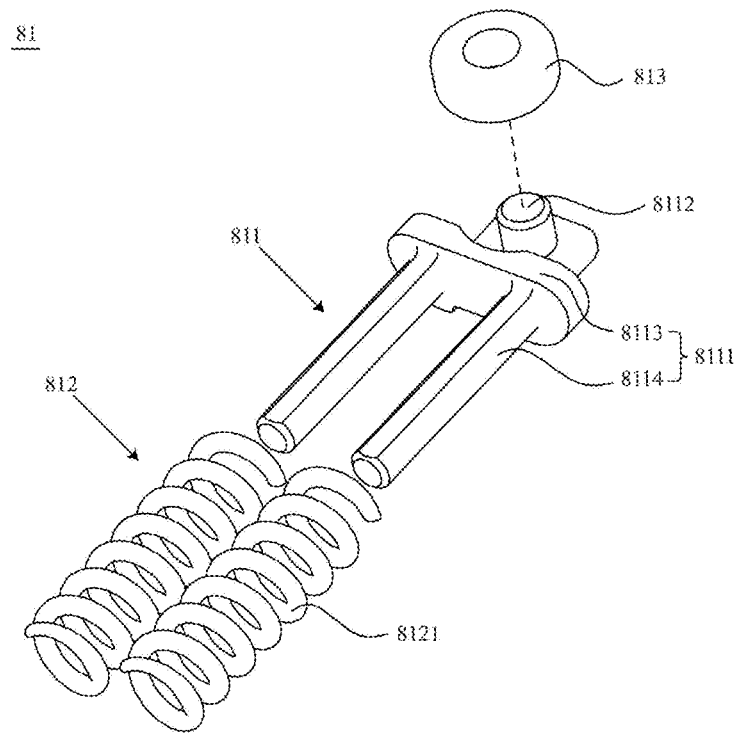
FIG. 44 is a schematic exploded view of a structure of a first limiting component shown in FIG. 12 to FIG. 14.

FIG. 44 is a schematic exploded view of the first limiting component 81 shown in FIG. 12 to FIG. 14.

As shown in FIG. 44, in some embodiments, the first limiting component 81 includes a second bracket 811 and a third elastic part 812. The second bracket 811 is of a rigid structure, and is not prone to deformation under an external force. The second bracket 811 includes a control component 8111 and an abutting component 8112. The abutting component 8112 is configured to abut against an external mechanical part, to limit the mechanical part. The control component 8111 is configured to control a position of the abutting component 8112. For example, the control component 8111 includes a substrate 8113 and a plurality of guide posts 8114, and the plurality of guide posts 8114 are fastened to one side of the substrate 8113 and spaced from each other. The abutting component 8112 is fastened to the other side of the substrate 8113. The third elastic part 812 is of an elastic structure, and is prone to deformation under an external force. One end of the third elastic part 812 is mounted on the control component 8111 of the second bracket 811. For example, the third elastic part 812 may include a plurality of springs 8121, and the plurality of springs 8121 are sleeved on the plurality of guide posts 8114 in a one-to-one correspondence.

As shown in FIG. 13, the sliding end 411 of the first transmission arm 41 has a second mounting groove 4112, and the first limiting component 81 is installed in the second mounting groove 4112. The other end (that is, the end away from the control component 8111) of the third elastic part 812 abuts against the groove wall of the second mounting groove 4112, and the third elastic part 812 is in a compressed state. The abutting component 8112 of the second bracket 811 partially extends out of the second mounting groove 4112, and clamps the second fixed bracket 32.

As shown in FIG. 44, in some embodiments, the first limiting component 81 may further include a first cushion part 813, and the first cushion part 813 is mounted on the abutting component 8112 of the second bracket 811. The first cushion part 813 may be made of a material (for example, rubber) with relatively small stiffness. When being subject to an external force, the first cushion part 813 can absorb an impact force through deformation, to implement cushion. In the first limiting component 81, the first cushion part 813 is disposed to cushion stress between the abutting component 8112 and a mechanical part (that is, the second fixed bracket 32), to improve reliability of a limiting structure.

As shown in FIG. 33, FIG. 36, and FIG. 39, for example, the second fixed bracket 32 further includes a first recess area 325, a second recess area 326 (a first recess part), and a first horizontal area 327 (a first convex part). The first recess area 325, the second recess area 326, and the first horizontal area 327 are all connected to the first sliding groove 322. A distance between the first recess area 325 and the end A of the first sliding groove 322 in the first direction P1 is less than a distance between the second recess area 326 and the end A of the first sliding groove 322 in the first direction P1. The first horizontal area 327 is located between the first recess area 325 and the second recess area 326.

As shown in FIG. 33, when the first housing 10 and the second housing 30 are relatively unfolded to a flattened state, the abutting component 8112 of the first limiting component 81 is partially clamped into the first recess area 325. As shown in FIG. 36, when the first housing 10 and the second housing 30 rotate (unfolded or folded) relative to each other to an intermediate state, the abutting component 8112 of the first limiting component 81 gradually moves to the first horizontal area 327. As shown in FIG. 39, when the first housing 10 and the second housing 30 are folded relative to each other to a closed state, the abutting component 8112 of the first limiting component 81 is partially clamped into the second recess area 326.

As shown in FIG. 33, when the electronic device 1000 is folded, in a process in which the abutting component 8112 of the first limiting component 81 moves from the first recess area 325 to the first horizontal area 327, an elastic shape variable of the third elastic part 812 of the first limiting component 81 gradually increases. Because the first connection surface 3251 of the first recess area 325 and the first horizontal area 327 has a specific included angle with the length direction of the main shaft 1, two partial forces are respectively generated on the first connection surface 3251, and a force $F_3$ applied to the first connection surface 3251. $F_{3x}$ is a component of force perpendicular to the length direction of the main shaft 1, and $F_{3y}$ is a component of force parallel to the length direction of the main shaft 1. In a process in which the first limiting component 81 moves from the first recess area 325 to the first horizontal area 327, that is, when the first housing 10 and the second housing 30 are folded relative to each other, a component of force $F_{3x}$ perpendicular to the length direction of the main shaft 1 and away from the direction of the main shaft 1 generates torque that hinders rotation of the second housing 30, thereby providing a touch feeling in a folding process of the electronic device 1000.

As shown in FIG. 39, in a process in which the electronic device 1000 continues to be folded and the abutting component 8112 of the first limiting component 81 moves from the first horizontal area 327 to the second recess area 326, an elastic shape variable of the third elastic part 812 of the first limiting component 81 gradually decreases. Because the second connection surface 3261 of the second recess area 326 and the first horizontal area 327 has a specific included angle with the length direction of the main shaft 1, two partial forces are respectively generated on the second connection surface 3261, and a force $F_4$ applied to the second connection surface 3261. $F_{4x}$ is a component of force perpendicular to the length direction of the main shaft 1, and $F_{4y}$ is a component of force parallel to the length direction of the main shaft 1. In a process in which the first limiting component 81 moves from the first horizontal area 327 to the second recess area 326, that is, when the first housing 10 and the second housing 30 continue to be folded relative to each other, a component of force $F_{4x}$ perpendicular to the length direction of the main shaft 1 and pointing to the direction of the main shaft 1 may provide torque for assisting rotation of the second housing 30, to push the second housing 30 to rotate.

As shown in FIG. 39, when the electronic device 1000 is unfolded, in a process in which the abutting component 8112 of the first limiting component 81 moves from the second recess area 326 to the first horizontal area 327, an elastic shape variable of the third elastic part 812 of the first limiting component 81 gradually increases. In this case, the component of force $F_{4x}$ perpendicular to the length direction of the main shaft assembly and pointing to the direction of the main shaft 1 generates torque that hinders rotation of the second housing 30, thereby providing a touch feeling in a folding process of the electronic device 1000. As shown in FIG. 33, the electronic device 1000 continues to be unfolded, and in a process in which the abutting component 8112 of the first limiting component 81 moves from the first horizontal area 327 to the first recess area 325, a shape variable of the third elastic part 812 of the first limiting component 81 gradually decreases. In this case, the component of force $F_{3x}$ perpendicular to the length direction of the main shaft 1 and away from the direction of the main shaft 1 may provide torque for assisting the second housing 30 to rotate, and push the second housing 30 to rotate.

To facilitate understanding of a force applied in a process in which the first housing 10 rotates relative to the second housing 30, a force applied on the first connection surface 3251 in a process in which the abutting component 8112 of the first limiting component 81 moves from the first recess area 325 to the first horizontal area 327 is used as an example for description.

Figure 45:
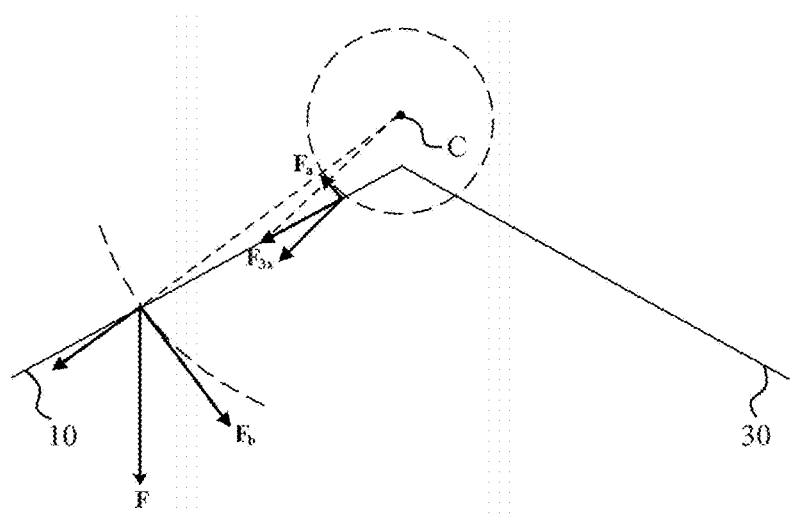
FIG. 45 is a schematic diagram of force exerted in a folding process of an electronic device.

FIG. 45 is a schematic diagram of force exerted in a folding process of the electronic device 1000. The circle center C is a rotation center of the electronic device 1000, that is, a circle center in a rotation process of the neutral surface of the flexible display 200. When the electronic device 1000 is folded, in a process in which the first limiting component 81 moves from the first recess area 325 to the first horizontal area 327, an external acting force F of the folded electronic device 1000 generates a partial force $F_b$, where $F_b$ is tangent to a circle with C as a center, and $F_b$ generates torque for pushing the first housing 10 to rotate relative to the second housing 30. A component of force $F_{3x}$, perpendicular to the length direction of the main shaft 1 and away from the main shaft 1, to which the first connection surface 3251 is subjected generates a component of force $F_a$, where $F_a$ is also tangent to a circle with C as a center, and $F_a$ generates torque that hinders relative rotation of the first housing 10 and the second housing 30. Therefore, in a process in which the first housing 10 rotates relative to the second housing 30 and the first limiting component 81 moves from the first recess area 325 to the first horizontal area 327, a component of force $F_{3x}$ perpendicular to the length direction of the main shaft 1 and away from the direction of the main shaft 1 generates torque that hinders relative rotation of the housing.

Based on a principle that is the same as or similar to the foregoing principle, in a process of folding or unfolding the electronic device 1000, a component of force perpendicular to a length direction of the main shaft 1 may generate torque that assists or hinders relative rotation of the housing. Details are not described herein again.

Because the third elastic part 812 of the first limiting component 81 can deform under an external force, the first limiting component 81 can smoothly move between the first recess area 325, the first horizontal area 327, and the second recess area 326 relative to the second fixed bracket 32, thereby improving limiting reliability between the first transmission arm 41 and the second fixed bracket 32.

In some other embodiments, the second fixed bracket 32 may alternatively include only the first recess area 325, or include only the second recess area 326. Locations of the first recess area 325 and/or the second recess area 326 may also be designed in another form. This is not strictly limited in this application.

In some other embodiments, a part that is of the second fixed bracket 32 and that cooperates with the first limiting component 81 may be an elastic structure, or an elastic projection is disposed. Based on a reason the same as or similar to that described above, in a process of folding or expanding the electronic device 1000, a force perpendicular to a length direction of the main shaft 1 exerted on the second fixed bracket 32 may provide a touch feeling in the process of folding the electronic device 1000.

In some embodiments, as shown in FIG. 12 to FIG. 14, the rotating mechanism 20 may further include a second limiting component 82. The second limiting component 82 is mounted on the sliding end 421 of the second transmission arm 42, and the second limiting component 82 is clamped onto the first fixed bracket 31. In this embodiment, the second limiting component 82 is configured to limit a relative position relationship between the second transmission arm 42 and the first fixed bracket 31, so that the second transmission arm 42 and the first fixed bracket 31 can maintain a preset relative position relationship when no large external force is applied, the rotating mechanism 20 can stay at a preset angle, and the rotating apparatus can maintain the flattened state or the closed state. In this way, user experience of the folding apparatus 100 and the electronic device 1000 is improved.

For example, a structure of the second limiting component 82 is the same as a structure of the first limiting component 81, to reduce material types of the rotating mechanism 20, and reduce design difficulty and costs of the rotating mechanism 20. A specific structure of the second limiting component 82 is not described in this embodiment of this application. In some other embodiments, a structure of the second limiting component 82 may alternatively be different from a structure of the first limiting component 81.

It may be understood that, in the foregoing embodiment, an implementation structure of the limiting component is shown by using an example. The limiting component in this embodiment of this application may alternatively use another elastic structure, for example, use an elastic rubber block. This is not strictly limited in this application.

For example, as shown in FIG. 13 and FIG. 14, the first fixed bracket 31 further includes a third recess area 315, a fourth recess area 316 (a second concave part), and a second horizontal area 317 (a second convex part). The third recess area 315, the fourth recess area 316, and the second horizontal area 317 are all connected to the second sliding groove 312. A distance between the third recess area 315 and the end A' of the second sliding groove 312 in the first direction P1 is less than a distance between the fourth recess area 316 and the end A' of the second sliding groove 312 in the first direction P1. The second horizontal area 317 is located between the third recess area 315 and the fourth recess area 316. When the first housing 10 and the second housing 30 are relatively unfolded to a flattened state, the second limiting component 82 is partially clamped into the third recess area 315. When the first housing 10 and the second housing rotate (unfolded or folded) relative to each other to the intermediate state, the second limiting component 82 gradually moves to the second horizontal area 317. When the first housing 10 and the second housing 30 are relatively folded to the closed state, the second limiting component 82 is partially clamped into the fourth recess area 316.

Based on the same or similar reasons as described above, when the electronic device 1000 is unfolded or folded, the third recess area 315 and the fourth recess area 316 may be disposed to provide torque that hinders or assists rotation of the first housing 10.

In some other embodiments, the first fixed bracket 31 may alternatively include only the third recess area 315, or include only the fourth recess area 316. Locations of the third recess area 315 and/or the fourth recess area 316 may also be designed in another form. This is not strictly limited in this application.

In some other embodiments, a part that is of the first fixed bracket 31 and that cooperates with the second limiting component 82 may be an elastic structure, or an elastic projection is disposed. In a process in which the electronic device 1000 is folded or unfolded, a force perpendicular to a length direction of the main shaft 1 applied to the first fixed bracket 31 may provide a touch feeling in the process in which the electronic device 1000 is folded.

Figure 46:
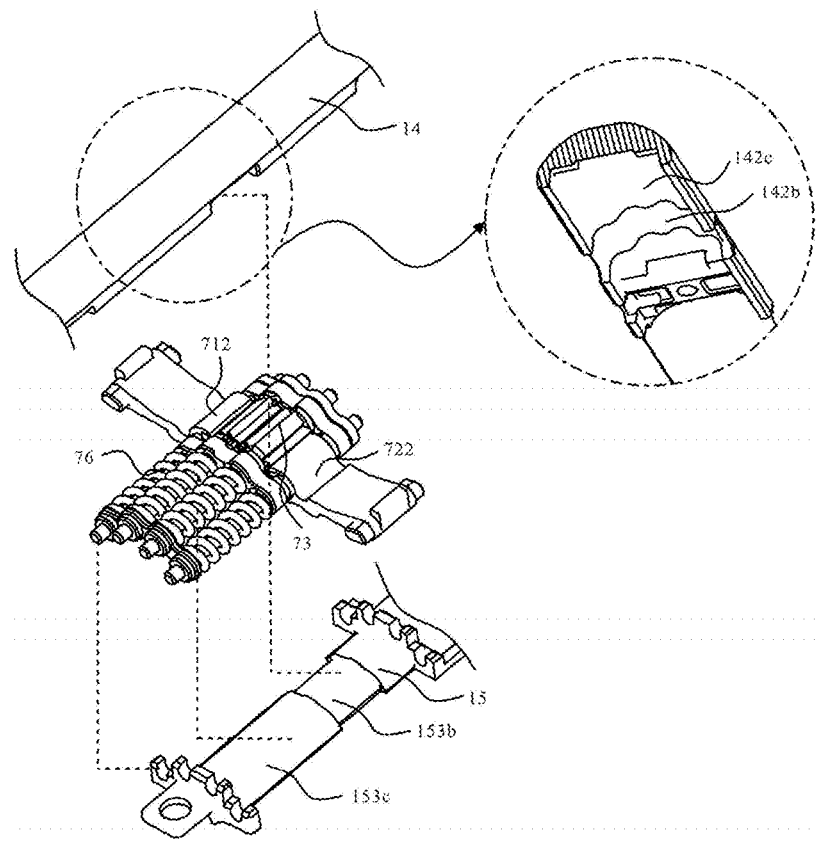
FIG. 46 is a schematic diagram of a fitting relationship between a synchronization damping member and a main shaft shown in FIG. 14.

FIG. 46 is a schematic diagram of a fitting relationship between the synchronization damping member 7 shown in FIG. 14 and the main shaft 1.

As shown in FIG. 14 and FIG. 46, in some embodiments, the rotating end 712 of the first synchronization swing arm 71, the rotating end 722 of the second synchronization swing arm 72, and the gear set 73 cooperate with the arc-shaped groove 142b of the main outer shaft 14 and the arc-shaped projection 153b of the main inner shaft 15, so as to implement rotation connection with the main shaft 1. The fourth elastic part 76 cooperates with the arc-shaped groove 142c of the main outer shaft 14 and the arc-shaped projection 153c of the main inner shaft 15.

Figure 47:
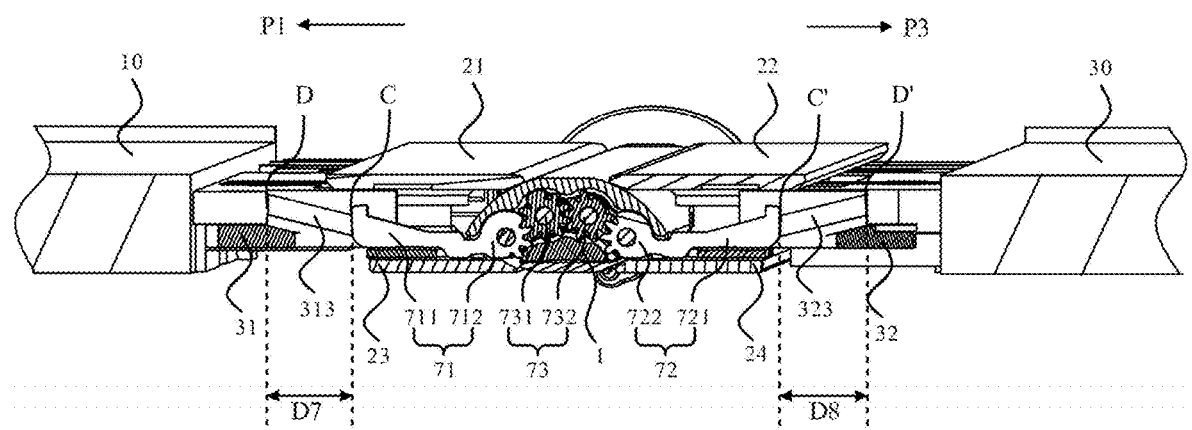
FIG. 47 is a schematic cross-sectional view of the folding apparatus shown in FIG. 2 a flattened state along a line C-C shown in FIG. 12.
Figure 48:
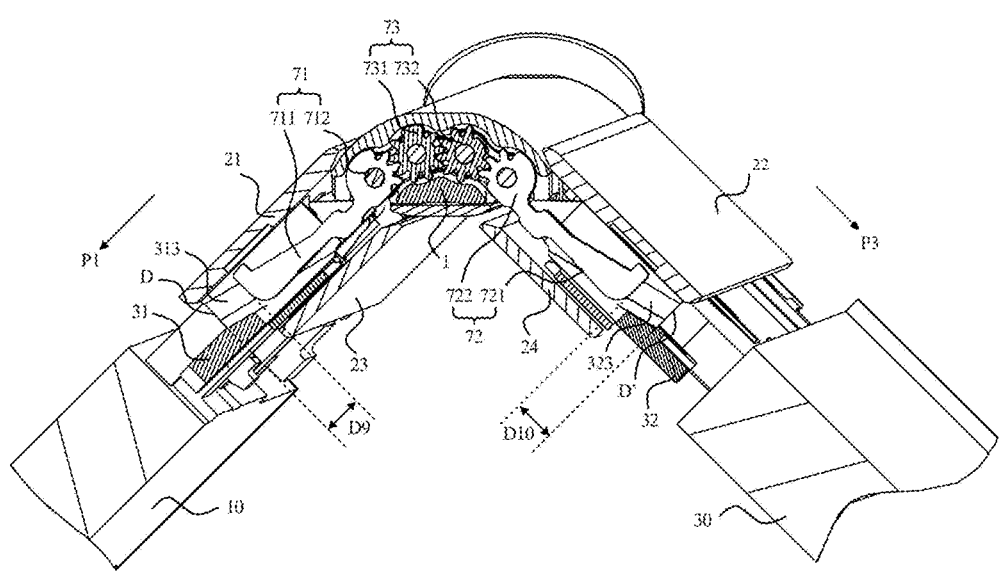
FIG. 48 is a schematic cross-sectional view of the folding apparatus shown in FIG. 2 in an intermediate state along a line C-C shown in FIG. 12.
Figure 49:
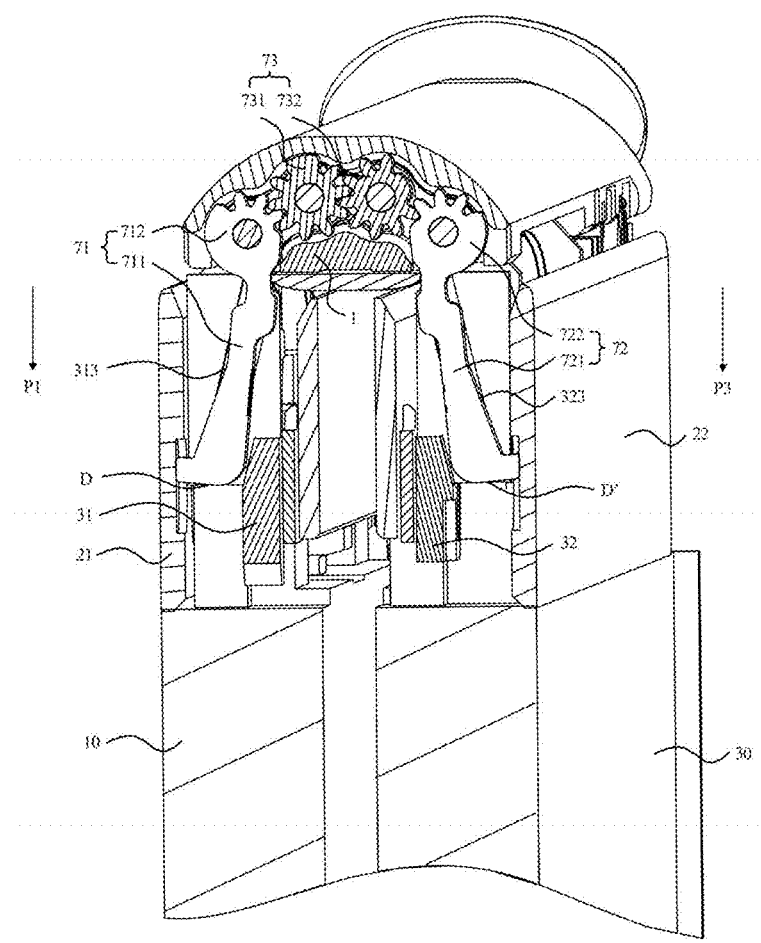
FIG. 49 is a schematic cross-sectional view of the folding apparatus shown in FIG. 2 in a closed state along a line C-C shown in FIG. 12.

Refer to FIG. 47 to FIG. 49. FIG. 47 is a schematic cross-sectional view of a location (that is, a C-C section shown in FIG. 12) of the synchronization component 70 corresponding to a flattened state of the folding apparatus 100 shown in FIG. 2, and FIG. 48 is a schematic cross-sectional view of a location (that is, a C-C section shown in FIG. 12) of the synchronization component 70 corresponding to an intermediate state of the folding apparatus 100 shown in FIG. 2. FIG. 49 is a schematic cross-sectional view of a location (that is, a C-C section shown in FIG. 12) of the synchronization component 70 corresponding to a closed state of the folding apparatus 100 shown in FIG. 2. FIG. 47 to FIG. 49 show a position change of a synchronization component in a process in which the folding apparatus 100 switches from a flattened state to a closed state.

As shown in FIG. 47, with reference to both FIG. 14 and FIG. 33, when the first housing 10 and the second housing 30 are relatively unfolded to a flattened state, the third flange 7111 of the sliding end 711 of the first synchronization swing arm 71 is slidably connected to the guide space 3131 of the third sliding groove 313 of the first fixed bracket 31. The third sliding groove has a C end close to the main shaft 1 and a D end away from the main shaft 1, that is, a distance between the C end of the third sliding groove 313 and the main shaft 1 in the first direction P1 is less than a distance between the D end of the third sliding groove 313 and the main shaft 1 in the first direction P1. A distance between the first synchronization swing arm 71 and the end D of the third sliding groove 313 in the first direction P1 is a seventh distance D7. Similarly, the fourth sliding groove 323 has a C' end close to the main shaft 1 and a D' end away from the main shaft 1. A distance between the second synchronization swing arm 72 and the second housing 30 at the D' end of the fourth sliding groove 323 in the third direction P3 is an eighth distance D8. For example, the seventh distance D7 may be approximately equal to the eighth distance D8, thereby ensuring synchronization and consistency of relative rotation of the first housing 10 and the second housing 30.

As shown in FIG. 48, with reference to both FIG. 14 and FIG. 36, in a process in which the first housing 10 and the second housing 30 are relatively folded from a flattened state to an intermediate state, the third flange 7111 of the sliding end 711 of the first synchronization swing arm 71 slides in the guide space 3131 of the first fixed bracket 31, that is, the first synchronization swing arm 71 slides in the third sliding groove 313, and the first synchronization swing arm 71 gradually approaches the first fixed bracket 31 and the first housing 10. The fourth flange 7211 of the sliding end 721 of the second synchronization swing arm 72 slides in the guide space 3231 of the second fixed bracket 32, that is, the second synchronization swing arm 72 slides in the fourth sliding groove 323, and the second synchronization swing arm 72 gradually approaches the second fixed bracket 32 and the second housing 30. When the first housing 10 and the second housing 30 are folded relative to each other to an intermediate state, a distance between the first synchronization swing arm 71 and the end D of the third sliding groove 313 in the first direction P1 is a ninth distance D9, and the ninth distance D9 is less than a seventh distance D7; and a distance between the second synchronization swing arm 72 and the end D' of the fourth sliding groove 323 in the third direction P3 is a tenth distance D10, and the tenth distance D10 is less than an eighth distance D8. For example, the ninth distance D9 may be approximately equal to the tenth distance D10.

As shown in FIG. 49, with reference to both FIG. 14 and FIG. 39, in a process in which the first housing 10 and the second housing 30 are relatively folded from an intermediate state to a closed state, the first synchronization swing arm 71 continues to approach the first fixed bracket 31 and the first housing 10, and the second synchronization swing arm 72 continues to approach the second fixed bracket 32 and the second housing 30. When the first housing 10 and the second housing 30 are folded relative to each other to a closed state, a distance between the first synchronization swing arm 71 and the D end of the third sliding groove 313 in the first direction P1 is an eleventh distance D11, and the eleventh distance D11 is less than a ninth distance D9; and a distance between the second synchronization swing arm 72 and the D' end of the fourth sliding groove 323 in the third direction P3 is a twelfth distance D12, and the twelfth distance D12 is less than a tenth distance D10. For example, the eleventh distance D11 and/or the twelfth distance D12 may be close to zero.

In this embodiment, in a process of expanding and folding the folding apparatus 100, the rotating end 712 of the first synchronization swing arm 71 is engaged with the rotating end 722 of the second synchronization swing arm 72 by using the gear set 73, both the rotating end 712 of the first synchronization swing arm 71 and the rotating end 722 of the second synchronization swing arm 72 are rotatably connected to the main shaft 1, and the sliding end 711 of the first synchronization swing arm 71 is slidably connected to the first fixed bracket 31, the sliding end 721 of the second synchronization swing arm 72 is slidably connected to the second fixed bracket 32. Therefore, in a process in which the first housing 10 and the second housing 30 are unfolded or folded relative to each other, the first synchronization swing arm 71 and the second synchronization swing arm 72 can control rotation angles of the first fixed bracket 31 and the second fixed bracket 32 relative to the main shaft 1 to be consistent, so that rotation actions of the first housing 10 and the second housing 30 are synchronous and consistent. Symmetry between a folding action and a spreading action of the folding apparatus 100 is better, which helps improve user experience.

The first synchronization swing arm 71 is rotatably connected to the main shaft 1 and is slidably connected to the first fixed bracket 31, that is, a connecting rod sliding block structure is formed. The second synchronization swing arm 72 is rotatably connected to the main shaft 1, and is slidably connected to the second fixed bracket 32, that is, a connecting rod sliding block structure is formed. Synchronization and consistency of rotation actions of the first housing 10 and the second housing 30 can be well controlled by using the connecting rod sliding block structure meshed with each other by using the gear set 73.

Figure 50:
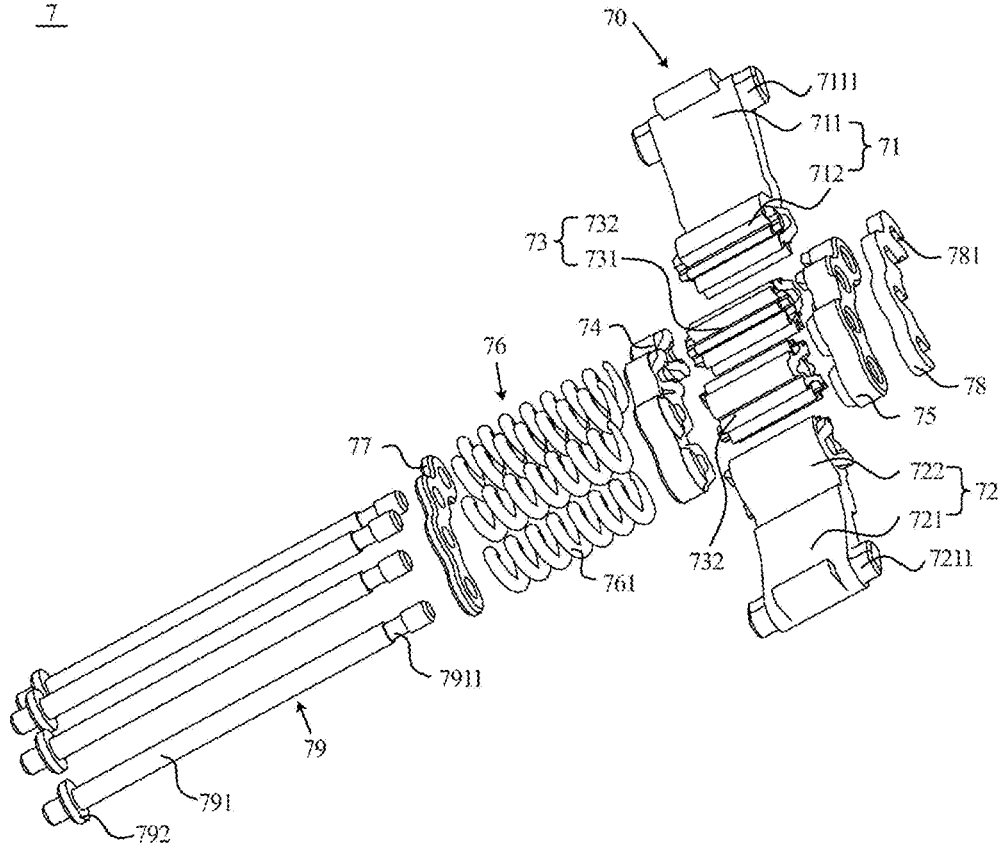
FIG. 50 is a schematic exploded view of a synchronization damping member shown in FIG. 12 to FIG. 14.

FIG. 50 is a schematic exploded view of the synchronization damping member 7 shown in FIG. 12 to FIG. 14.

In some embodiments, the synchronization damping member 7 of the rotating mechanism 20 includes a synchronization component 70, a first conjoined cam 74, a second conjoined cam 75, a fourth elastic part 76, a snap ring 77, a snap spring 78, and a plurality of coupling shafts 79. For example, the synchronization component 70 includes a first synchronization swing arm 71, a second synchronization swing arm 72, and a gear set 73. The rotating end 712 of the first synchronization swing arm 71 engages the rotating end 722 of the second synchronization swing arm 72 by using the gear set 73. The gear set 73 includes a first gear 731 and a second gear 732, and the first gear 731 and the second gear 732 are engaged with each other.

The coupling shaft 79 includes a guide post 791 and a stop block 792. The snap ring 77, the fourth elastic part 76, the first conjoined cam 74, the synchronization component 70, the second conjoined cam 75, and the snap spring 78 are sequentially sleeved on the guide post 791 of the plurality of coupling shafts 79. An end part of the snap ring 77 abuts against the stop block 792 of the coupling shaft 79. The guide post 791 of the coupling shaft 79 includes a limiting groove 7911, and the snap spring 78 includes a plurality of grooves 781. The plurality of grooves 781 of the snap spring 78 are clamped to the limiting grooves 7911 of the plurality of coupling shafts 79 in a one-to-one correspondence. For example, the fourth elastic part 76 may include a plurality of springs 761, and the fourth elastic part 76 may be in a compressed state to provide pre-pressure.

For example, the rotating end 712 of the first synchronization swing arm 71, the first gear 731, the second gear 732, and the rotating end 722 of the second synchronization swing arm 72 are arranged in an arc shape. That is, the rotation axis of the rotating end 712 of the first synchronization swing arm 71, the rotation axis of the first gear 731, the rotation axis of the second gear 732, and the rotation axis of the rotating end 722 of the second synchronization swing arm 72 are arranged in an arc shape. In this embodiment, some structures of the synchronization damping member 7 mounted on the main shaft 1 are arranged in an arc shape, so that internal space of the main shaft 1 can be fully utilized, thereby helping improve compactness of component arrangement of the electronic device 1000 and reduce a volume of the electronic device 1000.

Figure 51:
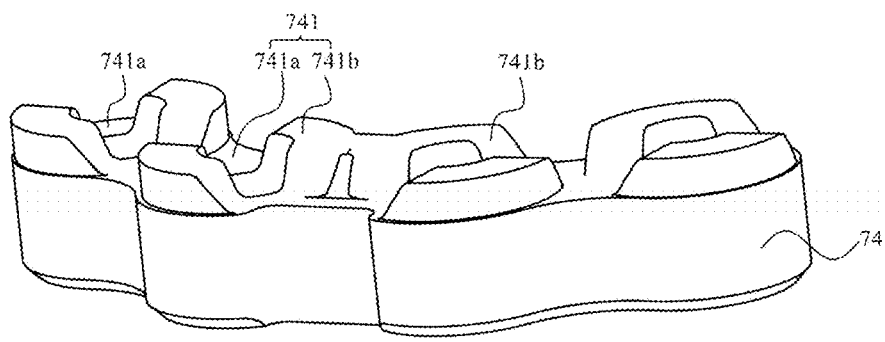
FIG. 51 is a schematic diagram of a structure of a first conjoined cam shown in FIG. 50.
Figure 52:
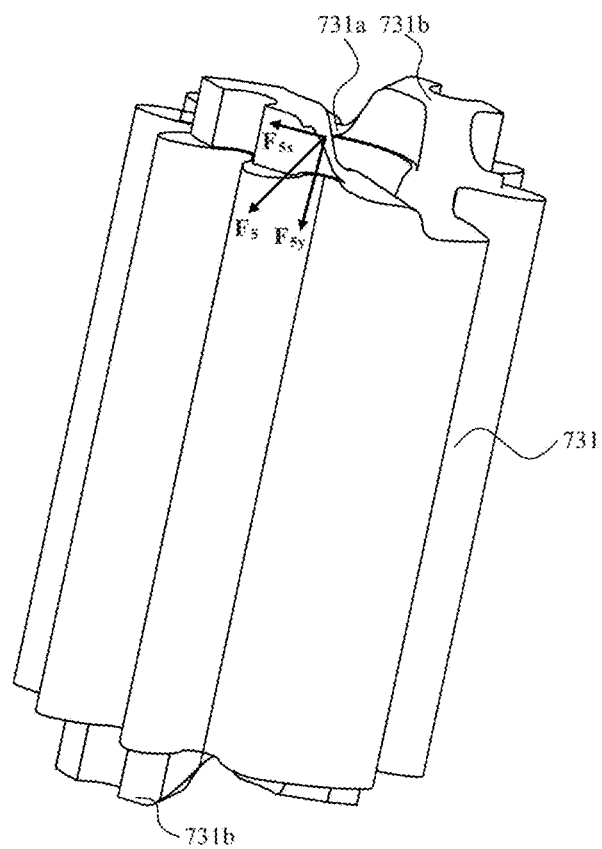
FIG. 52 is a schematic diagram of a structure of a first gear shown in FIG. 50.

FIG. 51 is a schematic diagram of a structure of the first conjoined cam 74 shown in FIG. 50, and FIG. 52 is a schematic diagram of a structure of the first gear 731 shown in FIG. 50.

As shown in FIG. 51, the first conjoined cam 74 has a first end face 741 facing the synchronization component 70, and the first end face 741 includes a plurality of first concave surfaces 741a and first convex surfaces 741b that are spaced from each other. As shown in FIG. 52, two surfaces on which the first gear 731 cooperates with the first conjoined cam 74 and the second conjoined cam 75 each include a second concave surface 731a and a second convex surface 731b that are spaced from each other.

Figure 53:
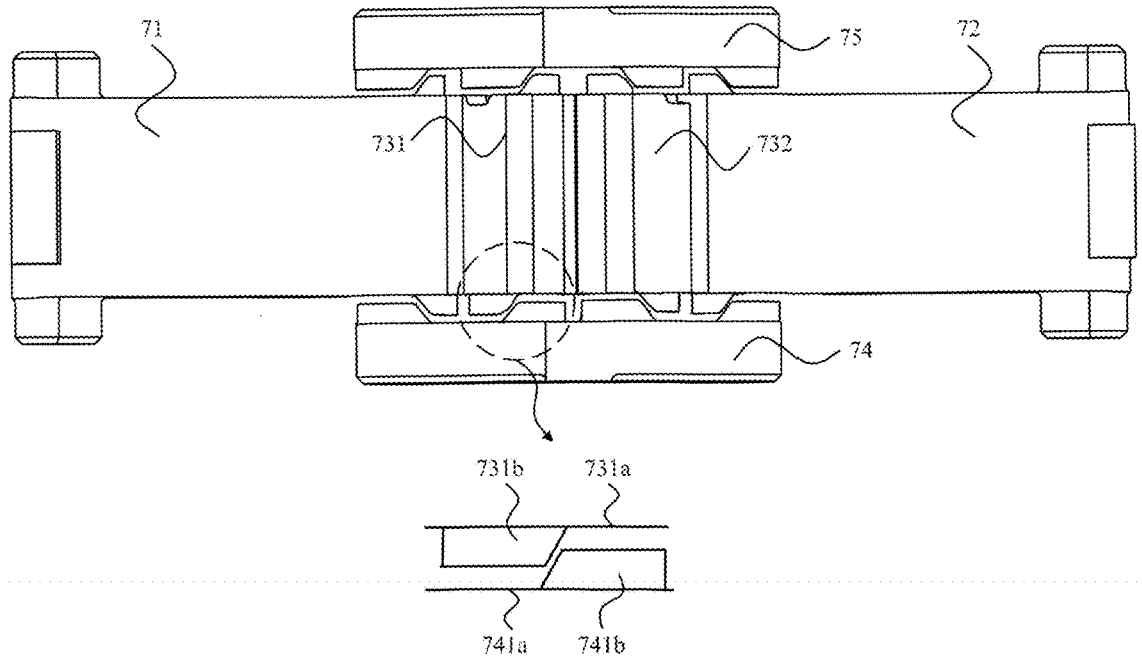
FIG. 53 is a schematic diagram of a fitting relationship between a first conjoined cam and a first gear when a first housing and a second housing are relatively unfolded to a flattened state.

FIG. 53 is a schematic diagram of a fitting relationship between the first conjoined cam 74 and the first gear 731 when the first housing 10 and the second housing 30 are relatively unfolded to a flattened state. As shown in FIG. 50 to FIG. 53, the first concave surface 741a of the first conjoined cam 74 abuts against the second convex surface 731b of the first gear 731, and the first convex surface 741b of the first conjoined cam 74 abuts against the second concave surface 731a of the first gear 731. In this case, the fourth elastic part 76 is in a compressed state, and an elastic form variable of the fourth elastic part 76 is a first form variable.

Figure 54:
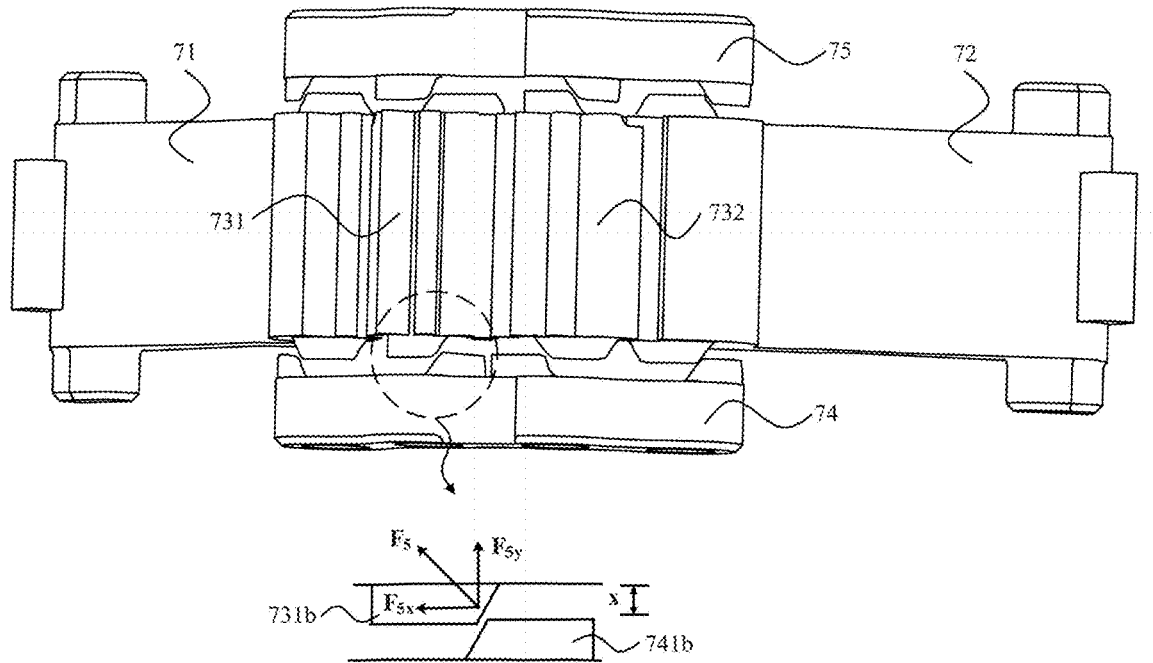
FIG. 54 is a schematic diagram of a fitting relationship between a first conjoined cam and a first gear when a first housing and a second housing start to rotate relative to each other.

FIG. 54 is a schematic diagram of a fitting relationship between the first conjoined cam 74 and the first gear 731 when the first housing 10 and the second housing 30 start to rotate relative to each other. The first convex surface 741b of the first conjoined cam 74 slides relative to the second convex surface 731b of the first gear 731, and the first convex surface 741b partially abuts against the second convex surface 731b. In this case, the elastic form variable of the fourth elastic part 76 is a second form variable, and the second form variable is greater than the first form variable. By using the second shape variable of the fourth elastic part 76, the first convex surface 741b pushes the second convex surface 731b. Through cooperation between the first convex surface 741b and the second convex surface 731b, torque that hinders relative rotation of the housing can be provided, thereby improving a touch feeling in a folding process of the electronic device 1000.

As shown in FIG. 54, because the second convex surface 731b has a specific included angle with the length direction of the main shaft 1, in a process in which the first housing 10 rotates relative to the second housing 30, the first convex surface 741b slides relative to the second convex surface 731b, and elastic force generated by deformation of the fourth elastic part 76 is transferred to the second convex surface 731b of the first gear 731 by using the first convex surface 741b of the first conjoined cam 74, a force applied to the second convex surface 731b is $F_5$. $F_{5x}$ is a component of force perpendicular to the length direction of the main shaft 1, and $F_{5y}$ is a component of force parallel to the length direction of the main shaft 1. When the first housing 10 rotates relative to the second housing 30, a component of force $F_{5x}$ that is applied to the second convex surface 731b and that is perpendicular to the length direction of the main shaft 1 and away from the direction of the main shaft 1 generates torque that hinders relative rotation of the housing. For a force applied in a folding process of the electronic device 1000, refer to FIG. 45 and descriptions corresponding to FIG. 45. Details are not described herein again.

A structure of the second conjoined cam 75 may be the same as a structure of the first conjoined cam 74, and a structure of the second gear 732 may be the same as a structure of the first gear 731. Specific structures are not described in detail in this embodiment. A fitting relationship between the first gear 731 and the second conjoined cam 75, fitting relationships between the second gear 732 and the first conjoined cam 74 and between the second gear 732 and the second conjoined cam 75, fitting relationships between the rotating end 712 of the first synchronization swing arm 71 and the first conjoined cam 74 and between the rotating end 712 and the second conjoined cam 75, and fitting relationships between the rotating end 722 of the second synchronization swing arm 72 and the first conjoined cam 74 and between the rotating end 722 and the second conjoined cam 75 are the same as or similar to a fitting relationship between the first gear 731 and the first conjoined cam 74. For a specific structure, refer to the foregoing description. Details are not described herein again.

It can be learned from the foregoing description that, through cooperation between several disposed convex surfaces and concave surfaces, torque that hinders relative rotation of the first housing 10 and the second housing 30 can be provided, thereby improving a touch feeling in a folding process of the electronic device 1000.

Figure 55:
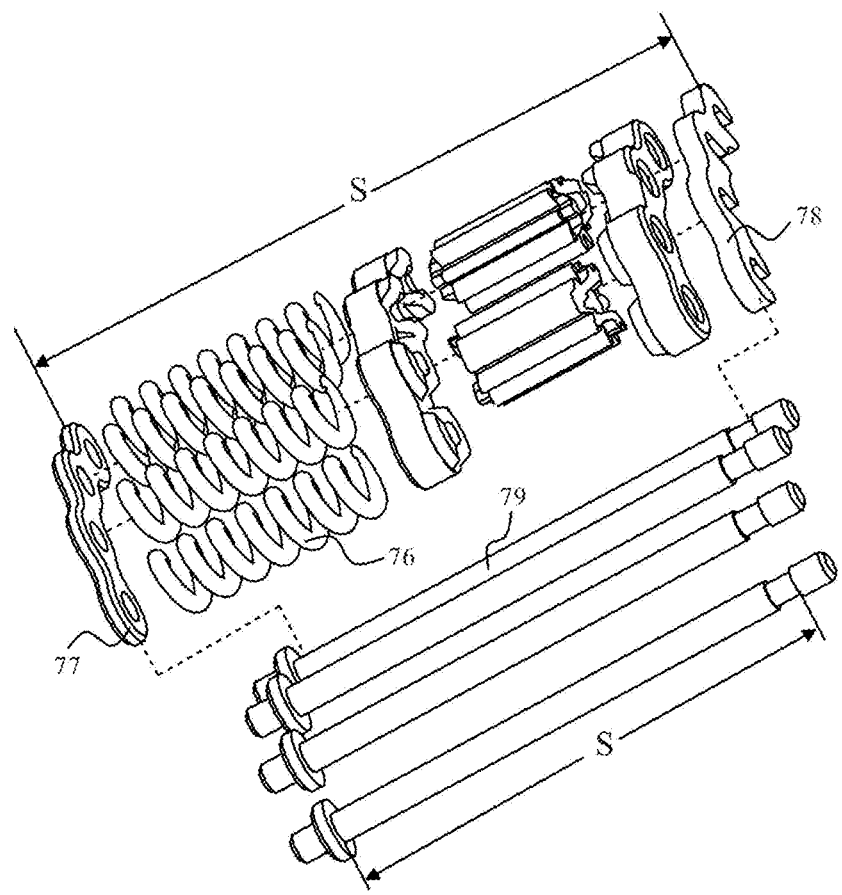
FIG. 55 is a schematic diagram of a partial structure of a synchronization damping member shown in FIG. 50.

FIG. 55 is a schematic diagram of a partial structure of the synchronization damping member 7 shown in FIG. 50. Refer to FIG. 14 and FIG. 54 together. When the first convex surface 741b of the first conjoined cam 74 slides relative to the second convex surface 731b of the first gear 731, convex surfaces between the first conjoined cam 74 and the first gear 731 squeeze each other to generate a first displacement M. Correspondingly, the second conjoined cam 75 also slides relative to the first gear 731, and a second displacement N is correspondingly generated by extrusion of a convex surface between the second conjoined cam 75 and the first gear 731. For example, the second displacement value N may be equal to the first displacement value M. As shown in FIG. 55, a distance between the snap spring 78 and the snap spring 77 is fixed and unchanged, and is a fixed length S. Therefore, both the first displacement M generated by extruding the convex surface of the first gear 731 and the convex surface of the first conjoined cam 74 and the second displacement N generated by extruding the convex surface of the first gear 731 and the convex surface of the second conjoined cam 75 are converted into an elastic shape variable of the fourth elastic part 76. By using the foregoing structure, the elastic shape variable of the fourth elastic part 76 may be increased, so that when the first convex surface 741b and the second convex surface 731b are extruded from each other, a force $F_5$ applied to the first gear 731 is greater, and a component of force $F_{5x}$ of $F_5$ perpendicular to the length direction of the main shaft 1 is correspondingly greater. Therefore, when the first housing 10 and the second housing 30 rotate relative to each other, larger torque may be generated to prevent relative rotation of the housing, thereby further improving a touch feeling of the electronic device 1000.

Similarly, when the concave and convex surfaces of the first conjoined cam 74 and the second conjoined cam 75 cooperate with the concave and convex surfaces of the first gear 731, the second gear 732, the rotating end 712 of the first synchronization swing arm 71, and the rotating end 722 of the second synchronization swing arm 72, larger torque can be provided, thereby improving hand feeling for the electronic device 1000 in a folding and unfolding process.

In this embodiment of this application, when the electronic device 1000 is unfolded from the closed state to the flattened state, a force applied to the first non-bending part 2001 of the flexible display 200 in the first direction is greater than a force applied to the first non-bending part 2001 in the closed state in the first direction, and a force applied to the second non-bending part 2003 in the third direction is greater than a force applied to the second non-bending part 2003 in the closed state in the third direction. Therefore, a layered misalignment phenomenon of the flexible display 200 when the electronic device is unfolded from the closed state to the flattened state can be alleviated, and crease recovery of the flexible display 200 can be accelerated, thereby improving a flattening effect of the flexible display.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. When no conflict occurs, embodiments of this application and the features in the embodiments may be mutually combined. Therefore, the protection scope of this application shall be subject to the protection scope of the claims.

The invention claimed is:

1. An electronic device, comprising:
   a flexible display, a first housing, a second housing, a first elastic component, and a shaft,
   wherein the flexible display comprises a first non-bending part, a bending part, and a second non-bending part that are sequentially arranged,
   the first housing and the second housing are respectively located on two sides of the shaft,
   the first housing is fixedly connected to the first non-bending part, and the second housing is fixedly connected to the second non-bending part,
   the first elastic component is located between the shaft and the first housing, the first elastic component is rotatably connected to the shaft, and the first elastic component is fixedly connected to the first housing,
   a first mechanical part of the first elastic component abuts against a second mechanical part of the shaft,
   the first elastic component comprises a first fixed bracket,
   a compression amount of the first elastic component in a first direction generates a first elastic force, and at least a part of the first elastic force is transferred to the bending part through the first housing and the first non-bending part, wherein the first direction is perpendicular to a first length extension direction of the shaft, and the first direction is parallel to the first housing,
   when the electronic device is in a flattened state, a first portion of the first mechanical part abuts against a third portion of the second mechanical part, and a first force generated by a first compression amount of the first elastic component in the first direction is transferred to the first fixed bracket,
   the first housing and the first elastic component rotate relative to the shaft, the second housing rotates relative to the shaft, and the electronic device changes from the flattened state to a folded state,
   when the electronic device is in the folded state, a second portion of the first mechanical part abuts against a fourth portion of the second mechanical part, and a second force generated by a second compression amount of the first elastic component in the first direction is transferred to the first fixed bracket,
   wherein the second compression amount is less than the first compression amount such that the second force is less than the first force and recovery from a crease of the flexible display is accelerated when the electronic device changes from the folded state to the flattened state,
   wherein the first portion of the first mechanical part is different from the second portion of the first mechanical part, or the third portion of the second mechanical part is different from the fourth portion of the second mechanical part,
   wherein at least a part of the first fixed bracket is fixedly connected to the first housing,
   wherein the first elastic component further comprises a first elastic part and a first bracket, the first elastic part and the first bracket are disposed on the first fixed bracket, at least a part of the first elastic part is disposed between the first bracket and the first fixed bracket, and the first bracket abuts against the second mechanical part, and the first elastic part abuts against the first housing through the first fixed bracket,
   wherein the first fixed bracket is provided with a first mounting groove,
   wherein the first elastic component further comprises the first bracket, and the first bracket is provided with a flange, and
   wherein the first bracket is slidably connected to the first mounting groove through the flange.

2. The electronic device according to claim 1, wherein when the electronic device is in the flattened state, a first force is transferred to the bending part through the first housing and the first non-bending part, and
   wherein when the electronic device is in the folded state, the second force is transferred to the bending part through the first housing and the first non-bending part, wherein the second force is less than the first force.

3. The electronic device according to claim 1, wherein the shaft is rotatably connected to the first elastic component by using a first rotating shaft,
   wherein when the electronic device is in the flattened state, a first distance is between an axis of the first rotating shaft and a fifth portion of the shaft, and a first length of the first distance projected on a first plane is a first projection length,
   wherein when the electronic device is in the folded state, a second distance is between the axis of the first rotating shaft and a sixth portion of the shaft, a second length of the second distance projected on the first plane is a second projection length, and the second projection length is less than the first projection length, and wherein the first housing and the first non-bending part are fixedly connected on the first plane.

4. The electronic device according to claim 1, wherein the first elastic component is provided with a connection hole, and wherein the shaft is rotatably connected to the first elastic component by using a first rotating shaft such that the first rotating shaft penetrates through the connection hole.

5. The electronic device according to claim 4, wherein the connection hole comprises a first side wall and a second side wall, a first distance is between an axis of the first rotating shaft and the first side wall, a second distance is between the axis of the first rotating shaft and the second side wall, and the first distance is less than the second distance, when the connection hole moves relative to the first rotating shaft in response to a third force acting on the first elastic component, a third distance is between the axis of the first rotating shaft and the first side wall, and a fourth distance is between the axis of the first rotating shaft and the second side wall, and the third distance is greater than the fourth distance, and the second side wall faces the first side wall in a direction of the third force, a fifth distance is between the first side wall and the first housing, a sixth distance is between the second side wall and the first housing, and the fifth distance is less than the sixth distance.

6. The electronic device according to claim 4, wherein a first cross section of the connection hole comprises at least one of a waist-round shape, an ellipse, a circle, or a rectangle, and the first cross section is perpendicular to a second length extension direction of the first rotating shaft.

7. The electronic device according to claim 1, wherein the electronic device further comprises a second elastic component, the shaft comprises a first rotating part and a second rotating part,
the second elastic component comprises a second fixed bracket,
the first rotating part comprises a first connection component and a first rotating arm,
the second rotating part comprises a second connection component and a second rotating arm,
the first connection component comprises a first sliding end and a first rotating end, the first sliding end of the first connection component is slidably connected to the second fixed bracket, and the first rotating end of the first connection component is rotatably connected to a first end of the first rotating arm,
a second end of the first rotating arm is rotatably connected to the first fixed bracket through a first rotating shaft, and
the second connection component comprises a second sliding end and a second rotating end, the second sliding end of the second connection component is slidably connected to the first fixed bracket, the second rotating end of the second connection component is rotatably connected to a third end of the second rotating arm, and a fourth end of the second rotating arm is rotatably connected to the second fixed bracket.

8. The electronic device according to claim 7, wherein the second elastic component is located between the shaft and the second housing, the second elastic component is rotatably connected to the shaft, and the second elastic component is fixedly connected to the second housing, a third mechanical part of the second elastic component abuts against a fourth mechanical part of the shaft,
another compression amount of the second elastic component in a second direction generates a second elastic force, and at least a part of the second elastic force is transferred to the bending part through the second housing and the second non-bending part, wherein the second direction is perpendicular to the first length extension direction of the shaft, and the second direction is parallel to the second housing,
when the electronic device is in the flattened state, a seventh portion of the third mechanical part abuts against a ninth portion of the fourth mechanical part, and a third compression amount is of the second elastic component in the second direction,
when the electronic device is in the folded state, an eighth portion of the third mechanical part abuts against a tenth portion of the fourth mechanical part, and a fourth compression amount is of the second elastic component in the second direction, wherein the fourth compression amount is less than the third compression amount, and
the seventh portion of the third mechanical part is different from the eighth portion of the third mechanical part, or the ninth portion of the fourth mechanical part is different from the tenth portion of the fourth mechanical part.

9. The electronic device according to claim 7, wherein the shaft further comprises a main shaft,
the first connection component comprises a first transmission arm and a first connecting piece,
the second connection component comprises a second transmission arm and a second connecting piece,
the first connection component comprises a third sliding end and a third rotating end, the third sliding end of the first connection component is slidably connected to the second fixed bracket, and the third rotating end of the first connection component is rotatably connected to the first end of the first rotating arm such that:
the first transmission arm comprises a fourth sliding end and a fourth rotating end, the fourth sliding end of the first transmission arm is slidably connected to the second fixed bracket, the fourth rotating end of the first transmission arm is rotatably connected to the main shaft, the fourth rotating end of the first transmission arm is rotatably connected to the first connecting piece, and the first connecting piece is rotatably connected to the first end of the first rotating arm, and
the second connection component comprises a fifth sliding end and a fifth rotating end, the fifth sliding end of the second connection component is slidably connected to the first fixed bracket, and the fifth rotating end of the second connection component is rotatably connected to the third end of the second rotating arm such that:
the second transmission arm comprises a sixth sliding end and a sixth rotating end, the sixth sliding end of the second transmission arm is slidably connected to the first fixed bracket, the sixth rotating end of the second transmission arm is rotatably connected to the main shaft, the sixth rotating end of the second transmission arm is rotatably connected to the second connecting piece, and the second connecting piece is rotatably connected to the third end of the second rotating arm.

10. The electronic device according to claim 9,
wherein the main shaft comprises an inner shaft and an outer shaft, and the outer shaft is fixedly connected to the inner shaft, and wherein the inner shaft comprises a first arc-shaped projection and a second arc-shaped projection, the outer shaft comprises a first arc-shaped groove and a second arc-shaped groove, the fourth rotating end of the first transmission arm is arc-shaped and is rotatably connected to the first arc-shaped projection and the first arc-shaped groove, and the sixth rotating end of the second transmission arm is arc-shaped and is rotatably connected to the second arc-shaped projection and the second arc-shaped groove.

11. The electronic device according to claim 10, wherein the first rotating arm is connected to the first connecting piece through a second rotating shaft, the inner shaft and the outer shaft are enclosed to form an arc-shaped groove, and the second rotating shaft cooperates with the arc-shaped groove in a sliding manner.

12. The electronic device according to claim 9, wherein the second fixed bracket comprises a first sliding groove, and the first fixed bracket comprises a second sliding groove,
the fourth sliding end of the first transmission arm is slidably connected to the second fixed bracket such that:
the fourth sliding end of the first transmission arm is slidably connected to the first sliding groove, and
in a process in which the electronic device switches from the flattened state to the folded state, the fourth sliding end of the first transmission arm slides relative to the first sliding groove, and
the sixth sliding end of the second transmission arm is slidably connected to the first fixed bracket such that:
the sixth sliding end of the second transmission arm is slidably connected to the second sliding groove, and
in the process in which the electronic device switches from the flattened state to the folded state, the sixth sliding end of the second transmission arm slides relative to the second sliding groove.

13. The electronic device according to claim 9, wherein the electronic device further comprises a synchronization component,
the synchronization component comprises a first synchronization swing arm, a second synchronization swing arm, a first gear, and a second gear,
the first gear is disposed on the main shaft, and the first gear is rotatably connected to the main shaft, the second gear is disposed on the main shaft, and the second gear is rotatably connected to the main shaft, and the first gear is engaged with the second gear,
the first synchronization swing arm comprises a seventh sliding end and a seventh rotating end, the seventh rotating end of the first synchronization swing arm is rotatably connected to the main shaft, the seventh rotating end of the first synchronization swing arm is engaged with the first gear, and the seventh sliding end of the first synchronization swing arm is slidably connected to the first fixed bracket, and
the second synchronization swing arm comprises an eighth sliding end and an eighth rotating end, the eighth rotating end of the second synchronization swing arm is rotatably connected to the main shaft, the eighth rotating end of the second synchronization swing arm is engaged with the second gear, and the eighth sliding end of the second synchronization swing arm is slidably connected to the second fixed bracket.

14. The electronic device according to claim 1, wherein the flexible display comprises a holding plate, and the holding plate comprises a first fastening part, a bending area, and a second fastening part,
the first housing is fixedly connected to the first non-bending part, and the second housing is fixedly connected to the second non-bending part such that:
the first housing is fixedly connected to the first fastening part, and the second housing is fixedly connected to the second fastening part, and
the holding plate is provided with a through hole, and the through hole penetrates two plate surfaces of the holding plate.

15. A folding apparatus, applied to an electronic device, the electronic device comprising a flexible display, wherein the flexible display comprises a first non-bending part, a bending part, and a second non-bending part that are sequentially arranged, and the folding apparatus comprises a first housing, a second housing, a first elastic component, and a shaft,
the first housing and the second housing are respectively located on two sides of the shaft,
the first housing is fixedly connected to the first non-bending part, and the second housing is fixedly connected to the second non-bending part,
the first elastic component is located between the shaft and the first housing, the first elastic component is rotatably connected to the shaft, and the first elastic component is fixedly connected to the first housing,
a first mechanical part of the first elastic component abuts against a second mechanical part of the shaft,
the first elastic component comprises a first fixed bracket,
a compression amount of the first elastic component in a first direction generates an elastic force, and at least a part of the elastic force is transferred to the bending part through the first housing and the first non-bending part, wherein the first direction is perpendicular to a length extension direction of the shaft, and the first direction is parallel to the first housing,
when the electronic device is in a flattened state, a first portion of the first mechanical part abuts against a third portion of the second mechanical part, and a first force generated by a first compression amount of the first elastic component in the first direction is transferred to the first fixed bracket,
the first housing and the first elastic component rotate relative to the shaft, the second housing rotates relative to the shaft, and the electronic device changes from the flattened state to a folded state,
when the electronic device is in the folded state, a second portion of the first mechanical part abuts against a fourth portion of the second mechanical part, and a second force generated by a second compression amount of the first elastic component in the first direction is transferred to the first fixed bracket,
wherein the second compression amount is less than the first compression amount such that the second force is less than the first force and recovery from a crease of the flexible display is accelerated when the electronic device changes from the folded state to the flattened state,
wherein the first portion of the first mechanical part is different from the second portion of the first mechanical part, or the third portion of the second mechanical part is different from the fourth portion of the second mechanical part,
wherein at least a part of the first fixed bracket is fixedly connected to the first housing,
wherein the first elastic component further comprises a first elastic part and a first bracket, the first elastic part and the first bracket are disposed on the first fixed bracket, at least a part of the first elastic part is disposed between the first bracket and the first fixed bracket, and the first bracket abuts against the second mechanical part, and the first elastic part abuts against the first housing through the first fixed bracket, wherein the first fixed bracket is provided with a first mounting groove, wherein the first elastic component further comprises the first bracket, and the first bracket is provided with a flange, and wherein the first bracket is slidably connected to the first mounting groove through the flange.

\* \* \* \* \*